US007568170B2

(12) United States Patent
Shiono et al.

(10) Patent No.: US 7,568,170 B2
(45) Date of Patent: Jul. 28, 2009

(54) DATA PROCESSING SETTING APPARATUS, DATA PROCESSING SETTING METHOD, DATA PROCESSING SETTING PROGRAM, AND COMPUTER READABLE RECORDING MEDIUM RECORDING THE PROGRAM

(75) Inventors: Fusahiro Shiono, Osaka (JP); Atsushi Ohta, Nara (JP); Takashi Sawano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 559 days.

(21) Appl. No.: 11/437,978

(22) Filed: May 18, 2006

(65) Prior Publication Data

US 2006/0265671 A1 Nov. 23, 2006

(30) Foreign Application Priority Data

May 20, 2005 (JP) ............................. 2005-148762

(51) Int. Cl.
*G06F 3/00* (2006.01)
*G06F 3/14* (2006.01)

(52) U.S. Cl. ..................... 715/839; 715/719; 715/765; 715/977; 345/473

(58) Field of Classification Search ................ 715/719, 715/764, 765, 781, 835, 838, 839, 846, 965, 715/977; 345/473, 660
See application file for complete search history.

(56) References Cited

U.S. PATENT DOCUMENTS

| 5,479,602 | A | * | 12/1995 | Baecker et al. | ............... | 715/838 |
| 5,630,081 | A | * | 5/1997 | Rybicki et al. | ............... | 715/839 |
| 5,825,361 | A | * | 10/1998 | Rubin et al. | ................ | 715/839 |
| 5,903,254 | A | * | 5/1999 | Mundt et al. | ................ | 715/846 |
| 6,002,401 | A | * | 12/1999 | Baker | ......................... | 715/839 |
| 6,603,488 | B2 | * | 8/2003 | Humpleman et al. | ........ | 715/771 |
| 6,697,091 | B1 | * | 2/2004 | Rzepkowski et al. | ........ | 715/835 |
| 2002/0091992 | A1 | * | 7/2002 | Kojima et al. | ............... | 717/109 |
| 2003/0081009 | A1 | | 5/2003 | Seo | | |

(Continued)

FOREIGN PATENT DOCUMENTS

CN 1416265 5/2003

(Continued)

*Primary Examiner*—X. L Bautista
(74) *Attorney, Agent, or Firm*—Edwards Angell Palmer & Dodge LLP; David G. Conlin; Peter J. Manus

(57) ABSTRACT

The present invention provides a data processing setting apparatus which allows a user to easily confirm a function, which has already been set, when setting a desired function from a plurality of functions of data processing. A printer driver UI section 15 includes (I) a display control section 37 for displaying on a setting screen image a plurality of advanced function icons each indicating a function of a print processing and being able to be identified by the function, (II) a detail condition setting section 42 for (i) setting one advanced function corresponding to the advanced function icon selected, in response to an input instruction, from a plurality of advanced function icons displayed on the setting screen image, and (III) a set function icon display processing section 43 for displaying a set function icon in a region of the setting screen image, not in a region in which the plurality of advanced function icons are displayed, the set function icon corresponding to the advanced function set by the detail condition setting section 42 and indicating that the advanced function has already been set.

14 Claims, 39 Drawing Sheets

U.S. PATENT DOCUMENTS

| | | | | |
|---|---|---|---|---|
| 2003/0202015 A1* | 10/2003 | Battles et al. | ................ | 345/764 |
| 2005/0055614 A1* | 3/2005 | Yeh | ........................... | 714/726 |
| 2005/0091614 A1* | 4/2005 | Wasko et al. | ................ | 715/861 |
| 2005/0137840 A1* | 6/2005 | Peck et al. | ..................... | 703/13 |
| 2006/0200773 A1* | 9/2006 | Nocera et al. | ................ | 715/764 |

FOREIGN PATENT DOCUMENTS

| | | |
|---|---|---|
| JP | 2001-272884 | 10/2001 |
| JP | 2001-282415 | 10/2001 |
| JP | 2004-054432 | 2/2004 |
| JP | 2005-018411 | 1/2005 |

* cited by examiner

FIG. 4

| CONTROL NUMBER | ADVANCED FUNCTION ICON (LARGE SIZE) | ADVANCED FUNCTION ICON (MIDDLE SIZE) | ADVANCED FUNCTION ICON (SMALL SIZE) | ADVANCED FUNCTION NAME | DIALOG BOX NUMBER | PRINT CONDITION | SET FUNCTION ICON | RESULTING IMAGE | NUMBER OF FRAMES |
|---|---|---|---|---|---|---|---|---|---|
| 1 | | | | BINDING MARGIN | W1 | — | | | 30 |
| 2 | | | | PUNCH | W2 | — | | | 30 |
| 3 | | | | STAPLE | W2 | ONE-POINT STAPLE | | | 30 |
| 4 | | | | POSTER PRINT | W3 | TWO-POINT STAPLE | | | 30 |
| 5 | | | | WATERMARK | W4 | — | | | 30 |
| ... | ... | ... | ... | ... | ... | ... | ... | ... | ... |

FIG. 5
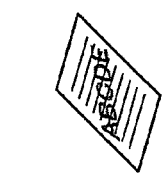
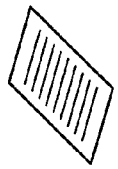
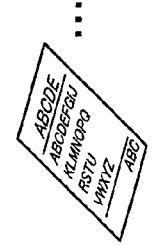
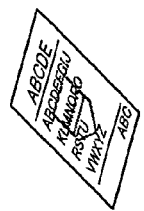
CONTROL NUMBER 4: POSTER PRINT
CONTROL NUMBER 5: WATERMARK
CONTROL NUMBER 13: FIT PAGE
CONTROL NUMBER 14: OVERLAY
CONTROL NUMBER 15: 180° ROTATION

FIG. 6

| TYPES OF ADVANCED FUNCTION | CONTROL NUMBER |
|---|---|
| COLOR SETTING | 7. 8. 9 |
| IMAGE SETTING | 4. 5. 6. 13. 14. 15 |
| FINISH SETTING | 1. 2. 3. 10. 11. 12 |

FIG. 7
| DIALOG BOX NUMBER | DIALOG BOX |
|---|---|
| W1 | 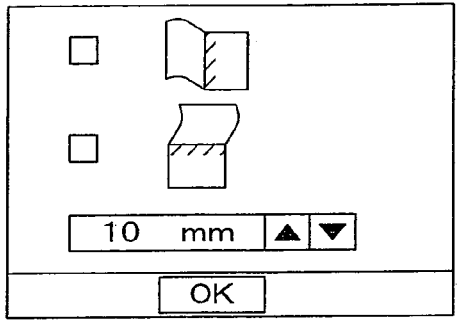 |
| W2 | 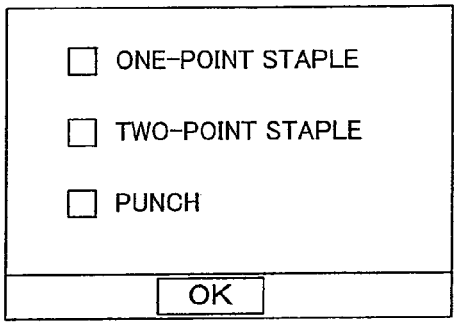 |
| W3 | 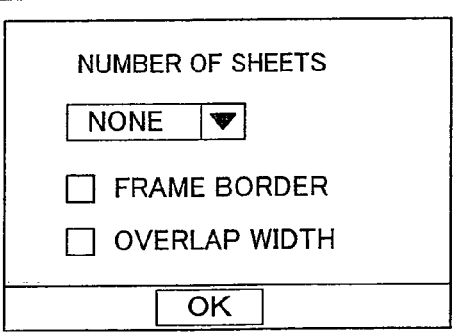 |
| W4 | 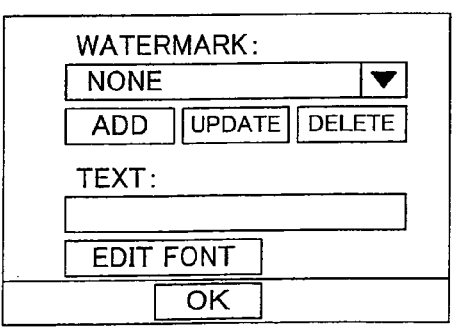 |
| ⋮ | ⋮ |

FIG. 38

| | |
|---|---|
| CONTROL NUMBER 3: STAPLE FUNCTION<br>CONTROL NUMBER 4: POSTER PRINT FUNCTION<br>... | ...<br>... |

FIG. 40

| CONTROL NUMBER | SET PRINT CONDITION |
|---|---|
| 3 (STAPLE) | ONE-POINT STAPLE |
| 5 (WATERMARK) | TEXT "DO NOT COPY", COLOR "GRAY", SIZE "···", ··· |
| ⋮ | ⋮ |

DATA PROCESSING SETTING APPARATUS, DATA PROCESSING SETTING METHOD, DATA PROCESSING SETTING PROGRAM, AND COMPUTER READABLE RECORDING MEDIUM RECORDING THE PROGRAM

This Nonprovisional application claims priority under 35 U.S.C. § 119(a) on Patent Application No. 148762/2005 filed in Japan on May 20, 2005, the entire contents of which are hereby incorporated by reference.

FIELD OF THE INVENTION

The present invention relates to a data processing setting apparatus which, when setting the data processing, sets a desired function selected from a plurality of functions of data processing.

BACKGROUND OF THE INVENTION

In the case of a conventional interface for allowing a user to select a desired function from a plurality of functions of data processing, (i) a plurality of icons are displayed on the screen of a display device, and (ii) a desired icon is selected from these icons by, for example, clicking of a pointing device, so that an application software, etc. corresponding to the selected icon runs.

However, in the case of a small screen, it is necessary to arrange a plurality of icons closely, and this arrangement makes the visibility of the icons low. In such a case, it is difficult for the user to select the icon.

In the case of another interface, (i) the functions are hierarchized, (ii) only higher-level icons are arranged on the screen, and (iii) lower-level icons are displayed by clicking the higher-level icon. In this case, all the icons are not displayed on an initial screen image, so that it is difficult for the user to recognize all the functions of the data processing.

Here, Japanese Unexamined Patent Publication No. 2001-282415 (Tokukai 2001-282415, published on Oct. 12, 2001) discloses an information selection system in which (i) a pointer is fixedly displayed at a predetermined position of a display screen, (ii) plural pieces of information are sequentially displayed so that each piece of information passes through the predetermined position, and (iii) a user selects desired piece of information by the pointer when the desired piece of information is displayed at the predetermined position.

However, according to the information selection system disclosed in Japanese Unexamined Patent Publication (Tokukai 2001-282415, published on Oct. 12, 2001), when the system allows a user to sequentially set plural pieces of information, it is difficult for the user to confirm which piece of information has already been set. Therefore, the user carries out unnecessary operations, such as an operation of selecting a piece of information that has already been set.

SUMMARY OF THE INVENTION

An object of the present invention is to provide (i) a data processing setting apparatus, data processing setting method, and data processing setting program each of which allows a user to easily confirm a function(s) which has already been set, and (ii) a computer-readable recording medium recording the program.

To achieve the above-described object, a data processing setting apparatus of the present invention includes (I) display control means for displaying plural kinds of function information on a setting screen image for setting a data processing, each of the plural kinds of function information indicating a function of the data processing and being able to be identified by the function, (II) function setting means for (i) selecting the function corresponding to the function information selected, in response to an input instruction, from plural pieces of function information among the plural kinds of function information, the plural pieces of function information being displayed on the setting screen image, and (ii) setting the selected function, and (III) set information display processing means for displaying set information in a region of the setting screen image, not in a region in which the plural kinds of function information are displayed by the display control means, the set information corresponding to the function set by the function setting means and indicating that the function has already been set.

According to the above-described configuration, a user can input a desired piece of function information while watching the function information displayed by the display control means, so that the user can set the function corresponding to the desired piece of function information. Further, the set information corresponding to the function set by the function setting means and indicating that the function has already been set is displayed in a region of the setting screen image, not in the region in which the plural kinds of function information are displayed by the display control means. Therefore, the user can watch the function information and also confirm the set information displayed on the same screen image. On this account, the user can easily confirm the set function without any operation. Thus, the user does not mistakenly set the set function.

Moreover, a data processing setting method of a data processing setting apparatus includes (I) a display control step of displaying plural kinds of function information on a setting screen image for setting a data processing, each of the plural kinds of function information indicating a function of the data processing and being able to be identified by the function, (II) a function setting step of (i) selecting the function corresponding to the function information selected, in response to an input instruction, from plural pieces of function information among the plural kinds of function information, the plural pieces of function information being displayed on the setting screen image, and (ii) setting the selected function; and (III) a set information display processing step of displaying set information in a region of the setting screen image, not in a region in which the plural kinds of function information are displayed in the display control step, the set information corresponding to the function set in the function setting step and indicating that the function has already been set. On this account, this method also allows the user to easily confirm the set function without any operation. Thus, the user does not mistakenly set the set function.

Note that the data processing setting apparatus may be realized by a computer, and in this case, (i) a data processing setting program causing a computer to realize the processing setting apparatus by causing the computer to function as the above-described respective means and (ii) a computer-readable recording medium recording this program are also encompassed in the present invention.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 4 is a diagram showing one example of a table managed by a table managing section.

FIG. 5 is a diagram showing respective frame images of advanced function icons managed by the table managing section.

FIG. 6 is a diagram showing one example of a function type table managed by a function type managing section.

FIG. 7 is a diagram showing one example of a dialog box table managed by a dialog box managing section.

FIG. 38 is a diagram showing one example of an impossible combination table.

FIG. 40 is a diagram showing one example of how the advanced function condition storing section stores information.

DESCRIPTION OF THE EMBODIMENTS

The present invention relates to a data processing setting apparatus including an interface which allows a user to select a desired function from a plurality of functions of information processing. Examples of the information processing of the functions of the data processing setting apparatus of the present invention are (i) a print processing with respect to a printer, (ii) processings in various applications (document processing software, image editing software, etc.), (iii) a control processing with respect to a manufacturing apparatus, etc. In the present embodiment, used as a specific example is an interface which allows a user to select a desired function from a plurality of functions regarding a processing of generating a print job for a printer, however the present invention is not limited to this.

Configuration of Network Print System

Figure 1:
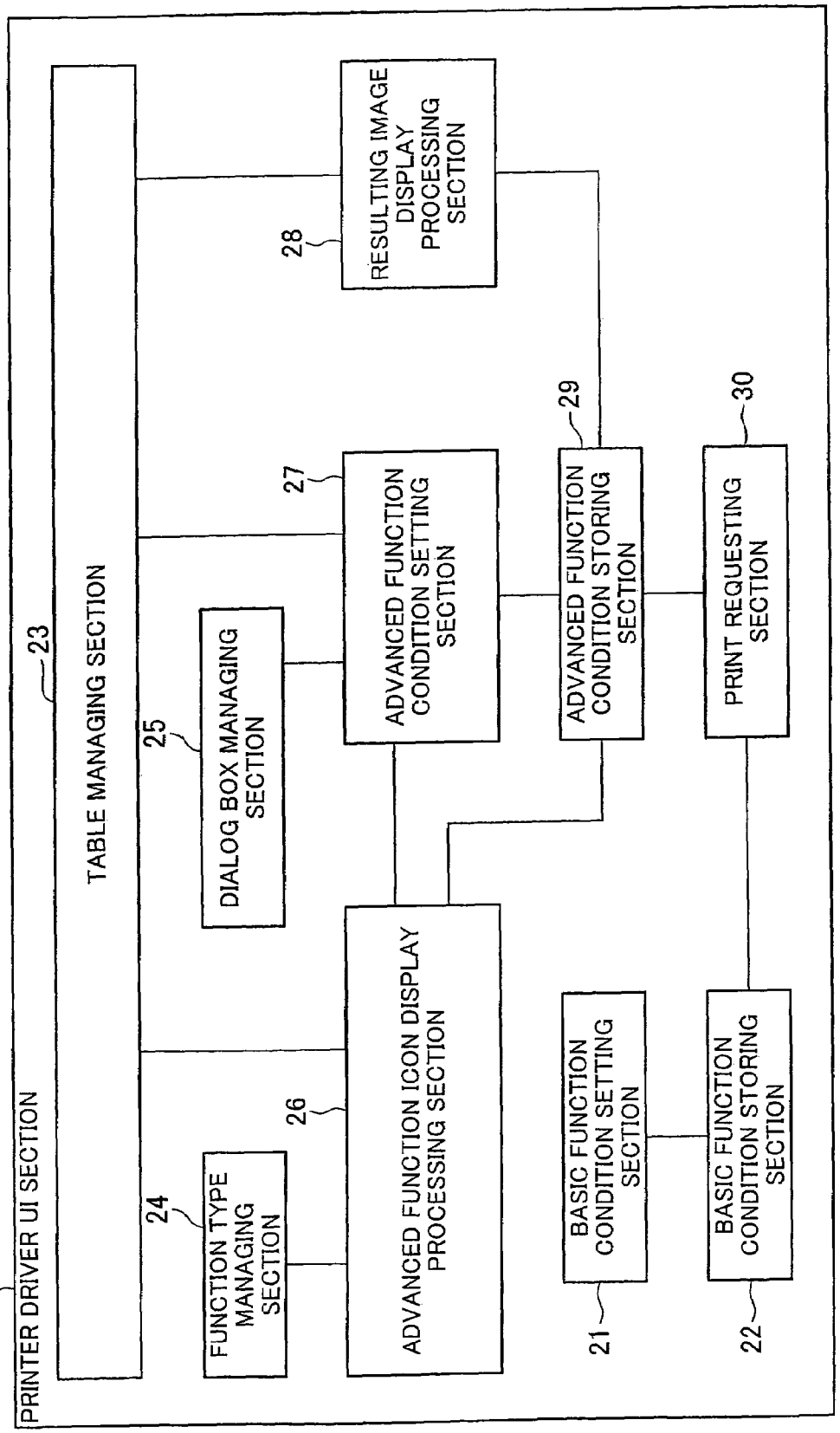
FIG. 1 is a block diagram showing a configuration of a printer driver UI section of the present embodiment.
Figure 2:
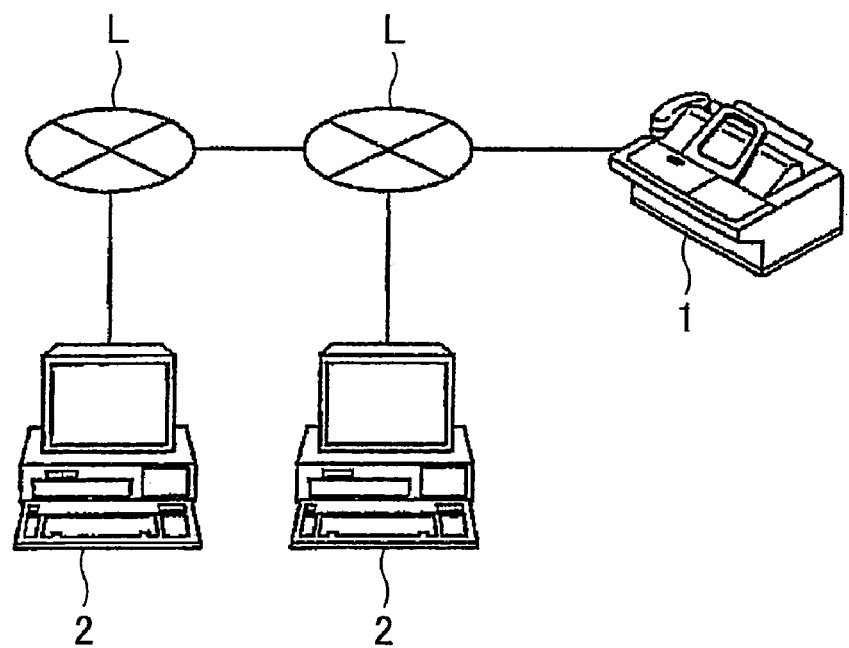
FIG. 2 is a block diagram showing a configuration of a network print system of the present embodiment.

The following explains one embodiment of the present invention in reference to FIGS. 1 to 40. FIG. 2 is a block diagram showing a configuration of a network print system of the present embodiment. As shown in FIG. 2, the network print system includes a printer 1, a plurality of personal computers (hereinafter referred to as "PC") (data processing setting apparatus) 2, and a communication network (hereinafter referred to as "network") L. The printer 1 and the PC 2 can communicate with each other via the network L. Note that the network L may be, for example, a LAN (local area network), or the like. Moreover, the PC 2 and the printer 1 may be connected with each other by a USB, or the like.

The PC 2 outputs to the printer 1 a print job which requests printing of (i) an image created by a document processing software, an illustration processing software, or the like, or (ii) a photograph image shot by a digital camera, or the like.

The printer 1 forms an image, corresponding to the print job, on a recording medium, such as a sheet, and outputs the recording medium.

Configuration of PC

Figure 3:
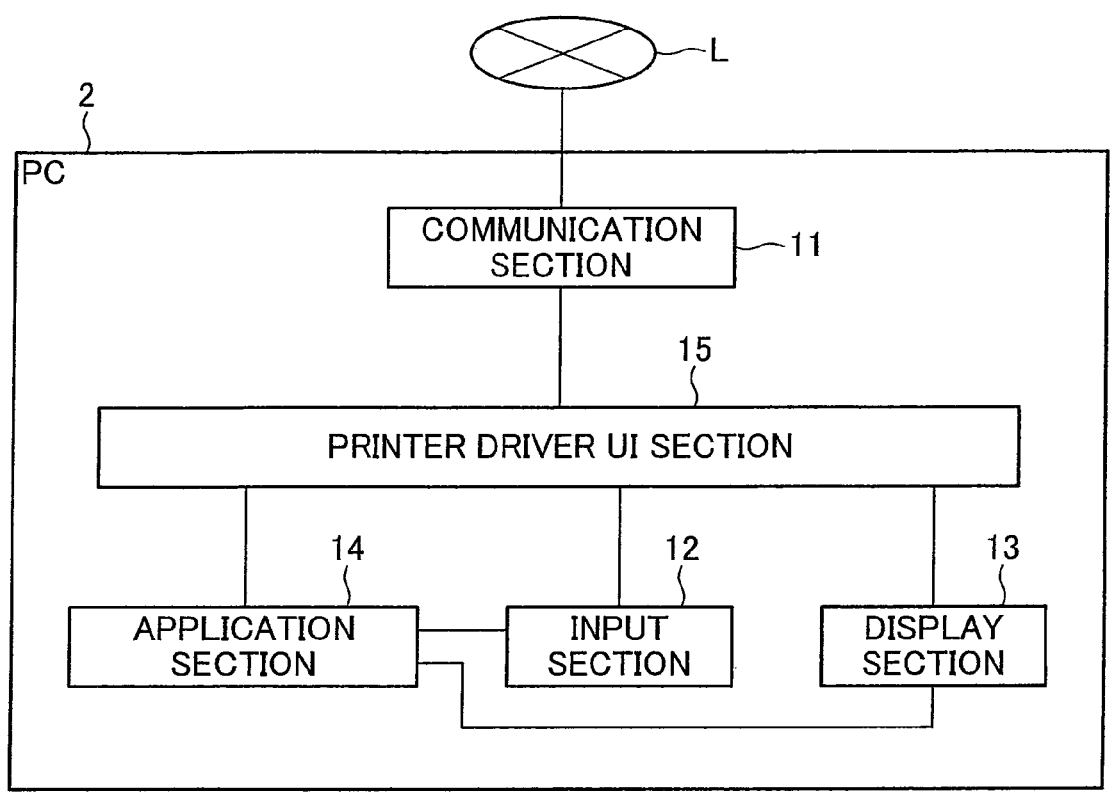
FIG. 3 is a block diagram showing a configuration of a PC of the network print system.

FIG. 3 is a block diagram showing a schematic configuration of the PC 2. As shown in FIG. 3, the PC 2 includes a communication section 11, an input section 12, a display section 13, an application section 14, and a printer driver UI section 15.

The PC 2 has an operating system (OS) (not shown), and data and instructions are being passed between respective blocks of the PC 2 via the operating system.

The communication section 11 is provided for communicating with the printer 1 via the network L. The communication section 11 is connected to the printer driver UI section 15, and outputs to the printer 1 the print job generated in the printer driver UI section 15.

The input section 12 includes a keyboard, a mouse, etc., and obtains instructions from a user. For example, when a user inputs an instruction, such as an application startup, an edition of an image, document, etc. on the application, the input section 12 sends the instruction to the application section 14. Thus, the user can carry out the start-up of the application section 14 or the edition on the application section 14. Moreover, at the time of starting up the application section 14, the input section 12 receives an input of a print setting instruction of a created/edited document, etc.

In the present embodiment, the input section 12 includes the mouse, and accepts clicking of the mouse.

The display section 13 includes a liquid crystal display, etc., and displays a document and/or image of the application section 14, and a print condition setting screen image generated by the printer driver UI section 15.

The application section 14 may be a document processing software, a spreadsheet software, an image editing software, or the like, and is installed to the operating system (OS) (not shown) from a CD-ROM, etc. Moreover, upon receipt of the print setting instruction from the input section 12, the application section 14 causes the printer driver UI section 15 to start up, and outputs to the printer driver UI section 15 image data of a document, etc. corresponding to the print setting instruction.

The printer driver UI section 15 is a printer driver corresponding to the printer 1. The printer driver UI section 15 (i) processes the image data output from the application section 14, (ii) generates such a print job that the printer 1 carries out printing in accordance with a print condition desired by a user, and (iii) outputs the generated print job to the printer 1.

The printer driver UI section 15 causes the display section 13 to display the print condition setting screen image (for example, a screen image shown in FIG. 11), so as to allow a user to input a desired print processing function and its print condition. Then, the printer driver UI section 15 set the print condition of the print processing function in accordance with the input instruction.

Here, examples of the print processing function are as follows.

Number-of-copies Setting Function: a function of setting the number of copies

Color/Monochrome Printing Function: a function of switching between a color printing and a black-and-white (monochrome) printing Sheet Size Setting Function: a function of setting the size of a sheet on which an image is formed by the printer 1

Two-side printing function: a function of setting one-side printing, two-side printing, saddle stitch printing, etc.

N-UP Printing Function: a function of printing out a plurality of pages (N pages) on one sheet Fit Page Function: a function of adjusting the size of a document image so that the image fits the size of a print sheet Vertical/Horizontal Independent Magnification Function: a function of changing a horizontal to vertical ratio of an image Poster Print Function: a function of dividing an image of one page into a plurality of images, and printing the divided images onto different sheets Overlay Function: a function of causing an image to overlap with another image, and then printing out the resulting image Watermark Function: a function of printing a watermark, such as "CONFIDENTIAL", "IMPORTANT", etc.

Edge to Edge Function: a function of printing print data on a maximum printable region 180° Rotation Function: a function of rotating by 180° an image to be printed Line Width Adjusting Function: a function of adjusting a line width Punch Function: a function of forming a punch hole at the edge portion of a printed sheet Staple Function: a function of stapling together a plurality of sheets with a stapler Binding Margin Function: a function of forming a margin at the edge portion of a sheet as a binding margin Carbon Copy Function: a function of printing same data onto print sheets in a plurality of designated trays Sheet Inserting Function: a function of printing a specific page of print data onto a sheet different from sheets onto which the other pages of the print data are printed OHP Slip Sheet Inserting Function: a function of inserting a slip sheet between respective pages of print data Tandem Printing Function: a function of dividing a piece of print data and then simultaneously printing out the divided data using a plurality of printers Tab Printing Function: a function of carrying out printing on a tab portion of a tab sheet Paper Feeding Method Function: a function of selecting (i) a tray used for paper feeding and (ii) a sheet type Image Adjustment: a function of adjusting the brightness, contrast, etc. of a print image Among these print processing functions, there are some print processing functions processed only by the printer 1 and the other print processing functions. For example, the print processing function "Punch" is a function of forming a punch hole at the edge portion of a sheet on which an image is formed, and is processed only by the printer 1.

Meanwhile, the print processing function "Watermark" is a function of printing a watermark, such as "CONFIDENTIAL", onto an image. In this case, the printer driver UI section 15 can (i) generate such a print job that a watermark is added to an image, and (ii) output the print job to the printer 1. Such a print processing function is processed by the printer driver UI section 15.

Here, for the print processing function which is processed by the printer driver UI section 15, the printer driver UI section 15 generates print data to which a processing corresponding to this print processing function is carried out. For the print processing function which is processed only by the printer 1, the printer driver UI section 15 generates a processing instruction indicating the content of this print processing function. Then, the printer driver UI section 15 outputs to the printer 1 a print job containing the generated print data and processing instruction.

Configuration of Printer Driver UI Section

The following explains a detailed configuration of the printer driver UI section 15. FIG. 1 is a block diagram showing a configuration of the printer driver UI section 15.

As shown in FIG. 1, the printer driver UI section 15 includes a basic function condition setting section 21, a basic function condition storing section 22, a table managing section (set information managing section, resulting image managing section) 23, a function type managing section 24, a dialog box managing section 25, an advanced function icon display processing section 26, an advanced function condition setting section 27, a resulting image display processing section (resulting image display processing means) 28, an advanced function condition storing section 29, and a print requesting section 30. Note that each of the basic function condition setting section 21, the advanced function icon display processing section 26, and the advanced function condition setting section 27 is connected to the display section 13 and the input section 12, and obtains a signal from the input section 12 and carries out a display processing with respect to the display section 13. Moreover, the resulting image display processing section 28 is connected to the display section 13, and carries out the display processing with respect to the display section 13.

The basic function condition setting section 21 sets a print condition regarding functions (basic functions) predetermined as functions used often by a user among the above-described print processing functions. In the present embodiment, the basic function condition setting section 21 sets the print condition regarding the number-of-copies setting function, the sheet size setting function, the two-side printing function, the N-up printing function, and the color/monochrome printing function.

Upon startup of the printer driver UI section 15, the basic function condition setting section 21 displays default settings (for example, the number of copies "1", the two-side printing function "one-side printing", the sheet size "A4", the N-up printing function "1 up", the color/monochrome printing function "color printing") as the print conditions of the basic functions of the number of copies, the sheet size, the two-side printing, the N-up printing, and the color/monochrome printing. Further, the basic function condition setting section 21 displays keys which allow a user to change the print conditions of the basic functions to desired settings, and sets the print conditions of the basic functions in accordance with print condition change instructions input to the input section 12.

The basic function condition setting section 21 causes the basic function condition storing section 22 to store the set print conditions that are the print conditions which have already been set. When the change instruction of the basic function of the print condition is not input to the input section 12, the basic function condition setting section 21 causes the basic function condition storing section 22 to store the default.

The basic function condition storing section 22 stores the print condition, of the basic function, set by the basic function condition setting section 21. The information stored in the basic function condition storing section 22 is updated by the basic function condition setting section 21.

The table managing section 23 manages information regarding an advanced function(s) that is the print processing function other than the basic function(s). Specifically, the table managing section 23 manages an advanced function information table which associates control numbers of the advanced functions with (i) advanced function icons (large size, middle size, small size) of moving images corresponding to the advanced functions, (ii) advanced function names indicating the contents of the advanced functions, (iii) dialog box numbers of dialog boxes for setting the print conditions of the advanced functions, (iv) the print conditions, (v) set icons (that are icons which have already been set) corresponding to (a) the advanced functions or (b) the advanced functions and the print conditions, (vi) resulting images that are print results corresponding to (a) the advanced functions or (b) the advanced functions and the print conditions, and (vii) the numbers of frames of the advanced function icons corresponding to the advanced functions.

FIG. 4 is a diagram showing one example of the advanced function information table managed by the table managing section 23. Note that FIG. 4 shows only final frame images as the advanced function icons, however the table managing section 23 manages respective frame images as the advanced function icon that is the moving image. That is, as shown in FIG. 5, the table managing section 23 manages all the frame images of each of the advanced function icons of the control numbers. Moreover, the moving image of the advanced function icon is created in advance for explaining the content of the corresponding advanced function. The moving image is larger in amount of information than a still image, so that the moving image can introduce the content of the advanced function to a user more clearly than the still image. For example, as shown in FIG. 5, in the case of the poster print function, the advanced function icon shows that (i) a document image is enlarged, (ii) the enlarged document image is divided into a plurality of document images, and (iii) each of the divided document images is printed onto one sheet. With this, a user can easily understand the content of the poster print function.

Note that the set function icons (that are the function icons which have already been set) and the resulting images are set in advance by selecting from the frame images (for example, the final frame image) of the advanced function icon or the other images so that a user can easily understand the content of the advanced function.

The function type managing section 24 manages the types of the advanced functions. The advanced functions are classified into a finish setting function, a color setting function, and an image setting function in accordance with the content of the processing of each advanced function.

The finish setting function is a function regarding the final finish of the recording medium, such as a print sheet. Examples of the finish setting function are "Punch", "Staple" "Binding Margin", and "Sheet Insertion". The color setting function is a function regarding a color adjustment and color conversion of an image to be printed. Examples of the color setting function are "Image Adjustment", "Document Type", and "Color Mode". The image setting function is a function regarding a processing of changing how the image to be finally printed is outputted. Examples of the image setting function are "Fit Page", "Watermark", "Overlay", and "Poster Print".

The function type managing section 24 manages a function type table which associates the control numbers, corresponding to the advanced functions managed by the table managing section 23, with the types of the advanced functions of these control numbers. FIG. 6 is a diagram showing one example of the function type table managed by the function type managing section 24. As shown in FIG. 6, for example, the function type managing section 24 associates the type "Color Setting" with the control numbers "7, 8, 9", and manages the type and the control numbers.

The dialog box managing section 25 manages a dialog box table which associates the dialog box numbers, managed by the table managing section 23, with the dialog boxes for setting detailed print conditions of the advanced functions corresponding to these dialog box numbers. FIG. 7 is a diagram showing one example of the dialog box table managed by the dialog box managing section 25.

As shown in FIG. 7, the dialog box managing section 25 associates the dialog box number W1 with (a) the print conditions of "Binding Margin" that is the advanced function corresponding to the dialog box number W1, that is, (b) a dialog box which allows a user to input the position and width of the binding margin. Thus, the dialog box managing section 25 manages (a) the print conditions of "Binding Margin" that is the advanced function corresponding to the dialog box number W1, that is, (b) the dialog box which allows a user to input the position and width of the binding margin. Similarly, the dialog box managing section 25 associates the dialog box number W2 with (a) the print conditions of "Staple" and "Punch" that are the advanced function corresponding to the dialog box number W2, that is, (b) a dialog box which allows a user to input any one of "One-point Staple", "Two-point Staple", and "Punch". Thus, the dialog box managing section 25 manages (a) the print conditions of "Staple" and "Punch" that are the advanced function corresponding to the dialog box number W2, that is, (b) the dialog box which allows a user to input any one of "One-point Staple", "Two-point Staple", and "Punch". Moreover, the dialog box managing section 25 associates the dialog box number W3 with (a) the print conditions of "Poster Print" that is the advanced function corresponding to the dialog box number W3, that is, (b) a dialog box which allows a user to input the number of sheets, presence or absence of the frame border, and presence or absence of the overlap width which constitute a poster. Thus, the dialog box managing section 25 manages (a) the print conditions of "Poster Print" that is the advanced function corresponding to the dialog box number W3, that is, (b) the dialog box which allows a user to input the number of sheets, presence or absence of the frame border, and presence or absence of the overlap width which constitute a poster. Further, the dialog box managing section 25 associates the dialog box number W4 with (a) the print conditions of "Watermark" that is the advanced function corresponding to the dialog box number W4, that is, (b) a dialog box which allows a user to input information regarding a text added to image data. Thus, the dialog box managing section 25 manages (a) the print conditions of "Watermark" that is the advanced function corresponding to the dialog box number W4, that is, (b) the dialog box which allows a user to input information regarding the text added to the image data.

The advanced function icon display processing section 26 reads out the advanced function icons from the table managing section 23, and carries out such a processing that the read-out advanced function icons are sequentially displayed while being moved in a horizontal direction in a predetermined region of the print condition setting screen image displayed in the display section 13. With this, a user can recognize all the advanced functions displayed sequentially, and can select a desired advanced function. Note that the detailed configuration of the advanced function icon display processing section 26 will be described later.

The advanced function condition setting section 27 causes the display section 13 to display the dialog box managed by the dialog box managing section 25. Thus, the advanced function condition setting section 27 allows a user to input the detailed print condition of the advanced function, and set the print condition of the advanced function in accordance with an instruction input to the input section 12. Moreover, the advanced function condition setting section 27 associates the print condition of the set advanced function (that is the advanced function which has already been set) with the control number corresponding to this set advanced function, and causes the advanced function condition storing section 29 to store the print condition of the set advanced function and the control number corresponding to the advanced function. Moreover, the advanced function condition setting section 27 causes (a) the set function icon indicating the set advanced function or (b) the set function icon indicating the set advanced function and the print condition to be displayed in a predetermined region of the print condition setting screen image. Note that the detailed configuration of the advanced function condition setting section 27 will be described later.

The advanced function condition storing section 29 associates the print condition of the advanced function, set by the advanced function condition setting section 27, with the control number corresponding to this advanced function, and stores (i) the print condition of the advanced function set by the advanced function condition setting section 27 and (ii) the control number corresponding to the advanced function. The information stored in the advanced function condition storing section 29 is updated by the advanced function condition setting section 27. Note that the advanced function condition storing section 29 stores a locked flag indicating whether or not it is possible to carry out rewriting, such as new writing, editing, etc of the control number and/or the print condition. When the locked flag is "0", (a) the deletion or edition of the stored control number and print condition and (b) the new writing of the control number and print condition can be carried out with respect to the advanced function condition storing section 29. Meanwhile, when the locked flag is "1", (a) the deletion or edition of the stored control number and print condition and (b) the new writing of the control number and print condition cannot be carried out with respect to the advanced function condition storing section 29. As will be described later, the locked flag is changed by the advanced function condition setting section 27.

FIG. 40 is a diagram showing one example of how the advanced function condition storing section 29 stores information. The advanced function condition storing section 29 stores, for example, the set control number "3" and the print condition "One-point Staple" as shown in FIG. 40, and also stores the locked flag "0" (not shown).

The resulting image display processing section 28 reads out from the table managing section 23 (a) the resulting image corresponding to the advanced function stored in the advanced function condition storing section 29 or (b) the resulting image corresponding to the advanced function and the print condition, and causes the read-out resulting image to be displayed in a predetermined region of the print condition setting screen image. When the advanced function condition storing section 29 stores a plurality of advanced functions, the resulting image display processing section 28 reads out from the table managing section 23 a plurality of resulting images corresponding to the plurality of advanced functions, and carries out a synthesis processing of the plurality of read-out resulting images. Then, the resulting image display processing section 28 displays the resulting image obtained by the synthesis processing.

The print requesting section 30 outputs to the printer 1 the print job which requests printing of an image. Upon clicking of the print instruction key displayed on the print condition setting screen image, the print requesting section 30 reads out (a) the print condition of the basic function from the basic function condition storing section 22 and (b) the print condition of the advanced function from the advanced function condition storing section 29. Then, the print requesting section 30 carried out an image processing, corresponding to the read-out print condition, with respect to the image data received from the application section. Thus, the print requesting section 30 generates the print data. Regarding the print condition of the function which is processed only by the printer 1, the print requesting section 30 generates the processing instruction indicating this print condition. The print requesting section 30 outputs to the printer 1 the print job containing the generated print data and processing instruction.

Configuration of Advanced Function Icon Display Processing Section

Figure 8:
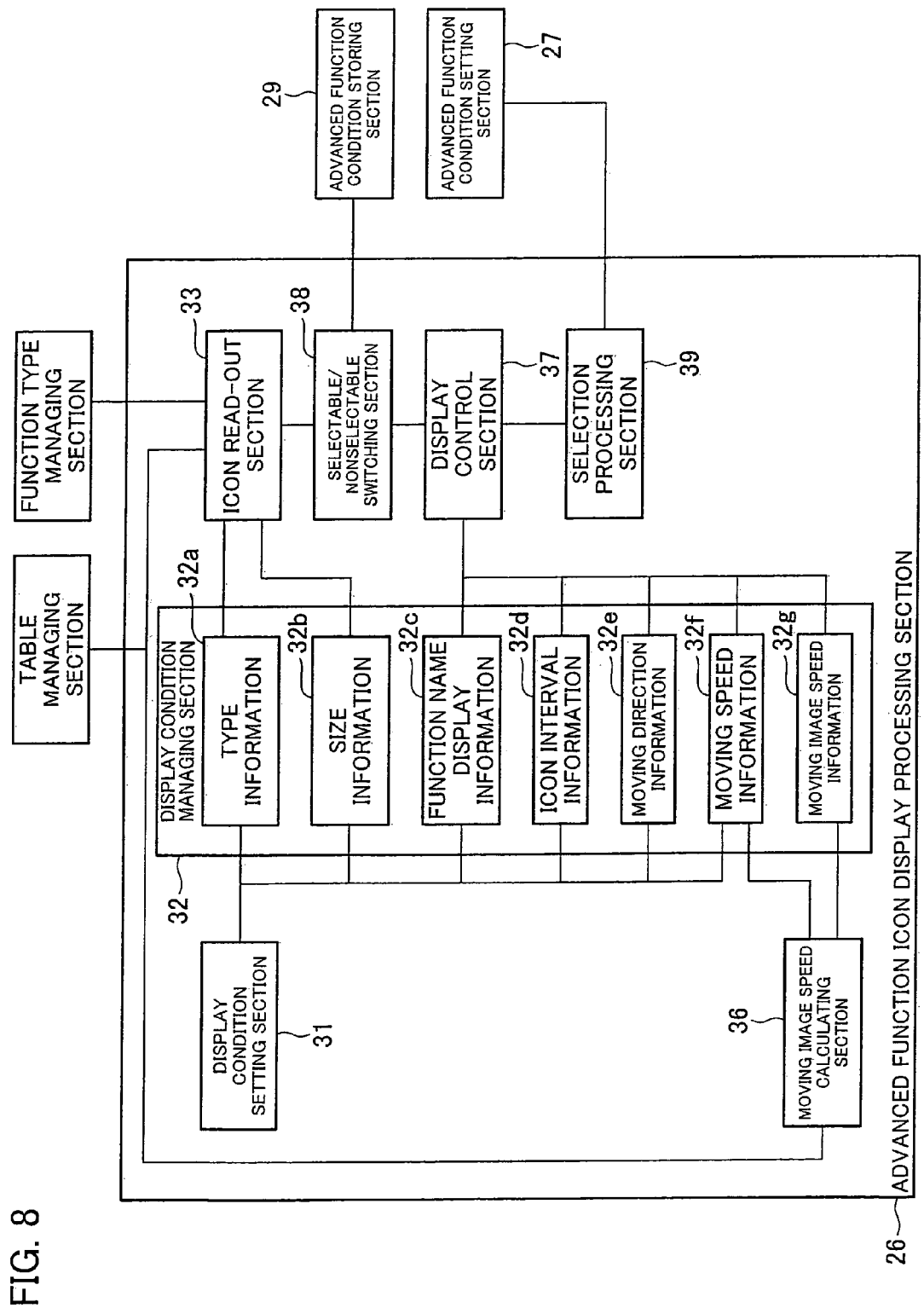
FIG. 8 is a block diagram showing a configuration of an advanced function icon display processing section.

The following explains the advanced function icon display processing section 26 in detail. FIG. 8 is a block diagram showing a configuration of the advanced function icon display processing section 26 and related peripheral components. As shown in FIG. 8, the advanced function icon display processing section 26 includes a display condition setting section 31, a display condition managing section 32, an icon read-out section 33, a moving image speed calculating section 36, a display control section (display control means) 37, a selectable/nonselectable switching section 38, and a selection processing section (function setting means) 39.

The display condition setting section 31 sets a display condition used when displaying the advanced function icon(s) in a predetermined region (for example, a region B shown in FIG. 11) of the print condition setting screen image.

As will be described later, in the present embodiment, the advanced function icons are sequentially displayed while being moved in a horizontal direction in the region B. Here, the display condition setting section 31 of the present embodiment sets, as the display condition, the presence or absence of the display of the advanced function name, the moving direction of the advanced function icon, the icon interval between any two adjacent advanced function icons, and the moving speed of the advanced function icon. Further, the display condition setting section 31 also sets the type of the advanced function and the icon size to specify the advanced function icon to be displayed. That is, the display conditions set by the display condition setting section 31 are the type of the advanced function, the icon size, the presence or absence of the display of the advanced function name, the icon interval, the moving direction, and the moving speed.

At the time of the startup of the printer driver UI section 15, the display condition setting section 31 sets respective display conditions by predetermined default, and causes the display condition change key(s) to be displayed on the print condition setting screen image for allowing a user to change the respective display conditions. Then, the display condition setting section 31 resets the respective display conditions in accordance with the display condition change instruction input by the display condition change key.

Note that the display condition setting section 31 carries out setting so that (i) the type of the advanced function is any one of "All", "Color Setting", "Image Setting", and "Finish Setting", (ii) the icon size is any one of "Large", "Middle", and "Small", (iii) the presence or absence of the display of the advanced function name is either "Present" or "Absent", (iv) the moving speed is any one of five levels from "1" to "5", (v) the icon interval is any one of ten levels from "1" to "10", and (vi) the moving direction is either "left direction" or "right direction".

Moreover, the default of the present embodiment is (i) the type of the advanced function "All", (ii) the icon size "Large", (iii) the presence or absence of the display of the advanced function name "Present", (iv) the icon interval "1", (v) the moving direction "left direction", and (vi) the moving speed "3".

The display condition setting section 31 generates (i) type information $32a$ indicating the type of the set advanced function, (ii) size information $32b$ indicating the set icon size, (iii) function name display information $32c$ indicating the presence or absence of the display of the set advanced function name, (iv) icon interval information $32d$ indicating the set icon interval, (v) moving direction information $32e$ indicating the set moving direction, and (vi) moving speed information $32f$ indicating the set moving speed. The display condition setting section 31 outputs the generated piece(s) of information to the display condition managing section 32.

The moving image speed calculating section 36 calculates the moving image speed of the advanced function icon that is the moving image, that is, a display time of each frame.

The moving image speed calculating section 36 stores in advance the size of a predetermined region (for example, the region B shown in FIG. 11) of the print condition setting screen image. Note that the size of the predetermined region corresponds to the moving distance of the advanced function icon. Moreover, the moving image speed calculating section 36 obtains the moving speed information $32f$ from the display condition managing section 32. Further, the moving image speed calculating section 36 reads out from the table managing section 23 (i) the control number and (ii) the number of frames corresponding to this control number.

By Formula (1) below using the moving speed, the size of the region B, and the number of frames, the moving image speed calculating section 36 calculates the display time of a single frame for each control number. Then, the moving image speed calculating section 36 outputs to the display condition managing section 32 the moving image speed information $32g$ in which the calculated display time of a single frame is associated with the control number.

Moving Image Speed (Display Time of Single Frame)= (Size of Display Region)÷((Moving Speed)×(Number of Frames))  Formula (1)

The display condition managing section 32 manages (i) the type information $32a$, the size information $32b$, the function name display information $32c$, the icon interval information $32d$, the moving direction information $32e$, and the moving speed information $32f$ which are received from the display condition setting section 31, and (ii) the moving image speed information $32g$ which is received from the moving image speed calculating section 36. Moreover, upon receipt of new information from the display condition setting section 31 and/or the moving image speed calculating section 36, the display condition managing section 32 updates the information $32a$, $32b$, $32c$, $32d$, $32e$, $32f$, and/or $32g$ in accordance with the received information.

The icon read-out section 33 reads out from the table managing section 23 the advanced function icon(s) to be displayed.

Specifically, the icon read-out section 33 reads out from the function type managing section 24 the control number corresponding to the type information $32a$ managed by the display condition managing section 32. When the type information $32a$ indicates "All", the icon read-out section 33 reads out all the control numbers managed by the function type managing section 24. Further, the icon read-out section 33 reads out from the table managing section 23 the advanced function icon and advanced function name corresponding to (i) the control number read out from the function type managing section 24 and (ii) the size information $32b$ managed by the display condition managing section 32. Then, the icon read-out section 33 outputs to the selectable/nonselectable switching section 38 the control number, the read-out advanced function icon, and the read-out advanced function name.

The selectable/nonselectable switching section 38 carries out a gray mask processing with respect to the advanced function icon(s), which cannot be set by a user, among the advanced function icons read out by the icon read-out section 33. Note that the advanced function icon which has been subjected to the gray mask processing is not selectable. In the present embodiment, the advanced function icon(s) which cannot be set by a user denotes an icon(s) corresponding to the advanced function which has already been set.

Specifically, the selectable/nonselectable switching section 38 reads out the control number from the advanced function condition storing section 29 which stores the print condition and control number of the set advanced function. Then, the selectable/nonselectable switching section 38 carries out the gray mask processing with respect to the advanced function icon corresponding to the read-out control number. Then, the selectable/nonselectable switching section 38 associates the advanced function icon, which has been subjected to the gray mask processing, with the control number and advanced function name received from the icon read-out section 33, and then outputs to the display control section 37 the advanced function icon, the control number, and the advanced function name.

Regarding the control number(s) which is not stored in the advanced function condition storing section 29, the selectable/nonselectable switching section 38 directly outputs to the display control section 37 the control number, the advanced function icon, and the advanced function name received from the icon read-out section 33.

The display control section 37 sequentially and repeatedly displays the advanced function icons, received from the selectable/nonselectable switching section 38, in a predetermined region of the print condition setting screen image in accordance with the function name display information 32c, the icon interval information 32d, the moving direction information 32e, the moving speed information 32f, and the moving image speed information 32g which are managed by the display condition managing section 32. Note that the display control section 37 receives the advanced function icon, the control number, and the advanced function name from the selectable/nonselectable switching section 38.

When the moving direction information 32e managed by the display condition managing section 32 indicates "left direction", the display control section 37 sequentially displays the advanced function icons while causing the advanced function icons to move in ascending order of the control number from the right end to the left end in a predetermined region of the print condition setting screen image. Meanwhile, when the moving direction information 32e indicates "right direction", the display control section 37 sequentially displays the advanced function icons while causing the advanced function icons to move in descending order of the control number from the left end to the right end in a predetermined region of the print condition setting screen image. Here, the display control section 37 sets the interval between any two adjacent advanced function icons in accordance with the icon interval information 32d. Moreover, the display control section 37 reads out the moving image speed, corresponding to the control number, from the moving image speed information 32g of the display condition managing section 32, and displays the advanced function icon at the read-out moving image speed. Further, when the function name display information 32c managed by the display condition managing section 32 indicates "Present", the display control section 37 displays the advanced function name under the corresponding advanced function icon.

With this, a user can sequentially confirm the advanced function icons even in the case of a small screen. Moreover, by placing the pointer on a desired advanced function icon and clicking the icon, a user can carry out a setting instruction of the print condition of the advanced function.

When the clicking is input to the input section 12 and the pointer in the print condition setting screen image is placed on any one of a plurality of advanced function icons displayed by the display control section 37, the selection processing section 39 judges that the advanced function icon on which the pointer is placed is selected. Since the pointer can be moved to any position in the print condition setting screen image, a user can place the pointer on any of the advanced function icons displayed simultaneously. Therefore, the selection processing section 39 can select any one of a plurality of advanced function icons (except for the advanced function icon(s) which has been subjected to the gray mask processing) displayed simultaneously in a predetermined region of the print condition setting screen image displayed by the display control section 37.

Specifically, the selection processing section 39 judges whether or not the advanced function icon on which the pointer is placed is the advanced function icon which has been subjected to the gray mask processing. Then, when the advanced function icon on which the pointer is placed is not the advanced function icon which has been subjected to the gray mask processing, the selection processing section 39 stops the movement of the advanced function icons, and outputs to the advanced function condition setting section 27 the control number corresponding to the clicked advanced function icon.

Configuration of Advanced Function Condition Setting Section

Figure 9:
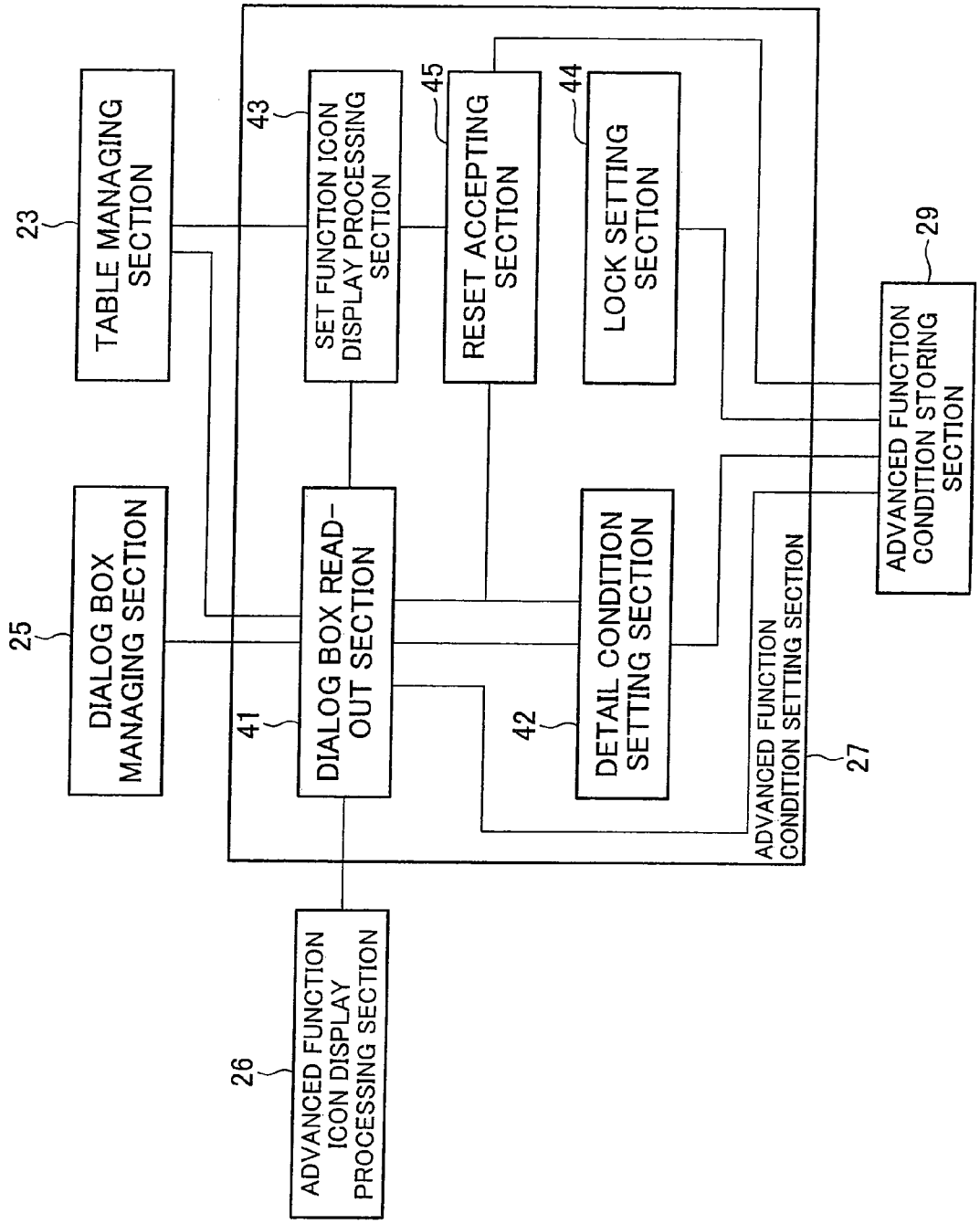
FIG. 9 is a block diagram showing a configuration of an advanced function condition setting section.

The following explains a detailed configuration of the advanced function condition setting section 27. FIG. 9 is a block diagram showing the configuration of the advanced function condition setting section and related peripheral components. As shown in FIG. 9, the advanced function condition setting section 27 includes a dialog box read-out section 41, a detail condition setting section (function setting means) 42, a set function icon display processing section (set information display processing means) 43, a lock setting section 44, and a reset accepting section 45.

In accordance with a lock instruction or unlock instruction input to the input section 12, the lock setting section 44 switches whether or not the control number and print condition stored in the advanced function condition storing section 29 can be changed.

Specifically, when the lock instruction is input to the input section 12, the lock setting section 44 sets the locked flag, stored in the advanced function condition storing section 29, to "1". Meanwhile, when the unlock instruction is input to the input section 12, the lock setting section 44 sets the locked flag, stored in the advanced function condition storing section 29, to "0".

When receiving the control number from the advanced function icon display processing section 26 or the reset accepting section 45, the dialog box read-out section 41 reads out from the table managing section 23 the dialog box number corresponding to this control number, and then reads out from the dialog box managing section 25 the dialog box corresponding to the read-out dialog box number. Moreover, the dialog box read-out section 41 associates the control number with the dialog box read out from the dialog box managing section 25, and outputs to the detail condition setting section 42 the control number and the dialog box.

When the dialog box read-out section 41 confirms the locked flag stored in the advanced function condition setting section 29 and the confirmed locked flag is "1", the dialog box read-out section 41 does not read out the dialog box.

The detail condition setting section 42 causes the display section 13 to display the dialog box received from the dialog box read-out section 41. Thus, the detail condition setting section 42 allows a user to input the detailed print condition of the advanced function, and sets the print condition of the advanced function in accordance with the input instruction. The detail condition setting section 42 associates the input print condition with the control number received from the dialog box read-out section 41, and stores the input print condition and the control number in the advanced function condition storing section 29.

At the time of the startup of the printer driver UI section 15 or at the time of the update of the control number and print condition managed by the advanced function condition storing section 29, the set function icon display processing section 43 carries out a processing for displaying the set function icon, indicating the set advanced function, in a predetermined region of the print condition setting screen image.

Specifically, the set function icon display processing section 43 reads out from the table managing section 23 the set function icon corresponding to the control number and print condition managed by the advanced function condition storing section 29, and displays the read-out set function icon.

Moreover, when any one of the set function icons displayed on the print condition setting screen image is clicked, the set function icon display processing section 43 outputs to the reset accepting section 45 the control number corresponding to the clicked set function icon.

The reset accepting section 45 accepts resetting of the set advanced function. When receiving the control number from the set function icon display processing section 43, the reset accepting section 45 selects either modification or deletion of the advanced function in accordance with an input from a user. Then, when selecting the deletion, the reset accepting section 45 deletes from the advanced function condition storing section 29 (i) the control number received from the set function icon display processing section 43 and (ii) the print condition corresponding to this control number. When selecting the modification, the reset accepting section 45 outputs to the dialog box read-out section 41 the control number received from the set function icon display processing section 43.

Flow of Processing Carried Out by Printer Driver UI Section

Figure 10:
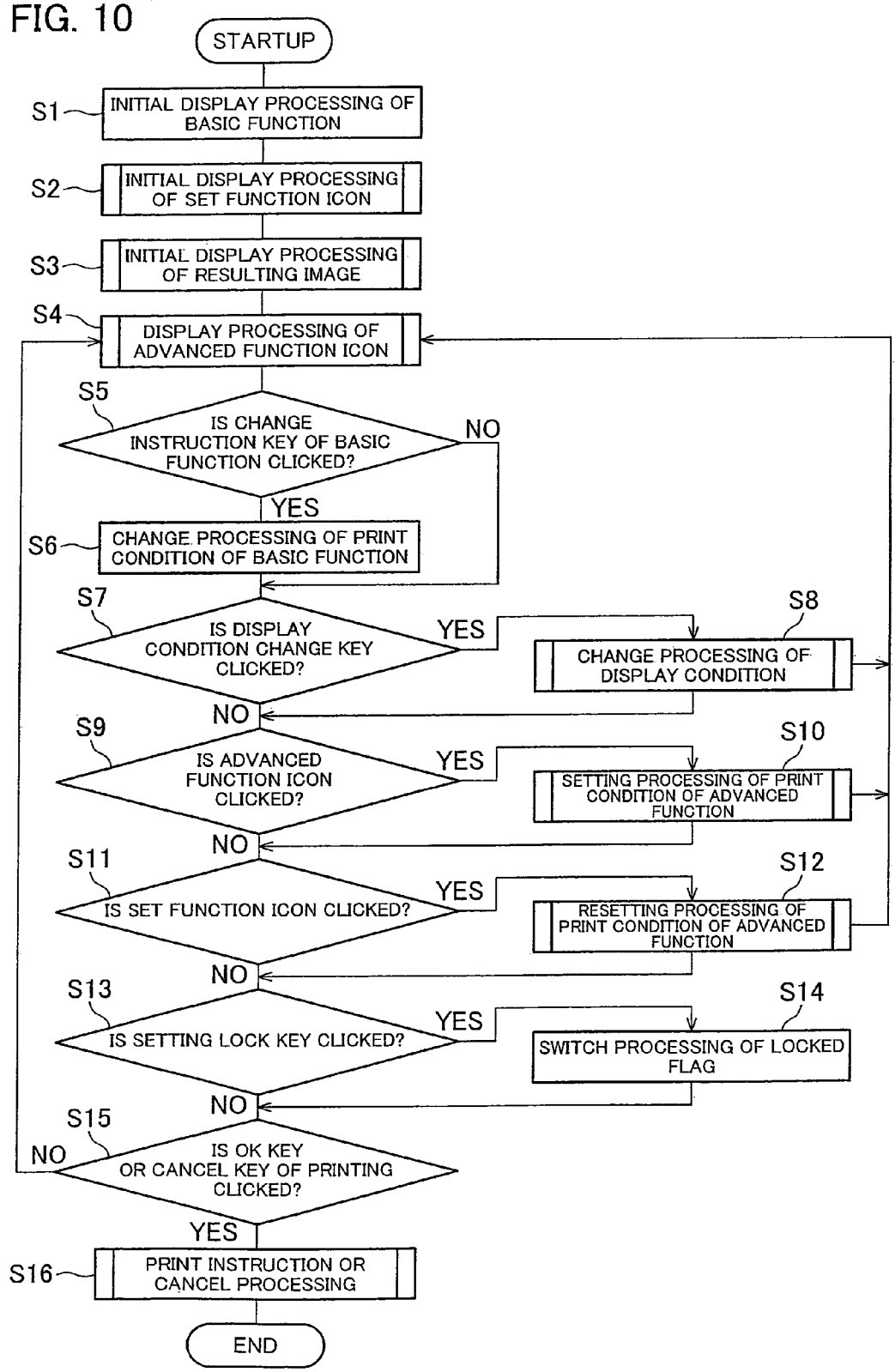
FIG. 10 is a flow chart showing the entire flow of a processing carried out by the printer driver UI section.

Referring to a flow chart shown in FIG. 10, the following explains the entire flow of a processing carried out by the printer driver UI section 15 of the present embodiment.

Figure 11:
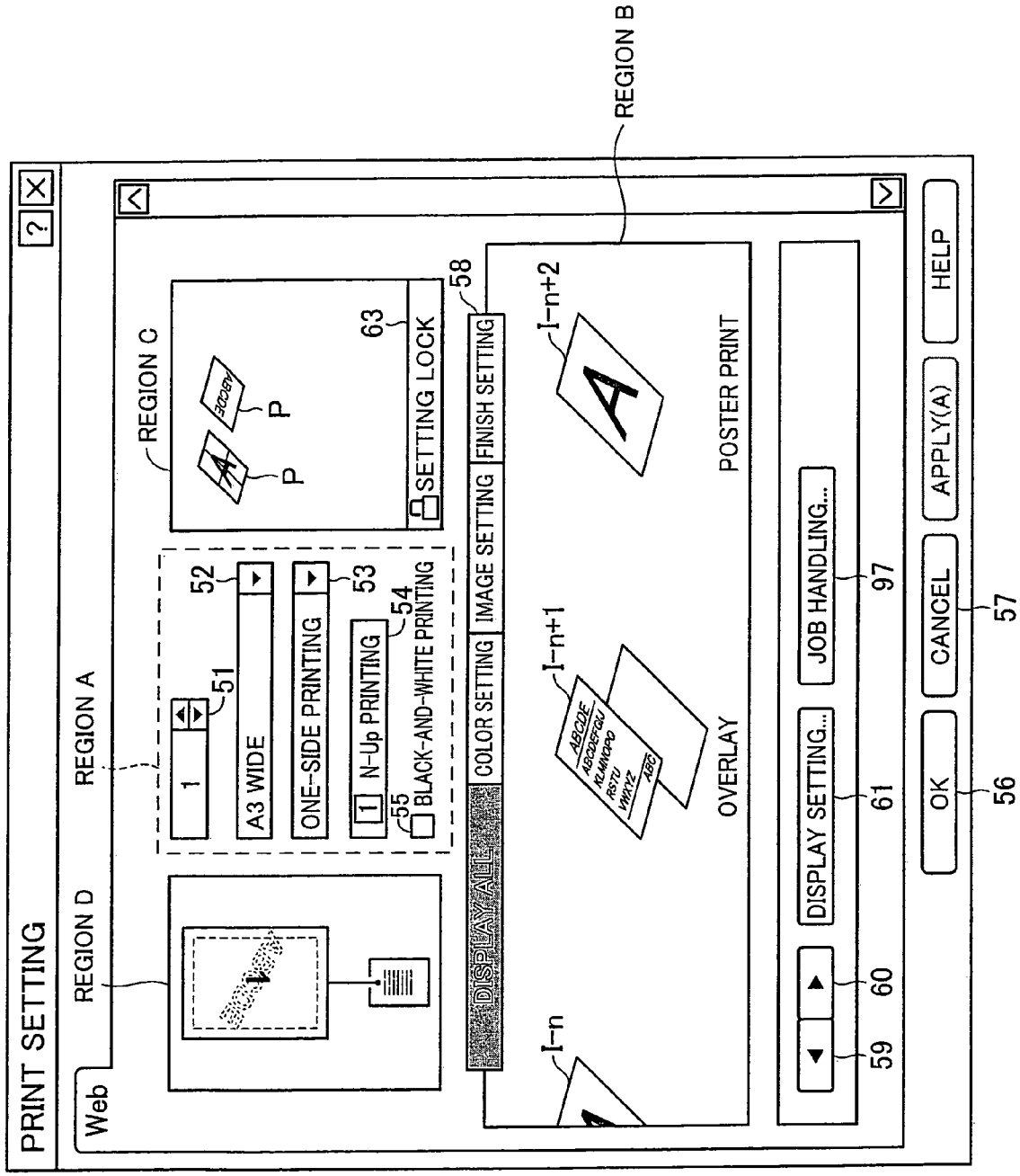
FIG. 11 is a diagram showing one example of a print condition setting screen image displayed by the printer driver UI section.

The printer driver UI section 15 starts up in response to the print setting instruction supplied from the application section 14, and causes the display section 13 to display the print condition setting screen image shown in FIG. 11.

First, the basic function condition setting section 21 displays the default of the print conditions of the basic functions and change instruction keys in a region A (see FIG. 11) of the print condition setting screen image, so as to allow a user to input desired print conditions regarding the basic functions (S1). At this time, the basic function condition setting section 21 stores the default as the print conditions of the basic functions in the basic function condition storing section 22.

Here, the default of the print conditions of the basic functions is the number-of-copies setting function "1 copy", the sheet size setting function "A4", the two-side printing function "one-side printing", the N-up printing function "1 up printing", the color/monochrome printing function "color printing".

Moreover, as shown in FIG. 11, examples of the change instruction key of the print condition of the basic function are an up-and-down setting key 51 for setting the number of copies, a pull-down key 52 for setting the sheet size, a pull-down key 53 for the two-side printing function, an N-up printing key 54, and a check box 55 for the black-and-white printing.

Next, the advanced function condition setting section 27 carries out an initial display processing, that is, the advanced function condition setting section 27 displays a set function icon(s) P in a region C (see FIG. 11) of the print condition setting screen image (S2). Note that the detailed processing of S2 will be described later.

Next, the resulting image display processing section 28 carries out the initial display processing, that is, the resulting image display processing section 28 displays in a region D (see FIG. 11) of the print condition setting screen image the resulting image indicating a result obtained when printing is carried out in accordance with the set advanced function(s) (S3). Note that the detailed processing of S3 will be described later.

Next, the advanced function icon display processing section 26 sequentially displays the advanced function icons I (I-n ("n" denotes the control number)) in the region B (see FIG. 11) of the print condition setting screen image by the default display condition, and allows a user to input the change instruction of the display condition and to select a desired advanced function (S4). Note that the detailed processing of S4 will be described later.

By the processing in S1 to S4, the display section 13 displays the print condition setting screen image shown in FIG. 11.

Then, the basic function condition setting section 21 judges whether or not the change instruction key (the up-and-down setting key 51 for setting the number of copies, the pull-down key 52 for setting the sheet size, the pull-down key 53 for the two-side printing function, the N-up printing key 54, or the check box 55 for the black-and-white printing) of the print condition of the basic function displayed in the region A is clicked (S5).

When any one or more of these change instruction keys is clicked (Yes in S5), the basic function condition setting section 21 carries out the change processing of the print condition of the basic function (S6).

Figure 12:
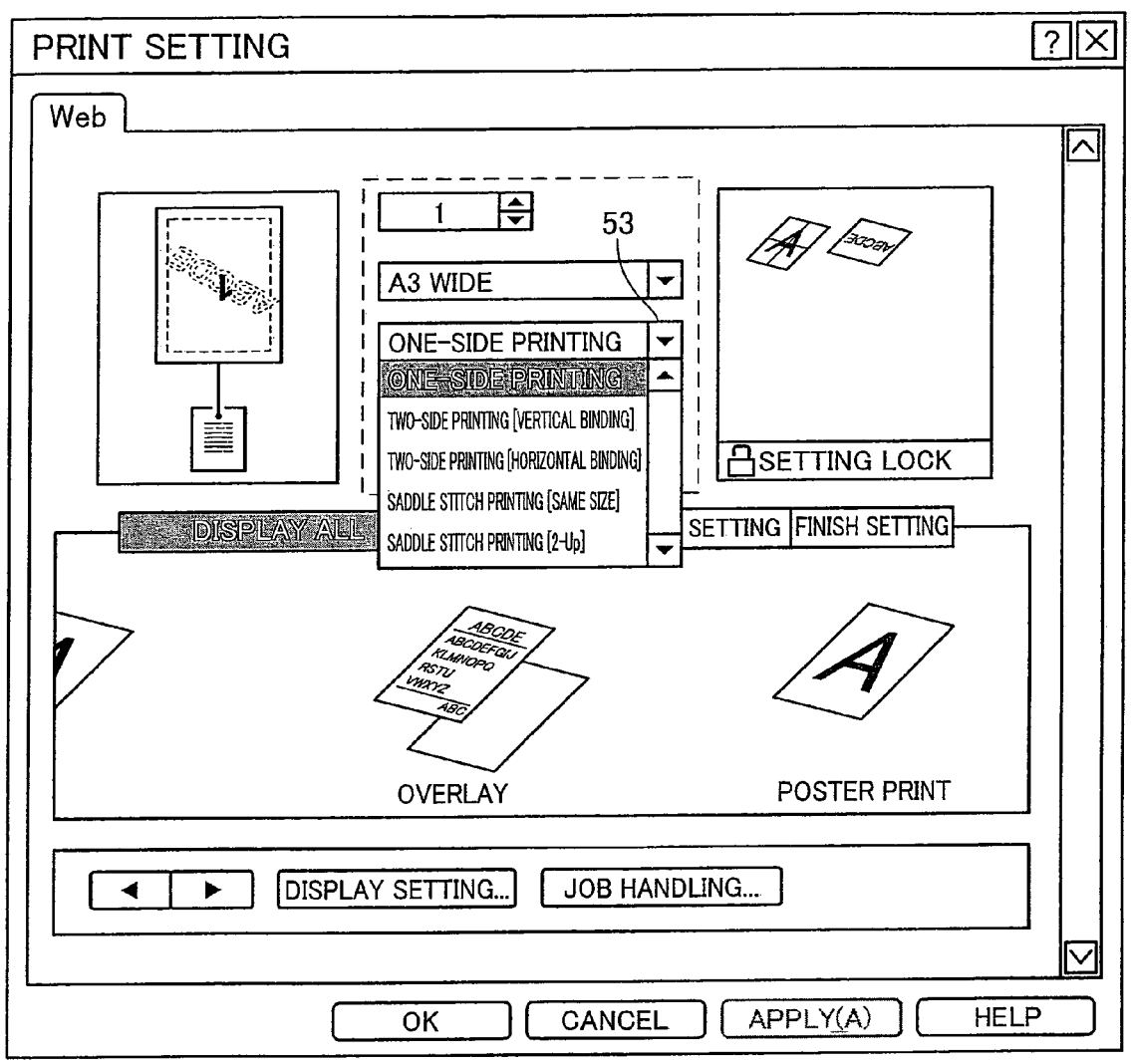
FIG. 12 is a diagram showing one example of the print condition setting screen image displayed when changing a print condition of a basic function.

Specifically, for example, when the pull-down key 52, shown in FIG. 11, for the two-side printing function is clicked, the basic function condition setting section 21 displays a list of the print conditions determined in advance as the two-side printing function, and this allows a user to select the print condition. FIG. 12 is a diagram showing one example of the print condition setting screen image in S6. Then, the basic function condition setting section 21 sets the selected print condition of the basic function on the basis of the change instruction input to the input section 12. At this time, the basic function condition setting section 21 updates the print condition of the basic function, stored in the basic function condition storing section 22, on the basis of the newly set print condition.

Meanwhile, when the change instruction key is not clicked (No in S5), the processing proceeds to S7.

Next, the display condition setting section 31 of the advanced function icon display processing section 26 judges whether or not the display condition change key of the advanced function icon displayed in the region B (see FIG. 11) of the print condition setting screen image is clicked (S7).

Figure 13:
FIG. 13 is a diagram showing one example of a size key showing the size of an advanced function icon.

Here, the display condition change keys of the advanced function icons are, as shown in FIG. 11, (i) a type item key 58 indicating the type of the advanced function icon, (ii) a left key 59 and a right key 60 for changing the moving direction and moving speed of the advanced function icon, and (iii) a display setting key 61 for changing the moving direction, the moving speed, and the icon interval, and as shown in FIG. 13, (iv) a pull-down key 62 for changing the size of the advanced function icon. Note that FIG. 11 does not show the pull-down key for changing the size of the advanced function icon, however the pull-down key 62 shown in FIG. 13 is provided at an appropriate position on the print condition setting screen image.

When any of the display condition change keys of these advanced function icons is clicked (Yes in S7), the advanced function icon display processing section 26 carries out the change processing of the display condition (S8). After S8, the processing proceeds to steps in S4 or to S9. Note that the detailed processing of S8 will be described later. Moreover, when the display condition change key of the advanced function icon is not clicked (No in S7), the processing proceeds to S9.

Next, the selection processing section 39 of the advanced function icon display processing section 26 judges whether or not any one of a plurality of advanced function icons I displayed in the region B (see FIG. 11) is clicked (S9).

When the advanced function icon I is clicked (Yes in S9), the advanced function condition setting section 27 carries out a set processing of the print condition of the advanced function corresponding to the clicked advanced function icon I (S10). After S10, the processing proceeds to steps in S4 or to S11. Note that the detailed processing of S10 will be described later. Meanwhile, even when the advanced function icon I is not clicked (No in S9), the processing proceeds to S11.

Next, the set function icon display processing section 43 of the advanced function condition setting section 27 judges whether any one of set function icons P displayed in the region C (see FIG. 11) is clicked (S11).

When the set function icon P is clicked (Yes in S11), the advanced function condition setting section 27 carries out a reset processing of the print condition regarding the advanced function corresponding to the clicked set function icon P (S12). After S12, the processing proceeds to steps in S4 or to S13. Note that the detailed processing of S12 will be described later. Meanwhile, even when the set function icon P is not clicked (No in S11), the processing proceeds to S13.

Next, the lock setting section 44 of the advanced function condition setting section 27 judges whether or not a setting lock key 63 shown in FIG. 11 is clicked (S13).

When the setting lock key 63 is clicked (Yes in S13), the lock setting section 44 switches the locked flag of the advanced function condition storing section 29 (S14). That is, when the locked flag is "0", it is switched to "1", and when the locked flag is "1", it is switched to "0". After that, the processing proceeds to S15. Meanwhile, even when the setting lock key 63 is not clicked (No in S13), the processing proceeds to S15.

Next, the print requesting section 30 judges whether or not either one of an OK key 56 for carrying out the print instruction and a cancel key 57 for canceling the printing, as shown in FIG. 11, is clicked (S15). When the OK key 56 or the cancel key 57 is clicked (Yes in S15), the print requesting section 30 carries out the print instruction or the cancel processing (S16), and the processing is terminated. Note that the detailed processing of S16 will be described later. Meanwhile, even when neither the OK key 56 nor the cancel key 57 is clicked (No in S15), the processing returns to steps in S4.

This is the entire flow of the processing carried out by the printer driver UI section 15. The following explains the detailed processings of S2, S3, S4, S8, S10, S12, and S16.

Initial Display Processing of Set Function Icon

Figure 14:
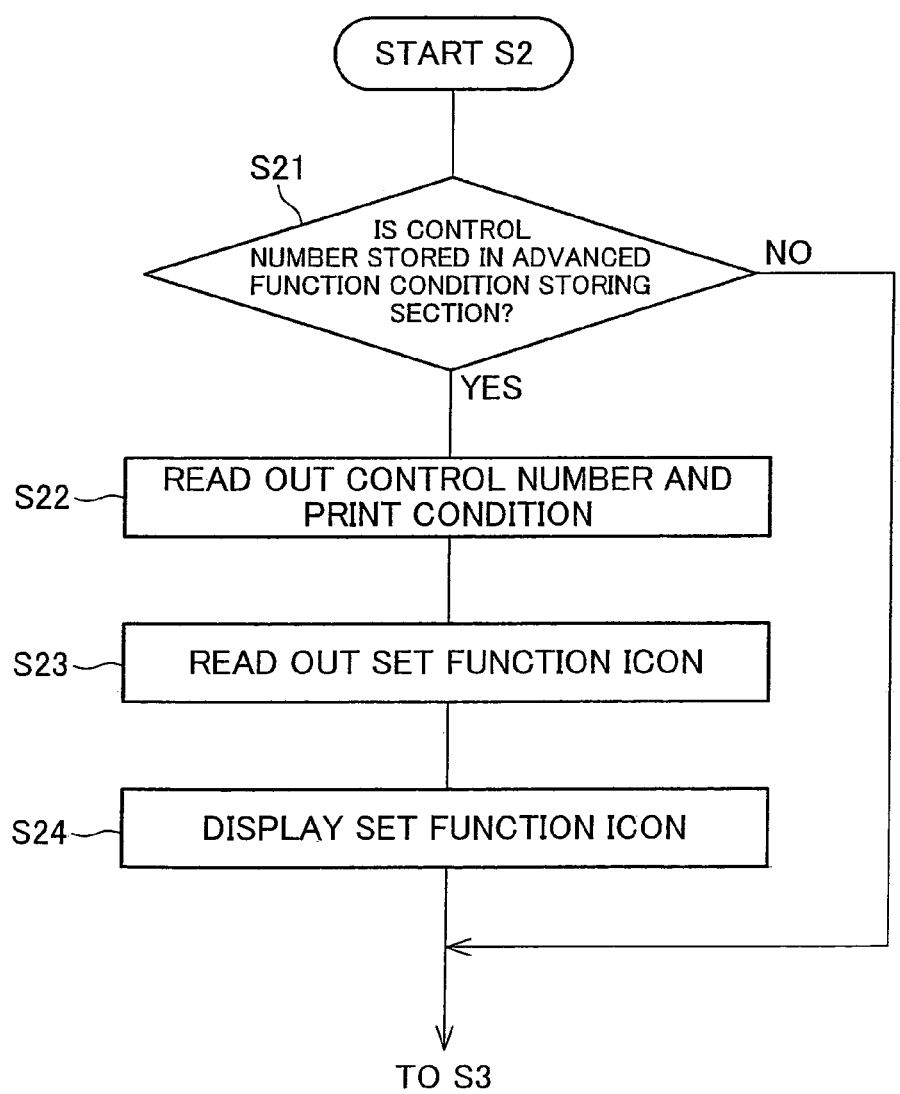
FIG. 14 is a flow chart showing a flow of an initial display processing of a set function icon.

First, the following explains S2, that is, the flow of the initial display processing of the set function icon in reference to a flow chart shown in FIG. 14.

First, the set function icon display processing section 43 judges whether or not the advanced function condition storing section 29 stores the control number and the print condition (S21).

When the lock setting section 44 has set the locked flag, stored in the advanced function condition storing section 29, to "1" at the time of the previous startup, the advanced function condition storing section 29 stores the control number corresponding to the advanced function used for the previous printing. Meanwhile, when the lock setting section 44 has set the locked flag, stored in the advanced function condition storing section 29, to "0", at the time of the previous startup, the advanced function condition storing section 29 has reset at the time the printer driver UI section 15 has terminated last time, so that the advanced function condition storing section 29 does not store the control number.

When the advanced function condition storing section 29 does not store the control number or the print condition (No in S21), the processing proceeds to S3 shown in FIG. 10.

Meanwhile, when the advanced function condition storing section 29 stores the control number and the print condition (Yes in S21), the set function icon display processing section 43 reads out the control number and the print condition from the advanced function condition storing section 29 (S22). Then, the set function icon display processing section 43 reads out from the table managing section 23 the set function icon corresponding to the read-out control number and print condition (S23), and displays the read-out set function icon in the region C (see FIG. 11) of the print condition setting screen image (S24). After that, the processing proceeds to S3 shown in FIG. 10.

In FIG. 11, the set function icon display processing section 43 displays the set function icon corresponding to the advanced function "Poster Print" and the set function icon corresponding to the advanced function "180° rotation".

Moreover, in S24, when the set function icon display processing section 43 cannot arrange in the region C all the set function icons read out from the table managing section 23, a scroll bar is provided for the region C, and this makes it possible to display all the set function icons. In this way, a user can see a list of the set function icons with this scroll bar.

As described above, the set function icon display processing section 43 displays the set function icon(s) which corresponds to the advanced function set by the detail condition setting section 42 and indicates that this advanced function has already been set. This set function icon(s) is displayed in the region C in the print condition setting screen image, not in the region B in which the advanced function icons are displayed by the display control section 37.

Therefore, a user can see the advanced function icons, and also confirm the set function icon(s) displayed in the same screen image. That is, a user can easily confirm the set advanced function(s) without any operation. Therefore, a user does not mistakenly set the function that has already been set.

Moreover, in the present embodiment, the table managing section 23 associates the control number (and the print condition) of the advanced function with the set function icon, and manages the control number (and the print condition) of the advanced function and the set function icon. Then, the set function icon display processing section 43 reads out from the table managing section 23 the set function icon corresponding to the advanced function, and displays the read-out set function icon.

Therefore, the table managing section 23 can manage an image, created in advance, as the set function icon so that it is easy to find out that the advanced function(s) has already been set. With this, a user can easily find out which advanced function(s) has already been set.

Initial Display Processing of Resulting Image

Figure 15:
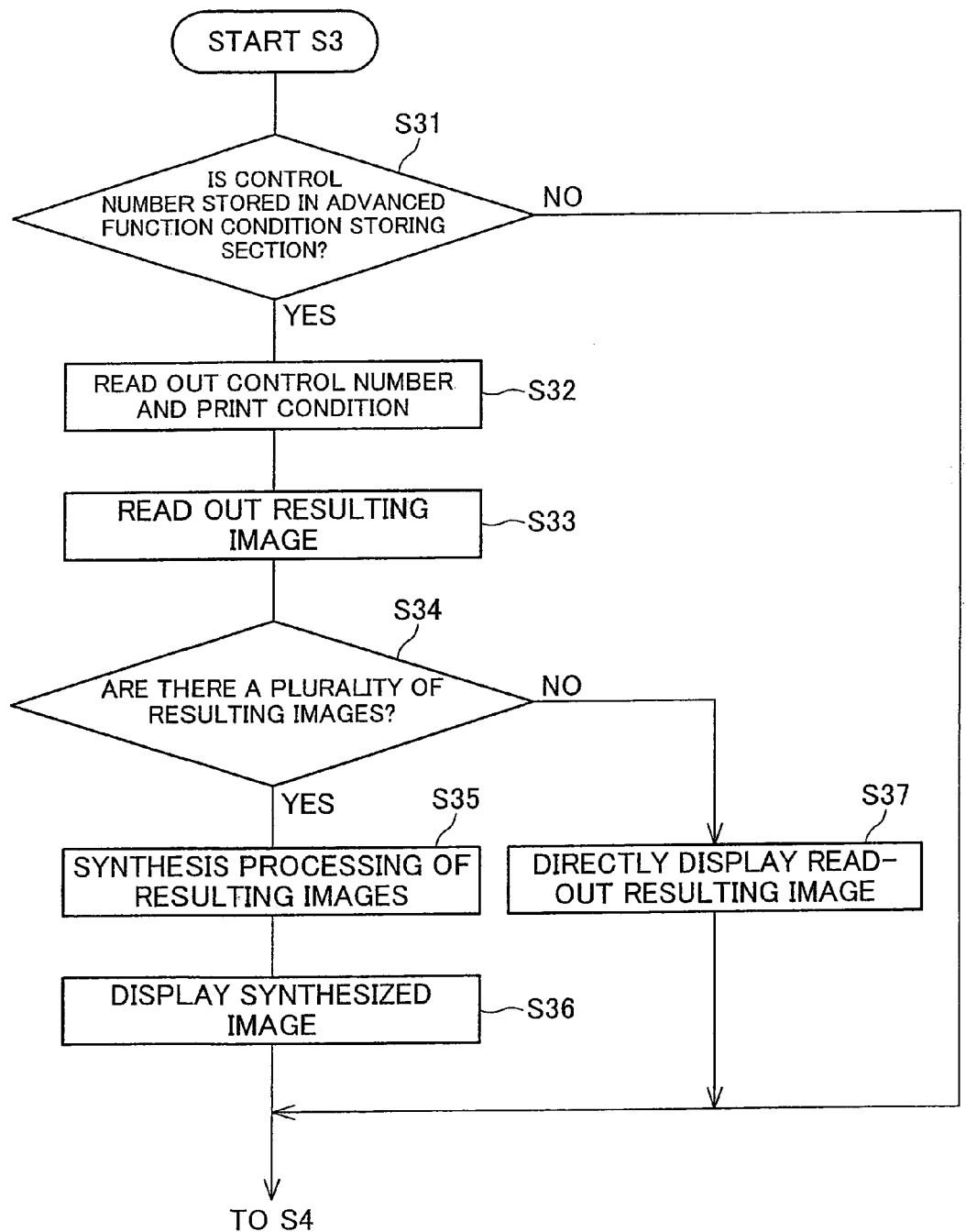
FIG. 15 is a flow chart showing a flow of an initial display processing of a resulting image.

Next, the following will explain S3, that is, the flow of the initial display processing of the resulting image in reference to a flow chart shown in FIG. 15.

First, the resulting image display processing section 28 judges whether or not the advanced function condition storing section 29 stores the control number and the print condition (S31).

When the advanced function condition storing section 29 does not store the control number or the print condition (No in S31), the processing proceeds to S4 shown in FIG. 10.

Meanwhile, when the advanced function condition storing section 29 stores the control number and the print condition (Yes in S31), the resulting image display processing section 28 reads out the control number and the print condition from the advanced function condition storing section 29 (S32).

After that, the resulting image display processing section 28 reads out from the table managing section 23 the resulting image corresponding to the read-out control number and print condition (S33).

Next, the resulting image display processing section 28 judges whether or not there are a plurality of read-out resulting images (S34).

When there are a plurality of resulting images (Yes in S34), the resulting image display processing section 28 carries out the synthesis processing of the plurality of resulting images (S35), and displays the resulting image, obtained by the synthesis processing, in the region D (see FIG. 11) of the print condition setting screen image (S36). After that, the processing proceeds to S4 shown in FIG. 10.

Figure 16:
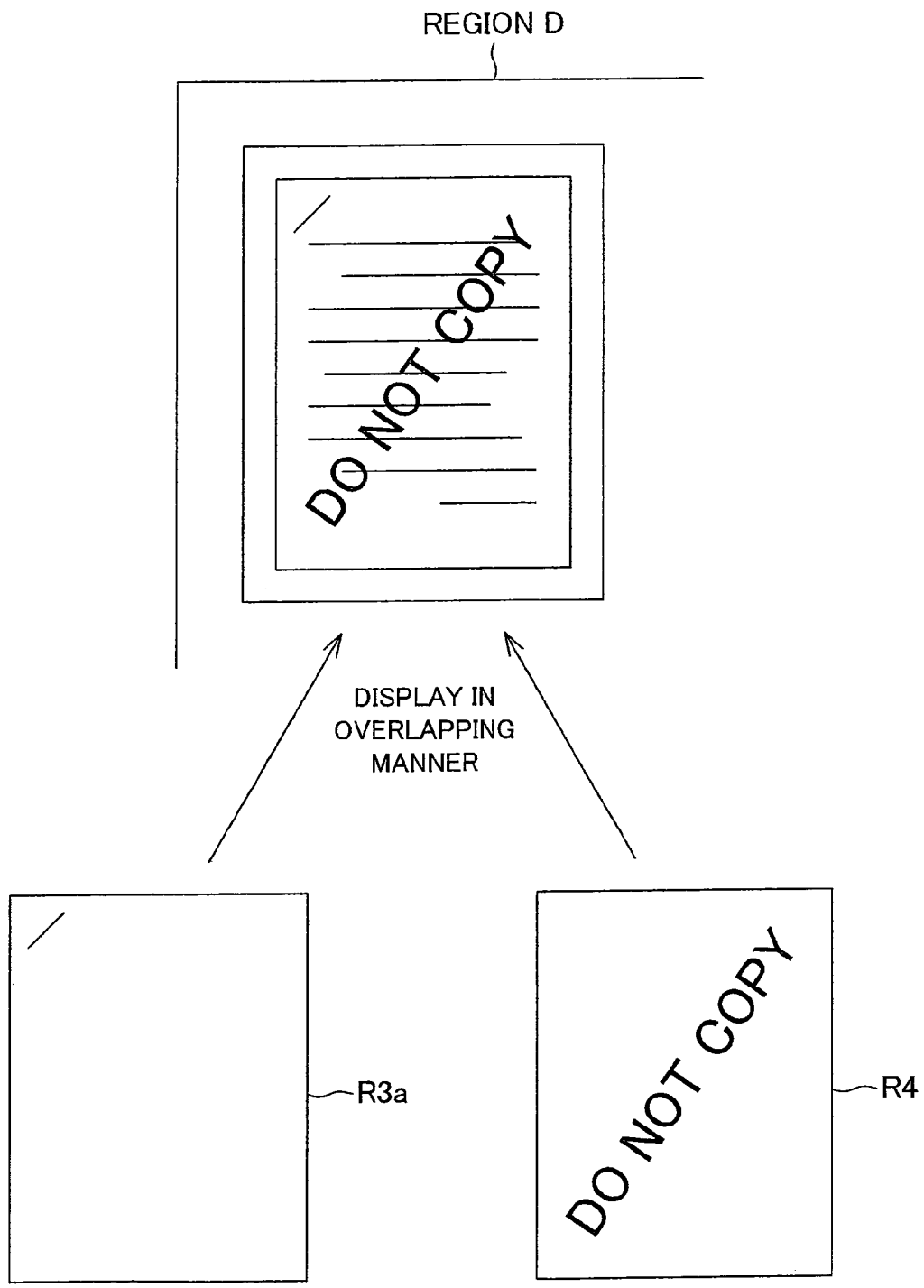
FIG. 16 is a diagram for explaining a synthesis processing carried out by a resulting image display processing section.

FIG. 16 is a diagram for explaining the synthesis processing of the resulting images in the resulting image display processing section 28. For example, FIG. 16 shows a case in which the resulting image display processing section 28 reads out from the table managing section 23 (i) a resulting image R3a corresponding to the advanced function "Staple" and the print condition "One-point Staple" and (ii) a resulting image R4 corresponding to the advanced function "Watermark". In this case, as shown in FIG. 16, the resulting image display processing section 28 generates an image obtained by the synthesis processing of the resulting images R3a and R4, that is, the resulting image display processing section 28 generates an image by overlapping both images with each other. Then, the resulting image display processing section 28 displays the generated image in the region D.

Meanwhile, when there is one resulting image (No in S34), the resulting image display processing section 28 directly displays the read-out resulting image in the region D of the print condition setting screen image (S37). After that, the processing proceeds to S4 shown in FIG. 10.

As described above, the table managing section 23 associates the control number of the advanced function with the resulting image indicating the result obtained when the printing is carried out using this advanced function, and manages the control number of the advanced function and the resulting image. Then, the resulting image display processing section 28 reads out from the table managing section 23 the resulting image corresponding to the advanced function set by the advanced function condition setting section 27 (specifically, the detail condition setting section 42), and displays this resulting image in the region D.

Here, the table managing section 23 manages, as the resulting image, an image(s) created in advance so that the result obtained by the print processing using respective advanced functions can be easily understood by a user. Therefore, a user can easily understand what kind of processing result the user can obtain.

Display Processing of Advanced Function Icon

Figure 17:
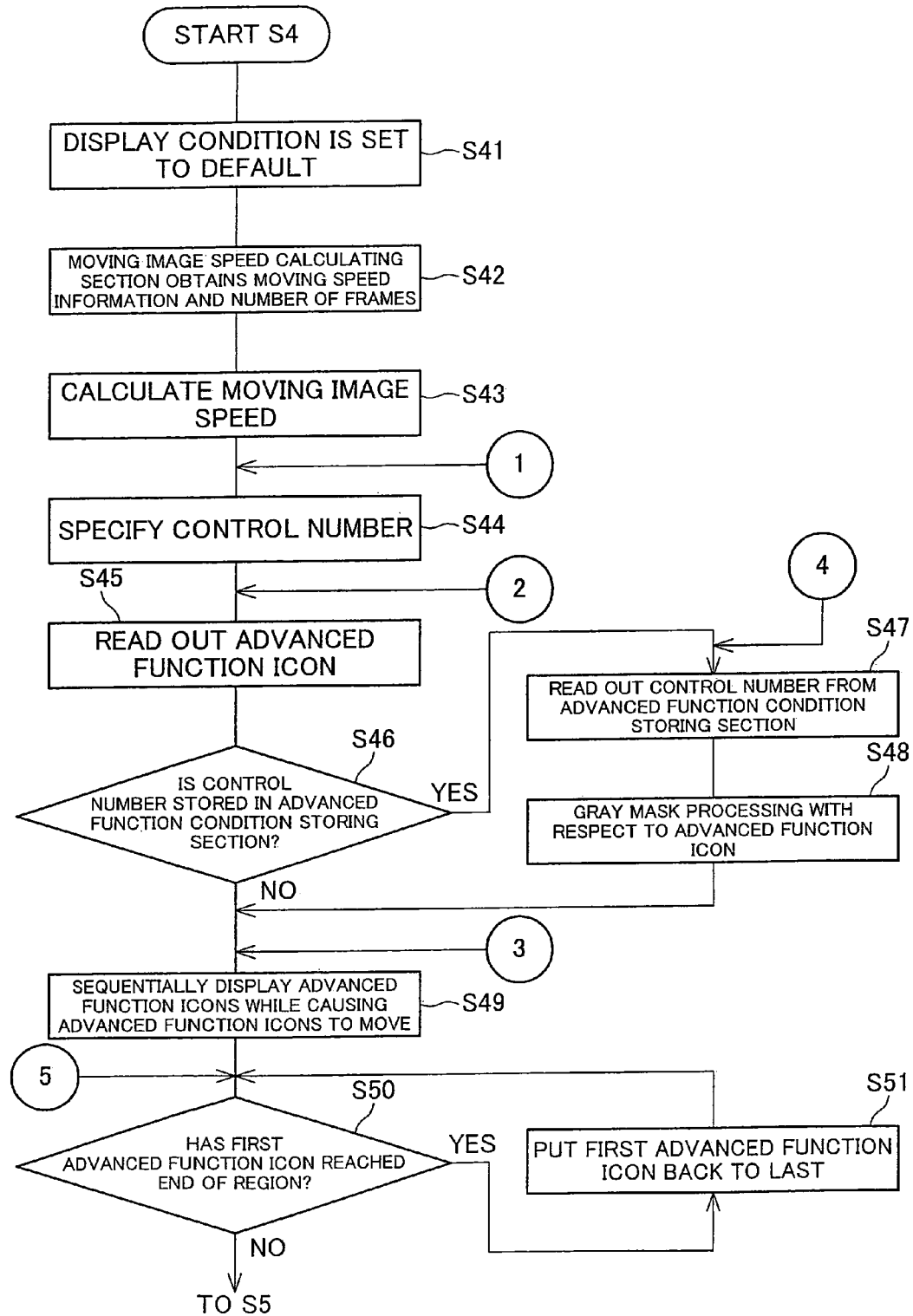
FIG. 17 is a flow chart showing a flow of an initial display processing of the advanced function icon.

Next, the following explains S4, that is, the flow of the display processing of the advanced function icon in reference to a flow chart shown in FIG. 17.

First, in S41, the display condition setting section 31 sets respective display conditions by default. Specifically, the display condition setting section 31 sets the type of the advanced function "ALL", the icon size "Large", the presence or absence of the display of the advanced function name "Present", the icon interval "1", the moving direction "left direction" and the moving speed "3". Then, the display condition managing section 32 manages the type information 32a, the size information 32b, the function name display information 32c, the icon interval information 32d, the moving direction information 32e, and the moving speed information 32f which indicate respective display conditions set by the display condition setting section 31.

Next, the moving image speed calculating section 36 obtains the moving speed information 32f from the display condition managing section 32, and reads out from the table managing section 23 (i) all the control numbers and (ii) the numbers of frames corresponding to these control numbers (S42).

After that, the moving image speed calculating section 36 calculates the display time of a single fame of the advanced function icon of each control number, using Formula (1) shown above (S43). Note that the moving image speed calculating section 36 stores the size of the region B in advance. After that, the moving image speed calculating section 36 outputs to the display condition managing section 32 the moving image speed information 32g which associates the calculated display time of a single frame of the advanced function icon with the control number. Then, the display condition managing section 32 manages the moving image speed information 32g received from the moving image speed calculating section 36.

Next, the icon read-out section 33 reads out from the function type managing section 24 the control number corresponding to the type information 32a managed by the display condition managing section 32 (S44). That is, the icon read-out section 33 specifies the control number of the advanced function icon to be displayed.

Then, the icon read-out section 33 (I) reads out from the table managing section 23 the advanced function icon and advanced function name corresponding to (i) the control number specified in S44 and (ii) the size information 32b managed by the display condition managing section 32, (II) associates this control number with the read-out advanced function icon and advanced function name, and then (III) outputs the control number, the read-out advanced function icon, and the read-out advanced function name to the selectable/nonselectable switching section 38 (S45).

Next, the selectable/nonselectable switching section 38 confirms whether or not the advanced function condition storing section 29 stores the control number (S46).

As described above, normally, the advanced function condition storing section 29 is reset at the time of the termination of the printer driver UI section 15, and the advanced function condition storing section 29 stores nothing at the time of the startup of the printer driver. UI section 15. However, when the lock setting section 44 has switched the locked flag of the advanced function condition storing section 29 to "1" in the previous startup of the printer driver UI section 15, the advanced function condition storing section 29 is not reset even at the time of the startup, and keeps storing the control number stored when the setting lock key 63 (see FIG. 11) has been clicked last time.

Moreover, the advanced function condition storing section 29 stores the control number corresponding to the advanced function set after the startup.

When the advanced function condition storing section 29 stores the control numbers (Yes in S46), the selectable/nonselectable switching section 38 reads out all the control numbers from the advanced function condition storing section 29 (S47). Then, among the advanced function icons received from the icon read-out section 33, the selectable/nonselectable switching section 38 specifies the advanced function icons corresponding to the control numbers read out from the advanced function condition storing section 29.

After that, the selectable/nonselectable switching section 38 carries out the gray mask processing with respect to the specified advanced function icon(s) (S48).

Then, the selectable/nonselectable switching section 38 associates the advanced function icon(s), which has been subjected to the gray mask processing, with the corresponding control number and advanced function name, and outputs the advanced function icon(s), the corresponding control number, and the corresponding advanced function name to the display control section 37. Moreover, regarding the control number(s) which is not stored in the advanced function condition storing section 29, the selectable/nonselectable switching section 38 directly outputs to the display control section 37 the control number, the advanced function icon, and the advanced function name which are received from the icon read-out section 33.

Meanwhile, when the advanced function condition storing section 29 does not store any control numbers (No in S46), the selectable/nonselectable switching section 38 directly outputs to the display control section 37 the control number, the advanced function icon, and the advanced function name which are received from the icon read-out section 33. Then, the processing proceeds to S49.

Next, in S49, the display control section 37 sequentially displays the advanced function icons, received from the selectable/nonselectable switching section 38, in the region B in the order of the control numbers (see FIG. 11).

Specifically, in accordance with the moving direction information 32*d* managed by the display condition managing section 32, the display control section 37 displays the advanced function icons I in the region B while causing the advanced function icons I to move in a predetermined order of the control numbers. Here, when the moving direction information 32*d* is "left direction", the display control section 37 sequentially displays the advanced function icons I in ascending order of the control number while causing the advanced function icons I to move from the right end to the left end in the region B. Meanwhile, when the moving direction information 32*d* is "right direction", the display control section 37 sequentially displays the advanced function icons I in descending order of the control number while causing the advanced function icons I to move from the left end to the right end in the region B.

Moreover, the display control section 37 sets the moving speed and moving image speed of each advanced function icon I in accordance with the moving speed information 32*f* and moving image speed information 32*g* managed by the display condition managing section 32.

As can be seen from Formula (1), while the advanced function icon I moves from the right end to the left end in the region B (or from the left end to the right end in the region B), each of a series of frame images of the advanced function icon I is displayed once.

Figure 18:
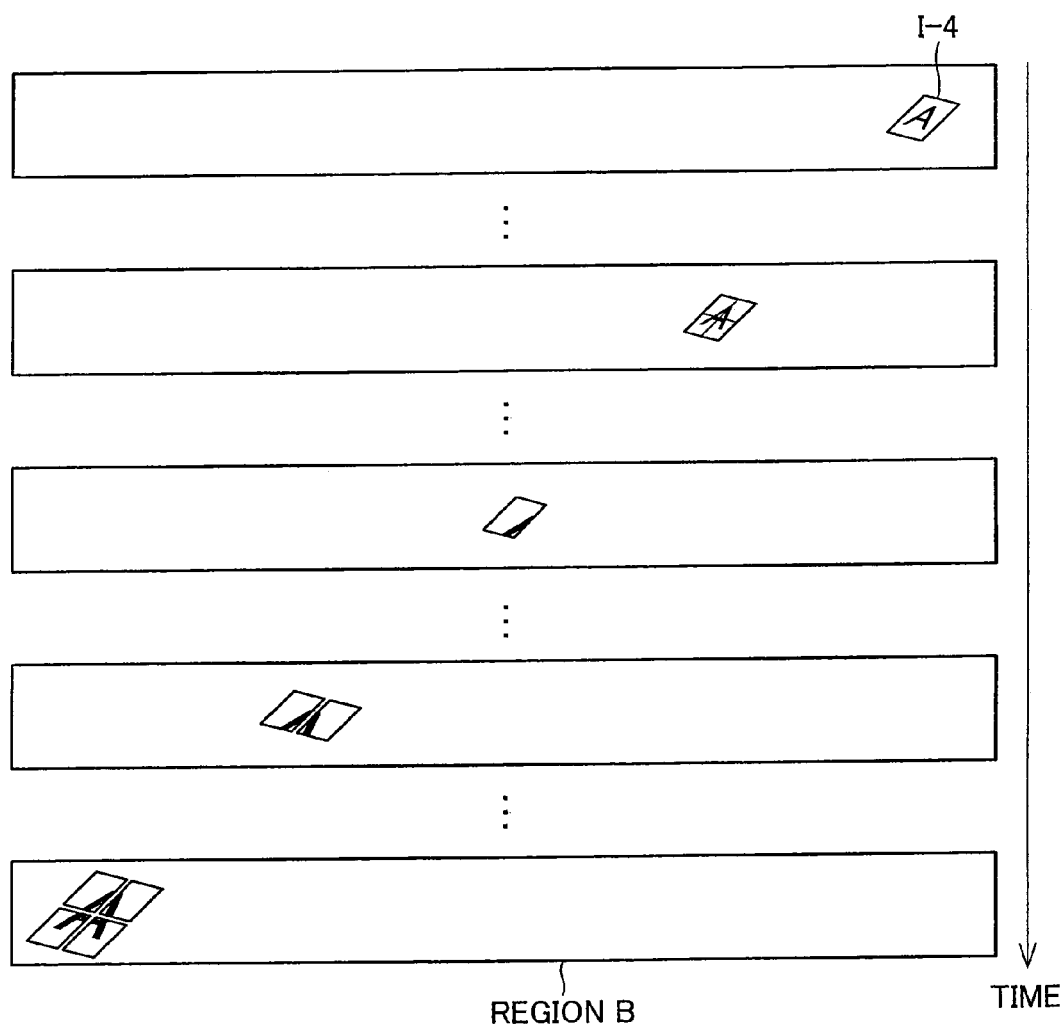
FIG. 18 is a diagram showing an advanced function icon (for a poster print) which changes on a screen image as time advances.

FIG. 18 is a diagram showing an advanced function icon I-4 (for the poster print (control number 4)) which changes on the print condition setting screen image as time advances. The number of frames of the advanced function icon I-4 is thirty, however FIG. 18 shows only five of them, and omits others. As shown in FIG. 18, the display control section 37 displays the first frame image of the advanced function icon I-4 when displaying the advanced function icon I-4 at the right end of the region B. As the advanced function icon I-4 moves from the right end to the left end, the frame images of the advanced function icon I-4 are sequentially displayed. Then, the display control section 37 displays the final frame image when displaying the advanced function icon I-4 at the left end of the region B. Then, the advanced function icon I-4 disappears from the region B. With this, a user can confirm each of a series of frame images once while the advanced function icon I-4 moves from the right end to the left end in the region B. Note that a series of frame images show what kind of function the advanced function is. Therefore, a user can easily understand the content of each advanced function.

Figure 19:
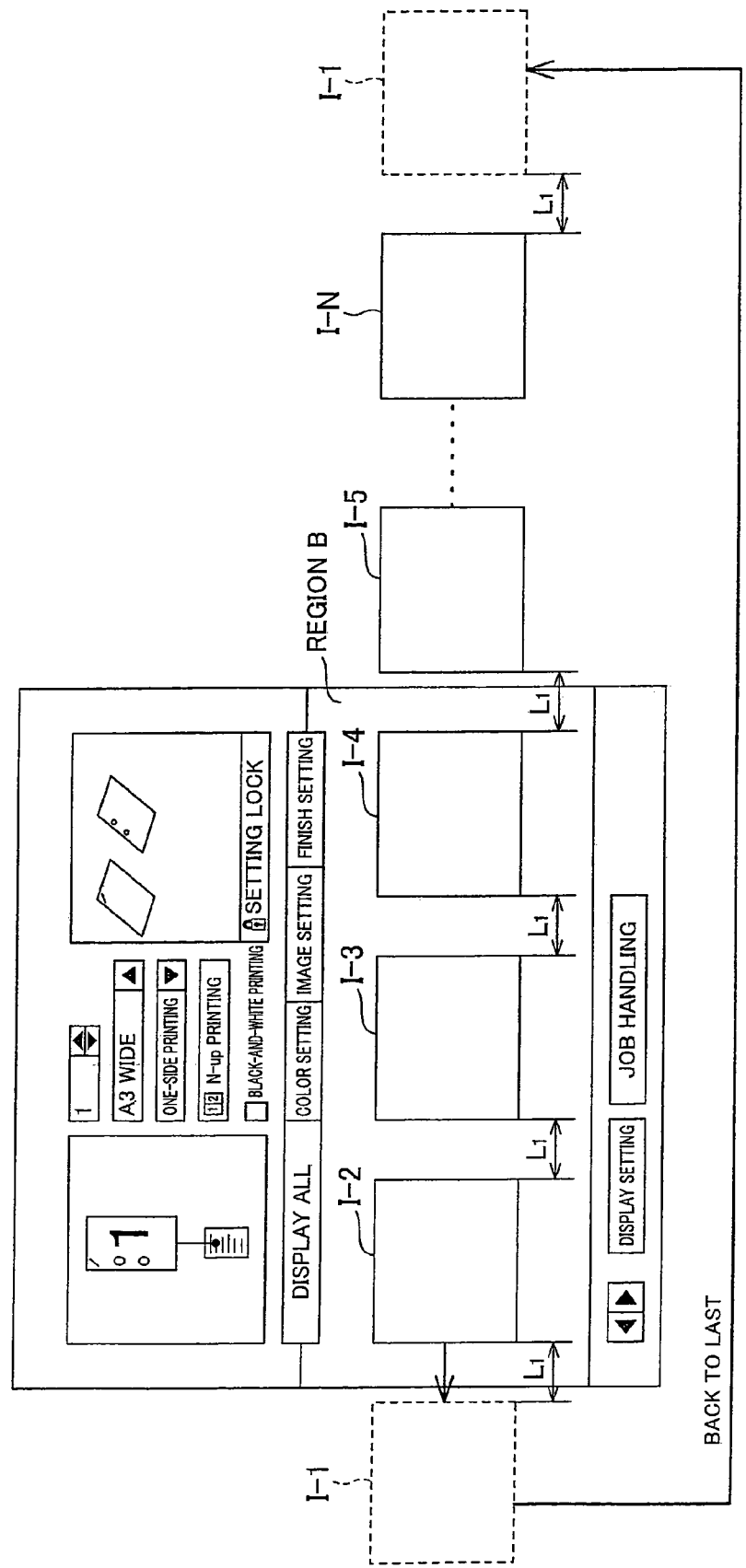
FIG. 19 is a diagram showing a display processing of the advanced function icons.

Moreover, as shown in FIG. 19, the display control section 37 carries out setting so that the interval between any two adjacent advanced function icons I is the icon interval "1"=L1 indicated by the icon interval information 32*b* managed by the display condition managing section 32. That is, the display control section 37 displays the advanced function icon I-n of the control number n while causing the advanced function icon I-n to move from the right end of the region B in the left direction. When the distance between the advanced function icon I-n and the right end of the region B is L1, the advanced function icon I-(n+1) of the control number n+1 is displayed from the right end of the region B.

After that, the display control section 37 judges whether or not the first advanced function icon I in the region B has reached the end of the region B, that is, the leftmost advanced function icon I in the case of the moving direction "left direction" or the rightmost advanced function icon I in the case of the moving direction "right direction" has reached the end of the region B (S50).

When the advanced function icon does not reach the end of the region B (No in S50), the processing proceeds to S5 shown in FIG. 10.

Meanwhile, when the advanced function icon has reached the end of the region B (Yes in S50), the display control section 37 stops displaying this advanced function icon but displays this advanced function icon again after displaying all the other advanced function icons, as shown in FIG. 19. That is, the display control section 37 displays the first advanced function icon I till the end of the region B, and then this advanced function icon I becomes the rearmost advanced function icon I (S51). After that, the processing returns to S50.

Thus, even when the size of the region B of the print condition setting screen image is small, the display control section 37 can sequentially display all the advanced function icons. As a result, it is possible to improve the visibility of each advanced function icon. Moreover, a user can easily recognize, without any operation, all the advanced functions regarding the processing of generating the print job output to the printer 1.

Moreover, the pointer can move to any position on the print condition setting screen image, so that the selection processing section 39 can select any one of a plurality of selectable advanced function icons displayed simultaneously by the display control section 37. That is, the selection processing section 39 can select all the selectable advanced function icons displayed simultaneously. Therefore, unlike conventional technologies, a user does not have to wait until desired information is displayed at a predetermined position, and can select the advanced function icon anytime from when the advanced function icon is displayed on the print condition setting screen image to before it disappears from the screen image. This improves the convenience of selecting a desired advanced function icon.

Moreover, the display control section 37 repeatedly displays a plurality of advanced function icons. Therefore, even when a user wishes to select the advanced function icon after this advanced function icon has disappeared from the screen image, the user can select the advanced function icon since the advanced function icon is repeatedly displayed.

Further, the display control section 37 displays the advanced function icons while causing the advanced function icons to move in one direction in the print condition setting screen image. Therefore, a user can see a plurality of advanced function icons lined up in one direction in the print condition setting screen image.

Moreover, referring to the advanced function condition storing section 29 which manages the control number of the set advanced function, the selectable/nonselectable switching section 38 carries out the gray mask processing with respect to the advanced function icon corresponding to the set advanced function. Then, even when the advanced function icon which has been subjected to the gray mask processing is clicked, the selection processing section 39 does not output the control number to the advanced function condition setting section 27. That is, the selection processing section 39 cannot select the advanced function icon which has been subjected to the gray mask processing. Therefore, a user does not mistakenly select the advanced function which has already been set. As a result, it is possible to prevent an operation error of a user, and also possible to improve the convenience of operation.

Change Processing of Display Condition

Figure 20:
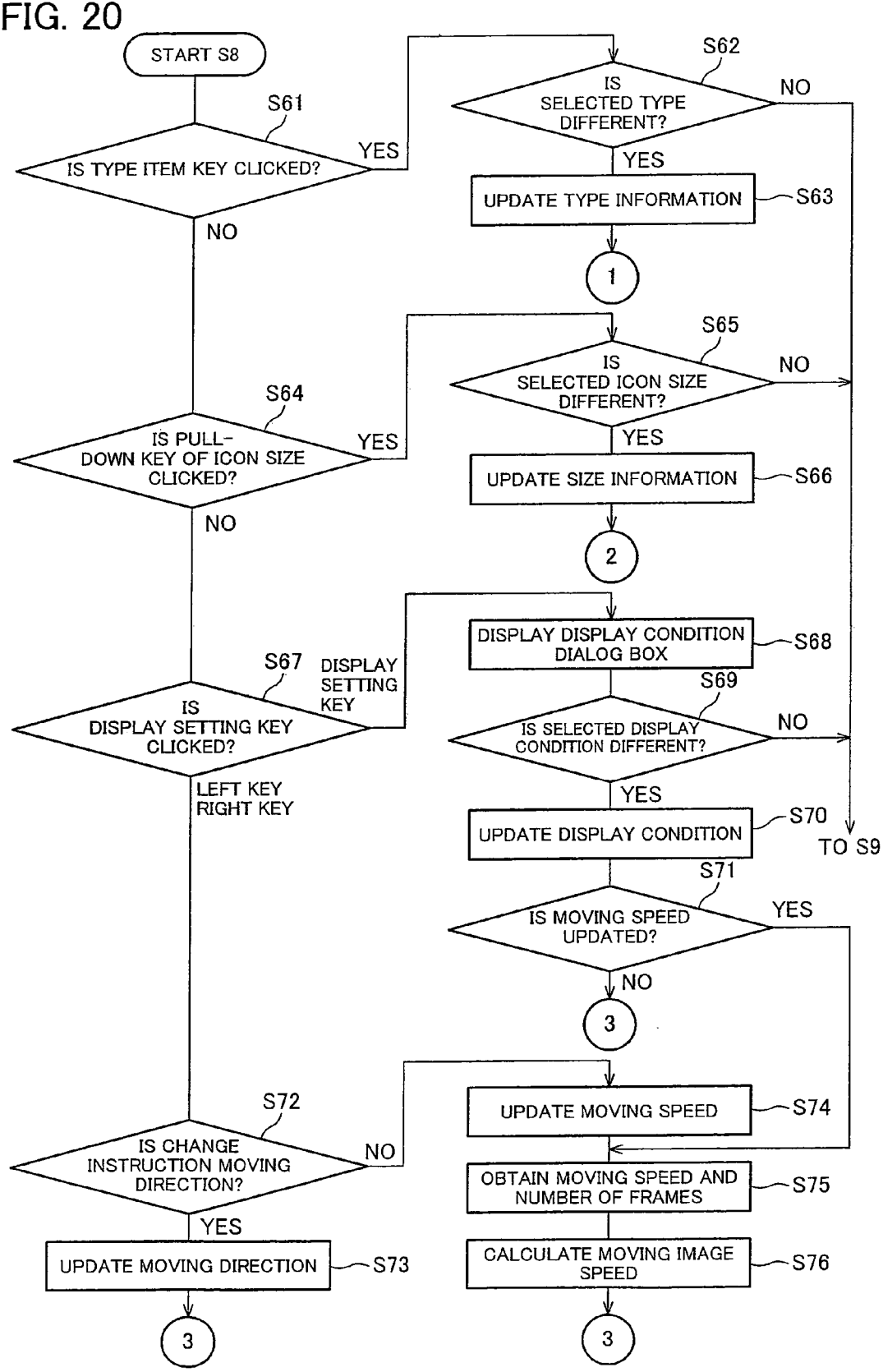
FIG. 20 is a flow chart showing a flow of a change processing of a display condition.

Next, the following explains S8, that is, the change processing of the display condition in reference to a flow chart shown in FIG. 20.

As described above, the change processing of the display condition of the advanced function icon is started when any one of the type item key 58, the left key 59, the right key 60, the display setting key 61 (see FIG. 11), and the pull-down key 62 (see FIG. 13) which are the display condition change keys for setting the display condition of the advanced function icon is clicked.

First, the display condition setting section 31 judges whether or not the type item key 58 which instructs the change of the type of the advanced function shown in FIG. 11 is clicked (S61).

When the type item key 58 is clicked (Yes in S61), the display condition setting section 31 judges whether or not the input type is different from the type indicated by the type information 32*a* managed by the display condition managing section 32 (S62). That is, the display condition setting section 31 judges whether or not the input type is different from the current type.

When the input type is different from the current type (Yes in S62), the display condition setting section 31 outputs to the display condition managing section 32 the type information 32*a* indicating the input type, and updates the type information 32*a* managed by the display condition managing section 32 (S63). After that, the processing proceeds to S4 shown in FIG. 17.

Meanwhile, when the input type is the same as the current type (No in S62), the processing proceeds to S9 shown in FIG. 10.

Next, when the type item key 58 is not clicked (No in S61), the display condition setting section 31 judges whether or not the pull-down key 62, shown in FIG. 13, for the icon size is clicked (S64).

When the pull-down key 62 is clicked (Yes in S64), the display condition setting section 31 judges whether or not the input icon size is different from the icon size indicated by the size information 32*b* managed by the display condition managing section 32 (S65). That is, the display condition setting section 31 judges whether or not the input icon size is different from the current icon size.

When the input icon size is different from the current icon size (Yes in S65), the display condition setting section 31 outputs to the display condition managing section 32 the size information 32*b* indicating the input icon size, and updates the size information 32*b* managed by the display condition managing section 32 (S66). After that, the processing proceeds to S45 shown in FIG. 17.

Meanwhile, when the input icon size is the same as the current icon size (No in S65), the processing proceeds to S9 shown in FIG. 10.

Next, when the pull-down key 62 is not clicked (No in S64), the display condition setting section 31 judges whether or not the display setting key 61 shown in FIG. 11 is clicked and the left key 59 or the right key 60 is clicked (S67).

Figure 21:
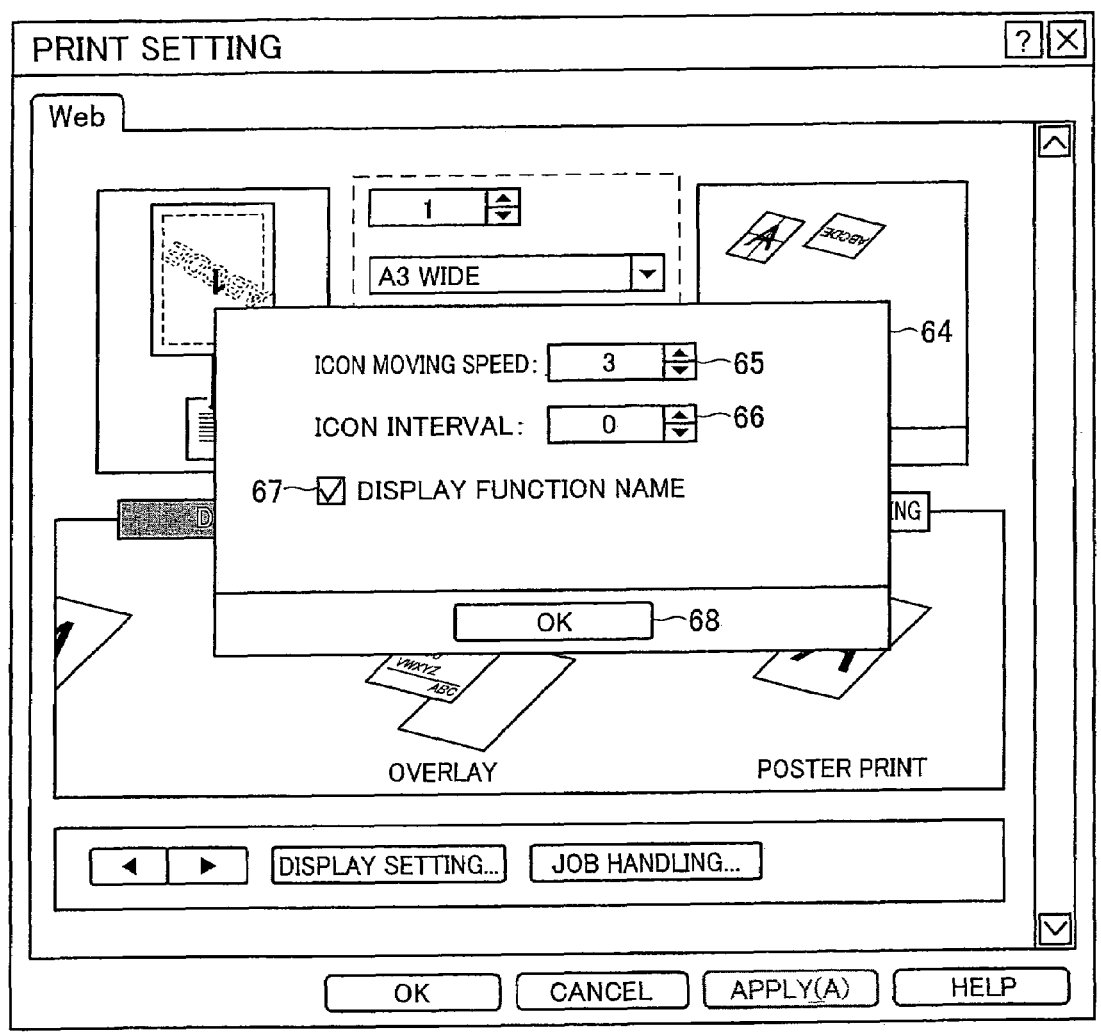
FIG. 21 is a diagram showing one example of a display of a display condition dialog box.

In S67, when the display condition setting section 31 judges that the display setting key 61 is clicked, the display condition setting section 31 causes the display section 13 to display a display condition dialog box 64 for setting the display conditions shown in FIG. 21, and this allows a user to input the moving speed of an icon, the icon interval, and the presence or absence of the display of the advanced function name (S68). At this time, the display condition setting section 31 causes the display section 13 to display the currently set display conditions in accordance with the function name display information 32*c*, the icon interval information 32*d*, and the moving speed information 32*f* which are managed by the display condition managing section 32.

By clicking an up-and-down setting key 65 for the moving speed, an up-and-down setting key 66 for the icon interval, and a check box 67 for the function name display in the display condition dialog box 64 shown in FIG. 21, a user can input a desired moving speed and icon interval, and can switch between display and nondisplay of the advanced function name.

Next, upon clicking of an OK key 68 in the display condition dialog box 64 shown in FIG. 21, the display condition setting section 31 judges whether or not the moving speed, the icon interval, and the display/nondisplay of the advanced function name input to the input section 12 are different from the moving speed information 32*f*, the icon interval information 32*d*, and the function name display information 32*c* which are managed by the display condition managing section 32 (S69). That is, the display condition setting section 31 judges whether or not at least one of the moving speed, the icon interval, and the presence or absence of the display of the advanced function name which are different from the current settings is input.

When the display condition(s) (the moving speed, the icon interval, and/or the presence or absence of the display of the advanced function name) different from the current setting(s) is input (Yes in S69), the display condition setting section 31 updates information (at least one of the moving speed information 32f, the icon interval information 32d, and the function name display information 32c in the display condition managing section 32) corresponding to the input display condition(s) in accordance with the input display condition(s) (at least one of the moving speed, the icon interval, and the presence or absence of the display of the advanced function name) (S70).

Next, the moving image speed calculating section 36 judges whether or not the moving speed information 32f managed by the display condition managing section 32 is updated (S71). When the moving speed information 32f is updated (Yes in S71), the processing proceeds to S75. Moreover, when the moving speed information 32f is not updated (No in S71), that is, when at least one of the icon interval information 32d and the function name display information 32c is updated, the processing proceeds to S49 shown in FIG. 17.

Meanwhile, when the display condition different from the current setting is not input (No in S69), the processing proceeds to S9 shown in FIG. 10.

Moreover, when the display condition setting section 31 judges that the left key 59 or the right key 60 is clicked in S67, the display condition setting section 31 judges whether or not the change instruction input to the input section 12 is an instruction for changing the moving direction of the icon (S72). That is, in the present embodiment, (a) when the right key 60 is clicked in the case in which the moving direction information 32e managed by the display condition managing section 32 indicates "left direction" and (b) when the left key 59 is clicked in the case in which the moving direction information 32e managed by the display condition managing section 32 indicates "right direction", the display condition setting section 31 judges that the change instruction of the moving direction is input.

When the change instruction is an instruction for changing the moving direction (Yes in S72), the display condition setting section 31 updates the moving direction information 32e managed by the display condition managing section 32, that is, the display condition setting section 31 changes the moving direction from "left direction" to "right direction" or from "right direction" to "left direction" (S73). After that, the processing proceeds to S49 shown in FIG. 17.

Meanwhile, when the change instruction is not the instruction for changing the moving direction (No in S72), the display condition setting section 31 judges that the change instruction is an instruction for changing the moving speed. That is, in the present embodiment, (c) when the left key 59 is clicked in the case in which the moving direction information 32e managed by the display condition managing section 32 indicates "left direction" or (d) when the right key 60 is clicked in the case in which the moving direction information 32e managed by the display condition managing section 32 indicates "right direction", the display condition setting section 31 judges that the change instruction of the moving speed is input.

Next, the display condition setting section 31 increases, by just one level, the level of the moving speed information 32f managed by the display condition managing section 32. That is, the display condition setting section 31 updates the moving speed from "n" to "n+1" (S74). When n+1 equals 6, the updated moving speed information is "1".

Next, upon detection of the update of the moving speed information 32f of the display condition managing section 32, the moving image speed calculating section 36 (I) reads out (i) the moving speed information 32f from the display condition managing section 32 and (ii) the control number and the number of frames from the table managing section 23 (S75), and (II) calculates the moving image speed (S76). The processing in S75 and S76 is the same as the processing in S42 and S43, so that the explanation thereof is omitted. After that, the processing proceeds to S49 shown in FIG. 17.

Thus, in the present embodiment, it is possible to change the moving speed of the advanced function icon, the moving direction of the advanced function icon, the icon interval between any two adjacent advanced function icons, the size of the advanced function icon, and the type of the advanced function icon.

Therefore, for example, if a user does not fully understand the content of each advanced function, the user can set the moving speed so that the advanced functions are displayed at low speed. Thus, it is possible to improve the visibility of each advanced function icon. In contrast, if a used fully understands the content of each advanced function, the user can set the moving speed so that the advanced functions are displayed at high speed. Thus, it is possible to display a desired advanced function icon quickly on the print condition setting screen image.

Moreover, if a user wants to select the advanced function icon which has once passed through the screen image, the user can change the moving direction. Therefore, the user can cause the advanced function icon, which has once passed through the screen image, to be displayed again quickly on the print condition setting screen image.

Further, it is possible to set the interval between any two adjacent advanced function icons. Therefore, for example, by narrowing the icon intervals, it is possible to shorten a time for displaying all the advanced function icons. Moreover, by widening the icon intervals, it is possible to improve the visibility of each advanced function icon.

Moreover, a user can change the size of the advanced function icon to an appropriate size. For example, when eyes are tired, it is possible to increase the size of the advanced function icon.

Further, when a user knows in advance the type of the desired advanced function, the user can click the type item key corresponding to the type of the desired advanced function. In this way, it is possible not to display unnecessary types of advanced function icons, and it is possible to display only necessary types of advanced function icons. As a result, it is possible to further shorten a time until a desired advanced function icon is displayed on the print condition setting screen image. Therefore, a user can select the desired advanced function icon easily.

Set Processing of Print Condition of Advanced Function

Figure 22:
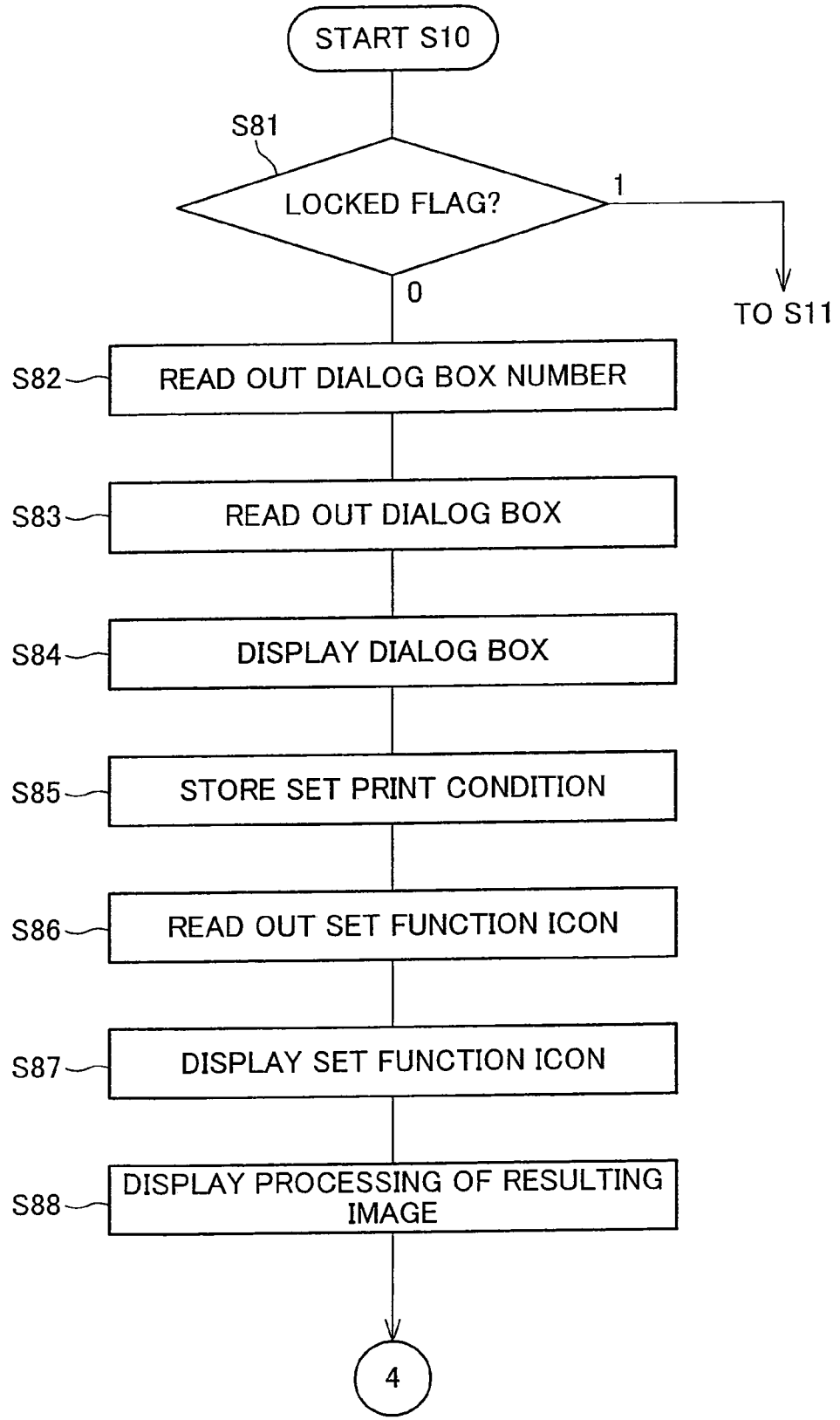
FIG. 22 is a flow chart showing a flow of a set processing of a print condition of an advanced function.

Next, the following explains the set processing of the print condition of the advanced function in reference to a flow chart shown in FIG. 22. Note that this set processing of the print condition of the advanced function is carried out when the advanced function icon is clicked in S9 shown in FIG. 10.

In S9, the selection processing section 39 which has detected that the advanced function icon is clicked stops the movement of the advanced function icon I once, and outputs to the advanced function condition setting section 27 the control number corresponding to the clicked advanced function icon I.

First, the dialog box read-out section 41 which has received the control number confirms the locked flag stored in the advanced function condition storing section 29 (S81). When the locked flag is "1", the advanced function condition setting section 27 cannot newly set the advanced function, so that the advanced function condition setting section 27 terminates the processing, and the processing proceeds to S11 shown in FIG. 10. At this time, the advanced function condition setting section 27 may cause the display section 13 to carry out a display for showing that the edition, etc. cannot be carried out. Meanwhile, when the locked flag is "0", the processing proceeds to S82.

In S82, the dialog box read-out section 41 reads out from the table managing section 23 the dialog box number corresponding to the control number received from the selection processing section 39.

Next, the dialog box read-out section 41 (i) reads out from the dialog box managing section 25 the dialog box corresponding to the dialog box number read out from the table managing section 23, (ii) associates the dialog box with the control number received from the selection processing section 39, and (iii) outputs the dialog box and the control number to the detail condition setting section 42 (S83).

Next, the detail condition setting section 42 causes the display section 13 to display the dialog box read out by the dialog box read-out section 41, and this allows a user to input the detailed print condition of the advanced function clicked in S9 (S84).

Then, the detail condition setting section 42 detects that a setting termination key of the dialog box is clicked, and the detail condition setting section 42 sets the input print condition as the set print condition. Then, the detail condition setting section 42 associates the set print condition with the control number received from the dialog box read-out section 41, and causes the advanced function condition storing section 29 to store the set print condition and the control number (S85).

Next, upon detection of the update of the advanced function condition storing section 29, the set function icon display processing section 43 reads out the control number and set print condition which are stored in the advanced function condition storing section 29. Then, the set function icon display processing section 43 reads out from the table managing section 23 the set function icon corresponding to the read-out control number and set print condition (S86), and causes the read-out set function icon to be displayed in the region C (see FIG. 11) of the print condition setting screen image (S87).

Then, when the resulting image display processing section 28 detects that the advanced function condition storing section 29 is updated, the resulting image display processing section 28 reads out all the control numbers and set print conditions stored in the advanced function condition storing section 29. Then, the resulting image display processing section 28 carries out the display processing of the resulting image (S88). The processing in S88 is the same as the processing in S32 to S37, so that the explanation thereof is omitted. After that, the processing proceeds to S47 shown in FIG. 17.

Here, the following explains examples of the dialog box displayed in S84 on the display section 13 by the detail condition setting section 42.

Figure 23:
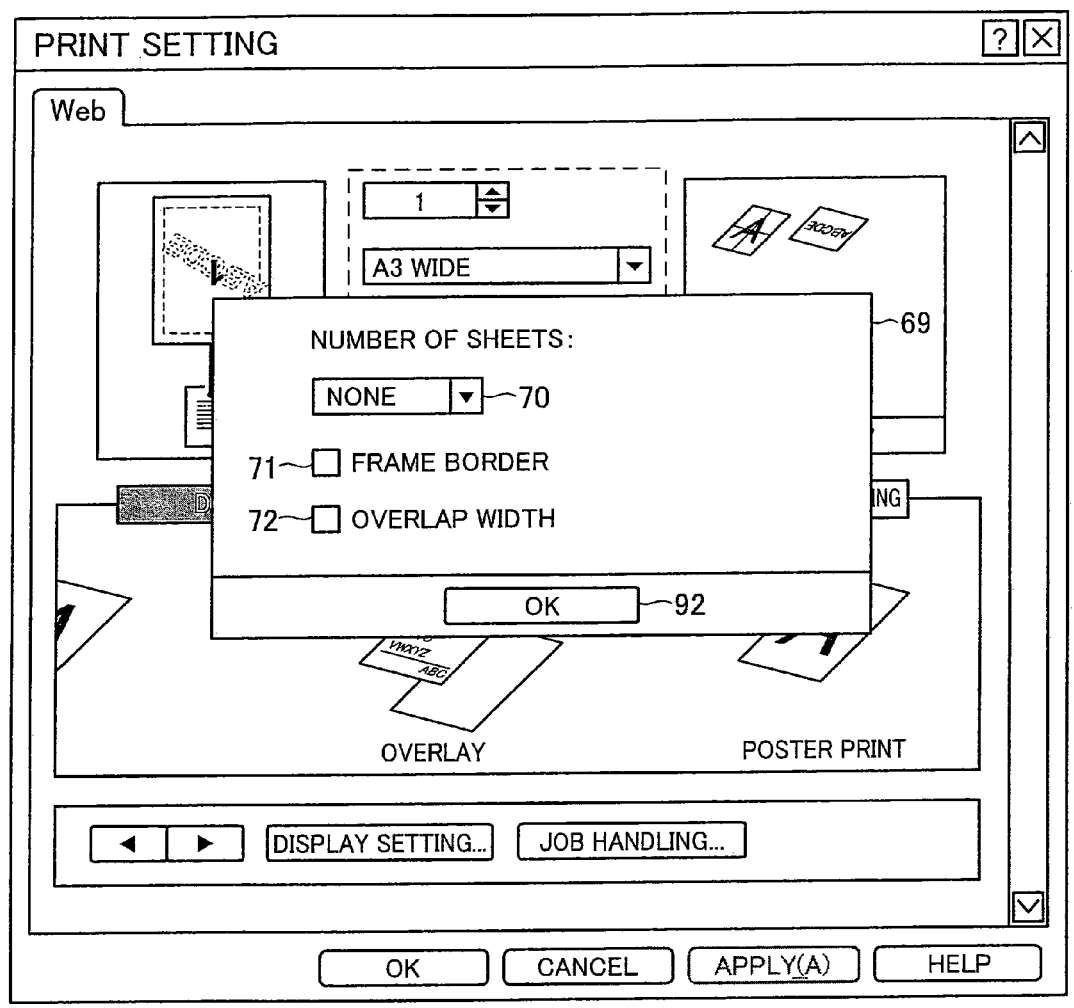
FIG. 23 is a diagram showing one example of a screen image of a dialog box regarding a poster print function.
Figure 24:
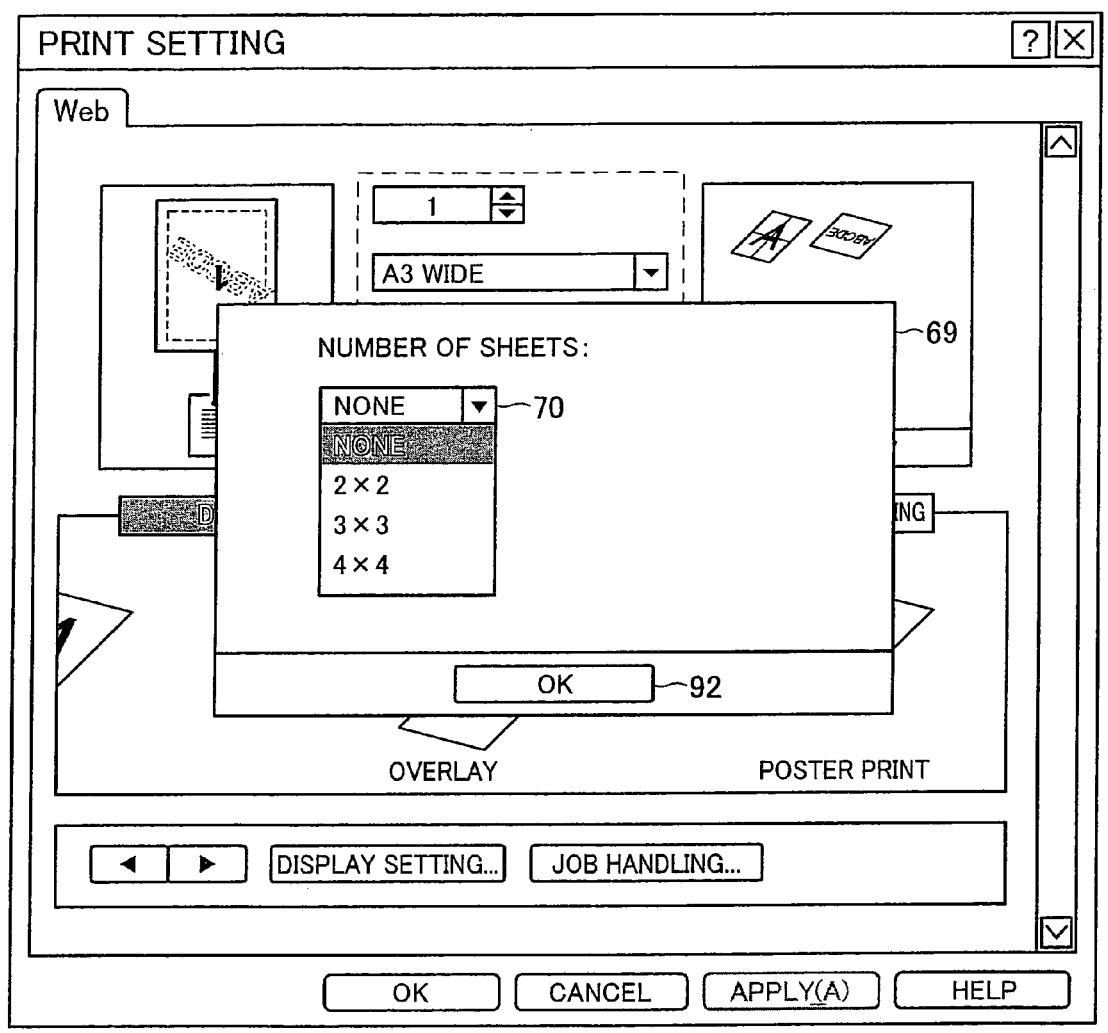
FIG. 24 is a diagram showing one example of a screen image displayed when a pull-down key shown in FIG. 23 is clicked.

Each of FIGS. 23 and 24 is a diagram showing one example of a screen image of the dialog box regarding the poster print function. As shown in FIG. 23, the detail condition setting section 42 displays a dialog box 69 including (i) a pull-down key 70 for setting the number of sheets, (ii) a check box 71 for setting the presence or absence of a frame border, and (iii) a check box 72 for setting the presence or absence of an overlap width.

By displaying the check boxes 71 and 72, a user can carry out instructions of "Frame Border" and/or "Overlap Width" which are convenient when carrying out the poster print.

Here, "Frame Border" forms a reference line used when images are held together. Recording the reference line for an image to be enlarged and output is useful when holding adjacent images together. Moreover, "Overlap Width" forms a region where a paste is applied when holding together sheets on which adjacent images are respectively formed. Forming this region on sheets is useful when holding the sheets together.

Moreover, the detail condition setting section 42 displays "None" as a default of the number of sheets. However, as shown in FIG. 24, by clicking the pull-down key 70, the detail condition setting section 42 carries out a display which allows a user to give a selection instruction, that is, to enlarge and output a single document image by (i) "2×2" (four sheets), (ii) "3×3" (nine sheets) or (iii) "4×4" (sixteen sheets).

Figure 25:
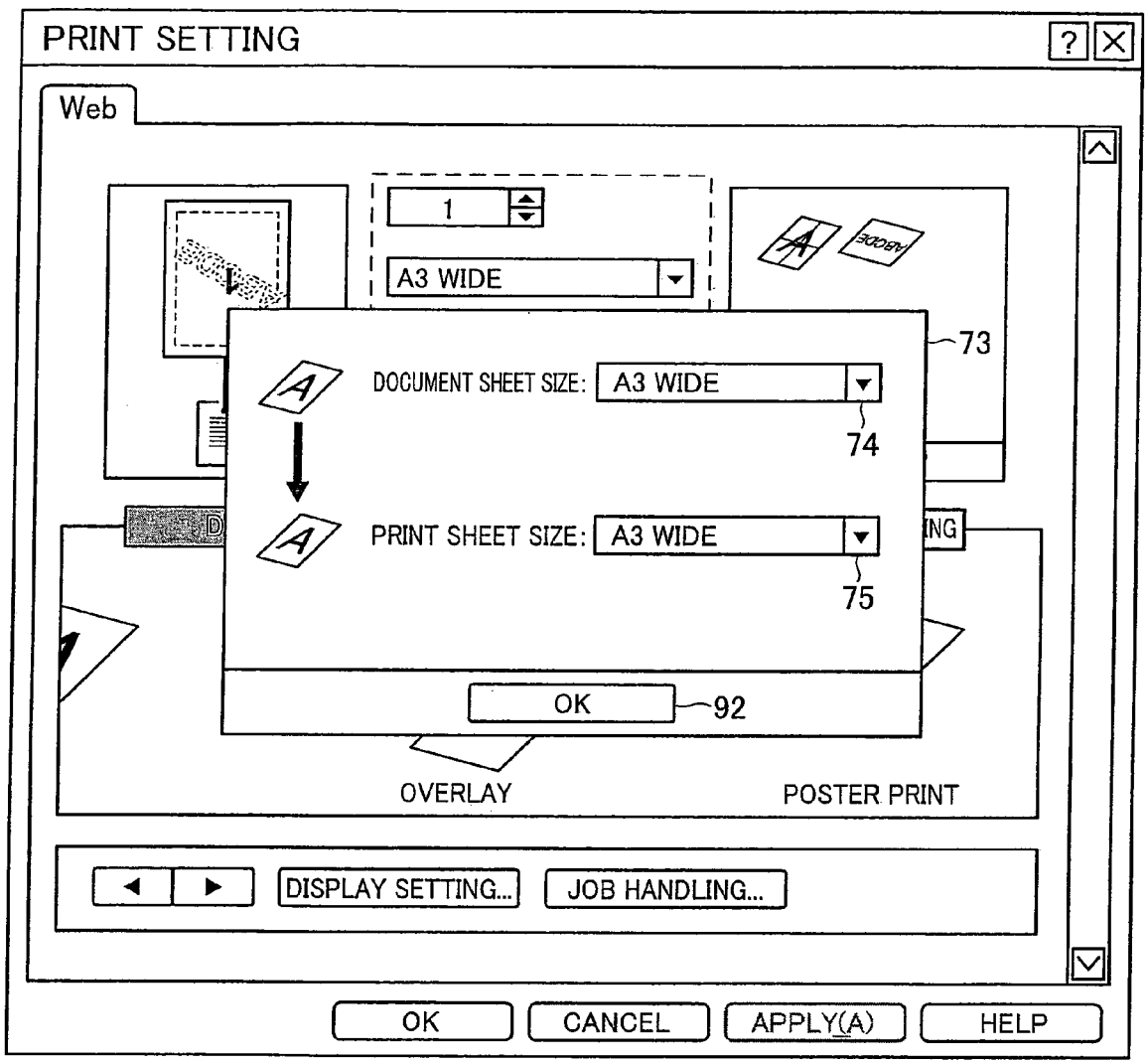
FIG. 25 is a diagram showing one example of a screen image of a dialog box regarding a fit page function.
Figure 26:
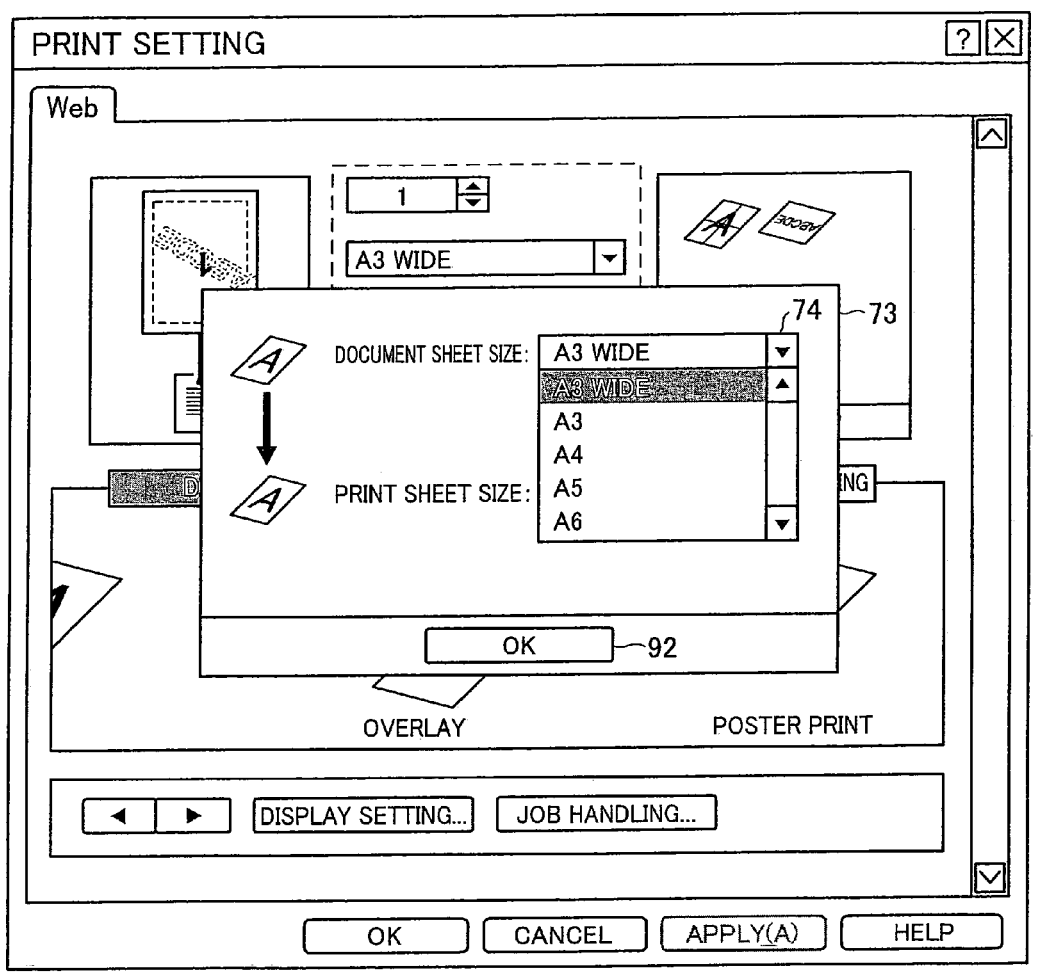
FIG. 26 is a diagram showing one example of a screen image displayed when a pull-down key shown in FIG. 25 is clicked.
Figure 27:
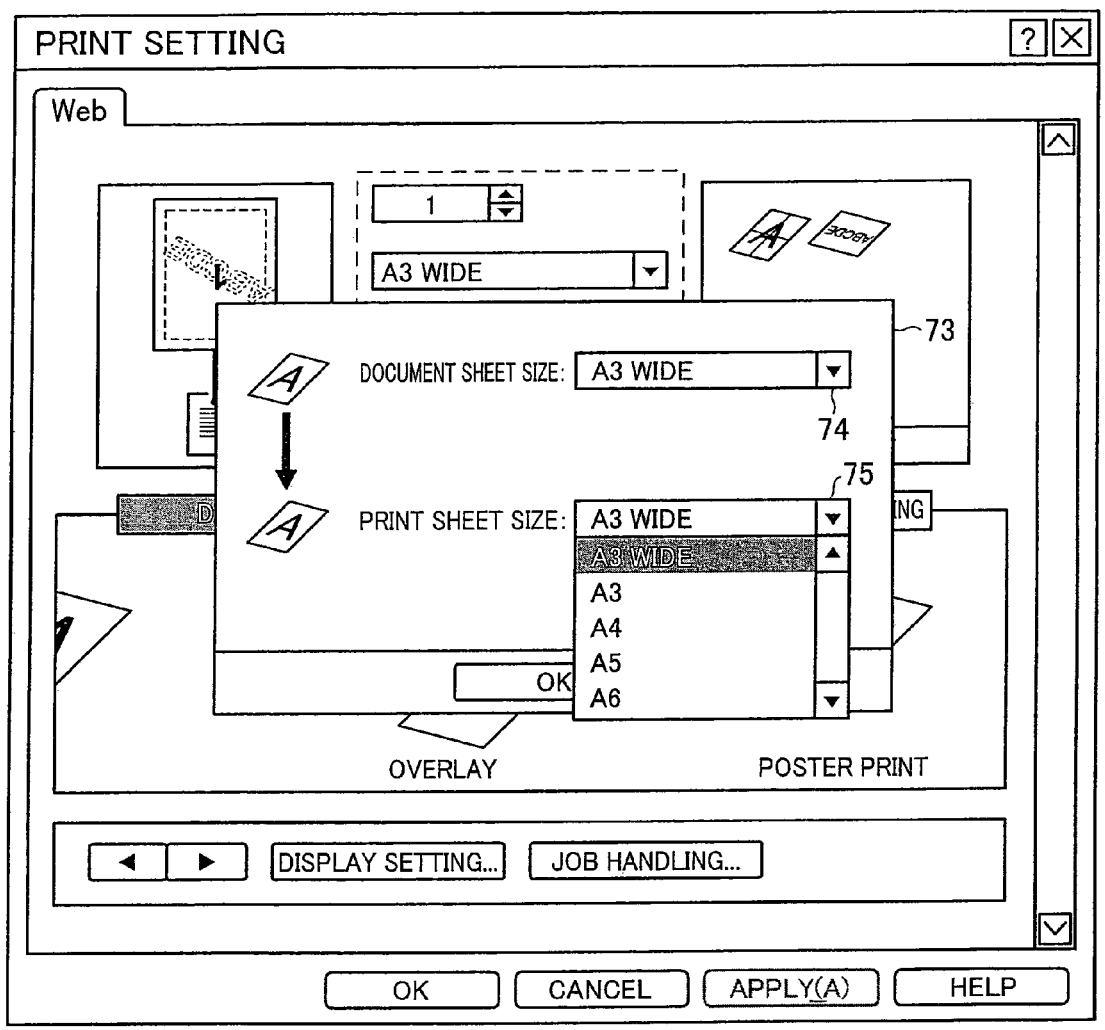
FIG. 27 is a diagram showing one example of a screen image displayed when another pull-down key shown in FIG. 25 is clicked.

Each of FIGS. 25, 26, and 27 is a diagram showing one example of a screen image of the dialog box regarding the fit page. As show in FIG. 25, the detail condition setting section 42 displays a dialog box 73 including a pull-down key 74 for setting a document sheet size and a pull-down key 75 for setting a print sheet size.

Moreover, the detail condition setting section 42 displays "A3 WIDE" as a default. However, as shown in FIGS. 26 and 27, by clicking the pull-down keys 74 or 75, standard size sheets, such as "A3", "A4", "B4", "B5", etc., and standard size recording material, such as "Postcard", "Envelope", etc. are displayed. With this, a user can select a desired document sheet size and print sheet size, and obtain an image which fits a desired print sheet.

Figure 28:
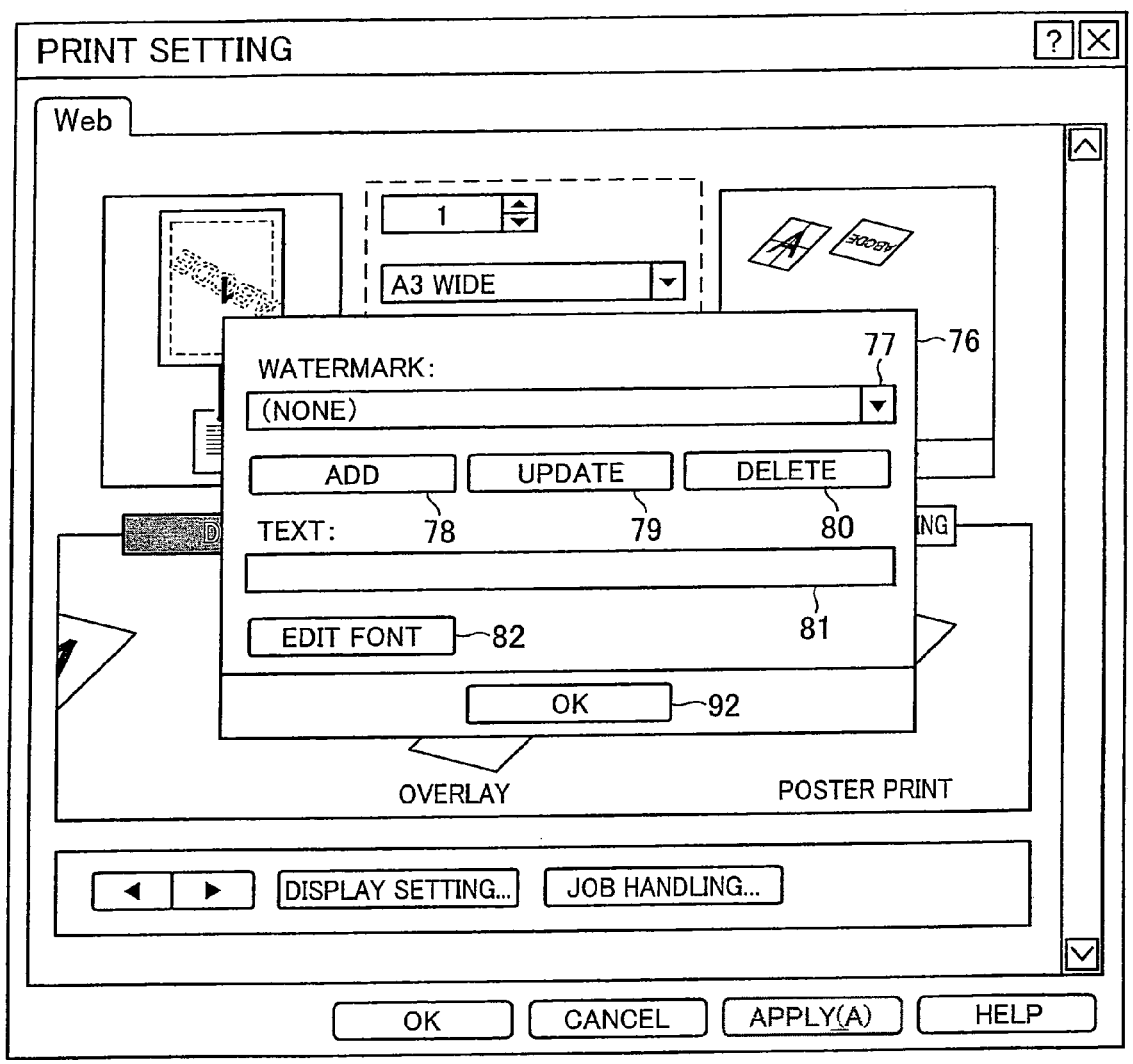
FIG. 28 is a diagram showing one example of a screen image of a dialog box regarding a watermark function.
Figure 29:
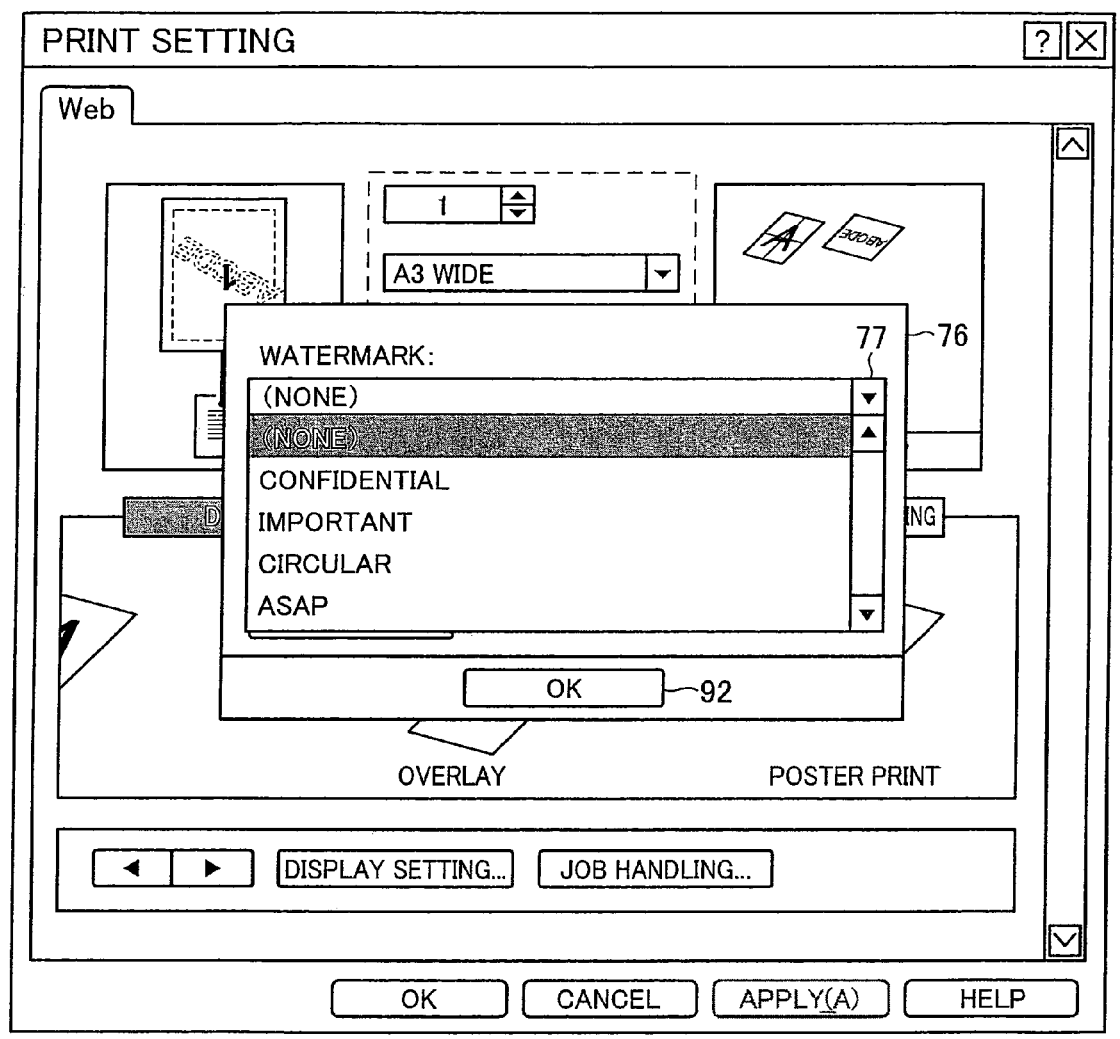
FIG. 29 is a diagram showing one example of a screen image displayed when a pull-down key shown in FIG. 28 is clicked.

Each of FIGS. 28 and 29 is a diagram showing one example of a screen image of the dialog box regarding the watermark. As shown in FIG. 28, the detail condition setting section 42 displays a dialog box 76 including (i) a pull-down key 77 for selecting a text, (ii) an addition key 78 for adding a new text, (iii) an update key 79 for editing a registered text, (iv) a delete key 80 for deleting the registered text, (v) a text box 81 for inputting a new text, and (vi) a font edit key 82 for setting the font, size, color, tone (density), etc. of a text.

Moreover, the detail condition setting section 42 displays "(None)" as a default of the text. However, as shown in FIG. 29, by clicking the pull-down key 77, "CONFIDENTIAL", "IMPORTANT", "CIRCULAR", "ASAP", "DO NOT COPY", etc. are displayed. With this, a user can select a desired text.

The detail condition setting section 42 can register a text input in the text box 81. When registering the text, the font, size, color, and tone (density) input by using the font edit key 82 are also registered. Moreover, the detail condition setting section 42 carries out an editing or deleting of the registered text in response to the clicking of the update key 79 or the delete key 80.

Figure 30:
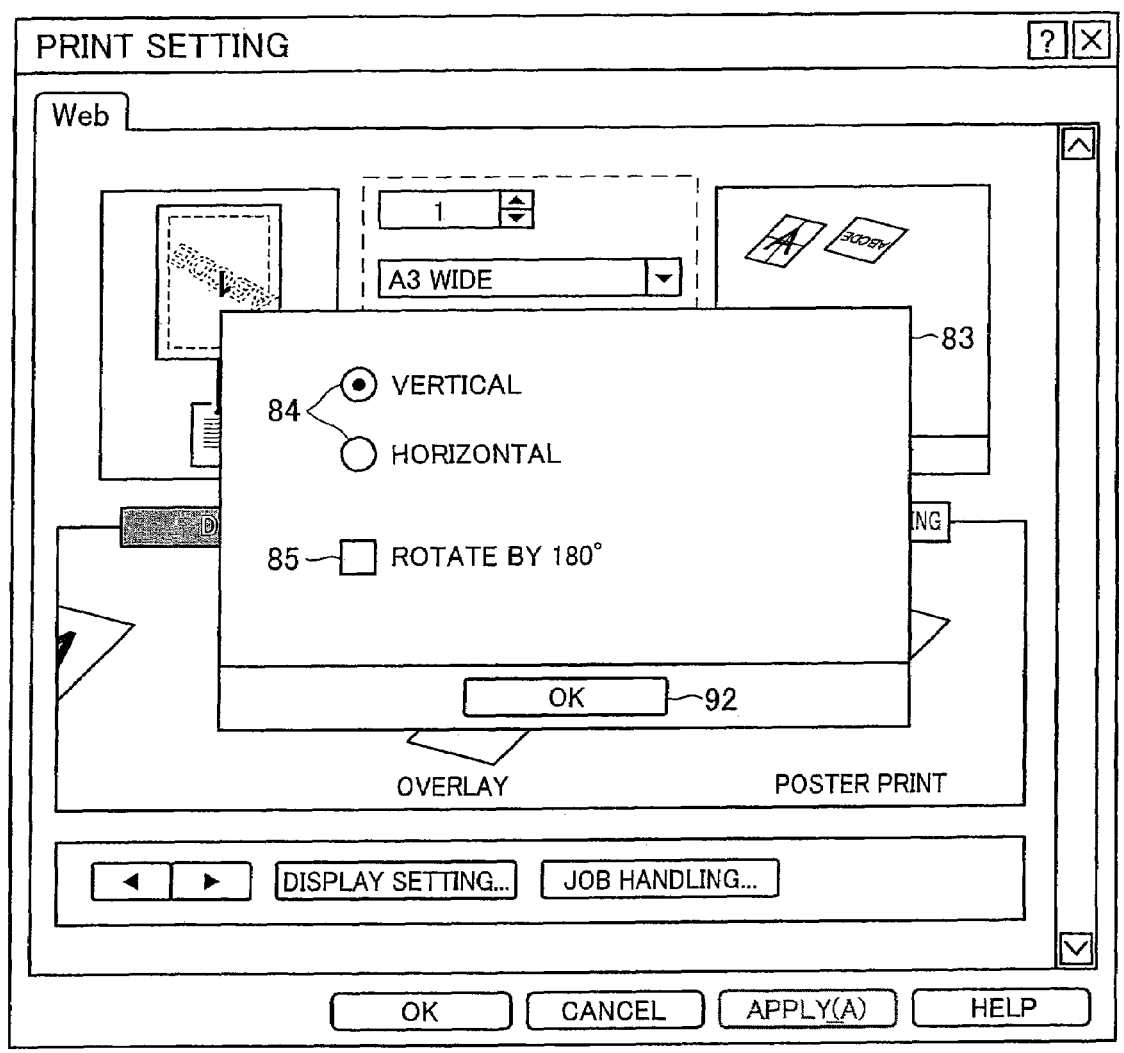
FIG. 30 is a diagram showing one example of a screen image of a dialog box regarding a 180° rotation function.

FIG. 30 is a diagram showing one example of a screen image of a dialog box regarding the 180° rotation function. As shown in FIG. 30, the detail condition setting section 42 displays (i) a check box 84 for selecting a rotation direction and (ii) a check box 85 for selecting whether to carry out the 180° rotation. With this, a user can select a desired method for rotating an image.

Figure 31:
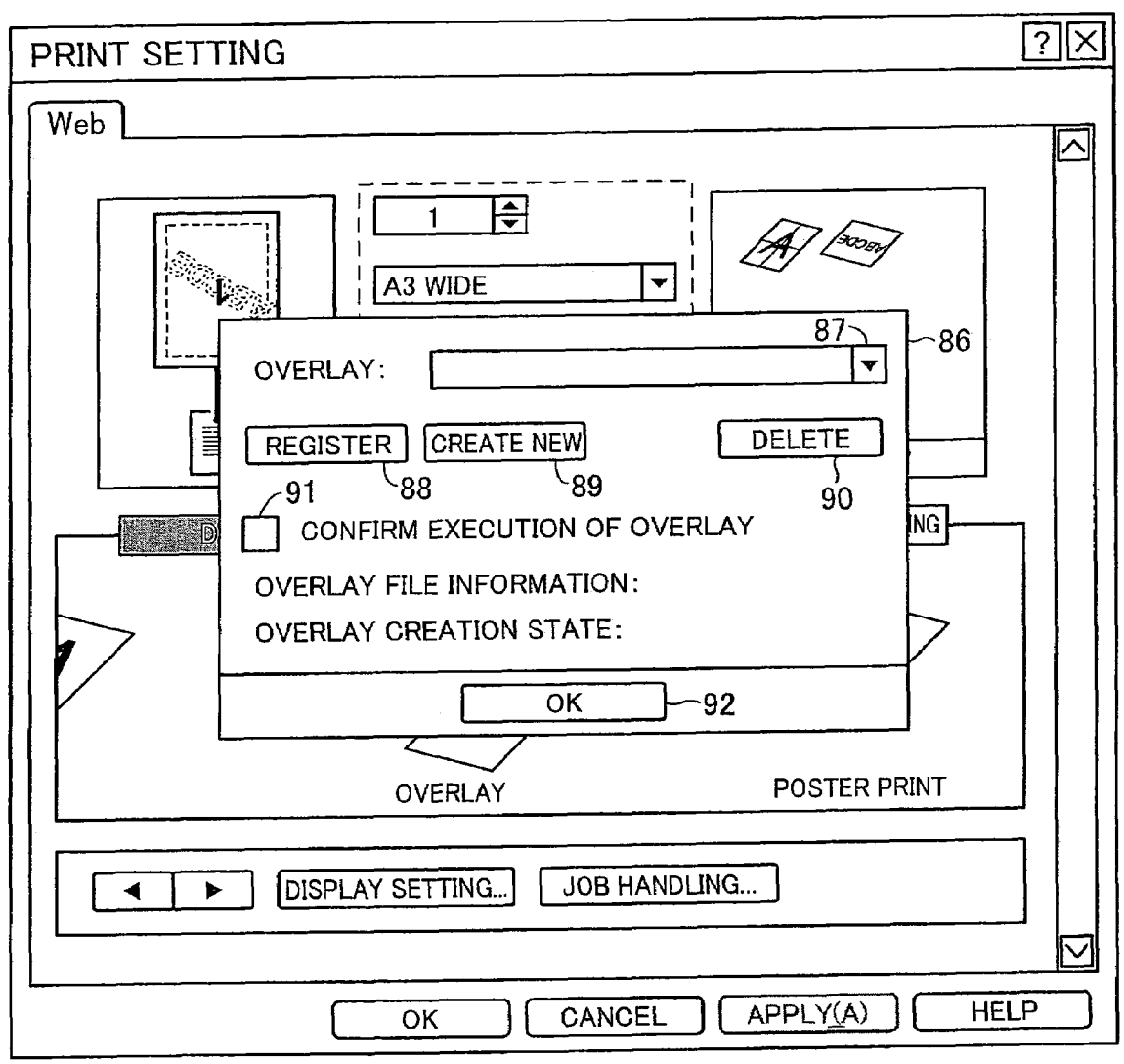
FIG. 31 is a diagram showing one example of a screen image of a dialog box regarding an overlay function.
Figure 32:
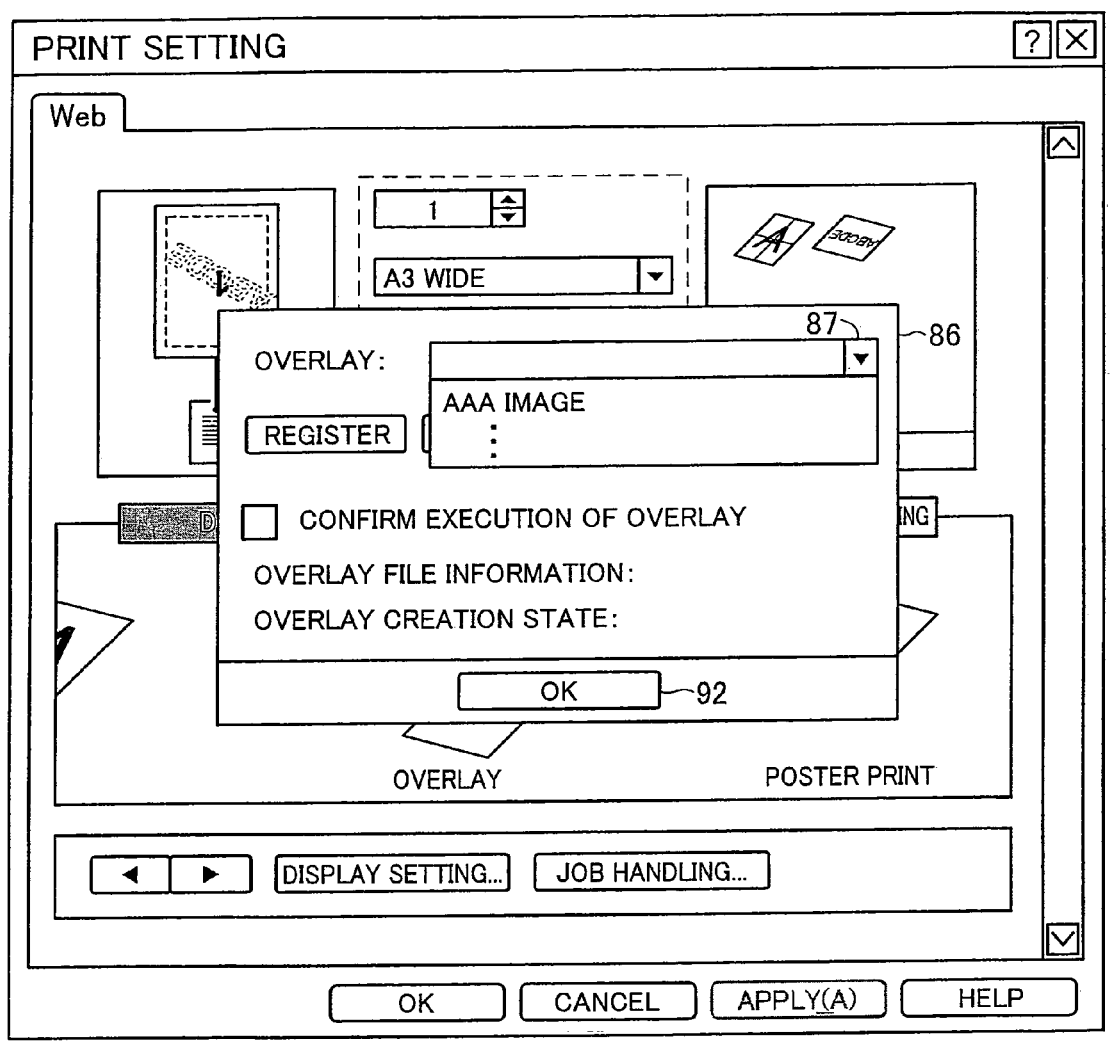
FIG. 32 is a diagram showing one example of a screen image displayed when a pull-down key shown in FIG. 31 is clicked.

Each of FIGS. 31 and 32 is a diagram showing one example of a screen image of a dialog box regarding the overlay function. As shown in FIG. 31, the detail condition setting section 42 displays a dialog box 86 including (i) a pull-down key 87 for selecting an overlap image used for overlay, (ii) a register key 88 for registering a new overlap image, (iii) a create new key 89 for creating an overlap image, (iv) a delete key 90 for deleting the registered overlap image, (v) a check box 91 for confirming the execution of the overlap image.

Moreover, as shown in FIG. 32, by clicking the pull-down key 87, the detail condition setting section 42 displays a list of the registered overlap images. With this, a user can select and set a desired overlap image.

The detail condition setting section 42 displays the dialog boxes shown in FIGS. 23 to 32. Upon clicking of an OK key 92 that is the setting termination key, the detail condition setting section 42 sets the print condition of the advanced function in response to an input from a user. Then, the detail condition setting section 42 associates the set print condition with the control number, and stores the set print condition and the control number in the advanced function condition storing section 29.

Reset Processing of Print Condition of Advanced Function

Figure 33:
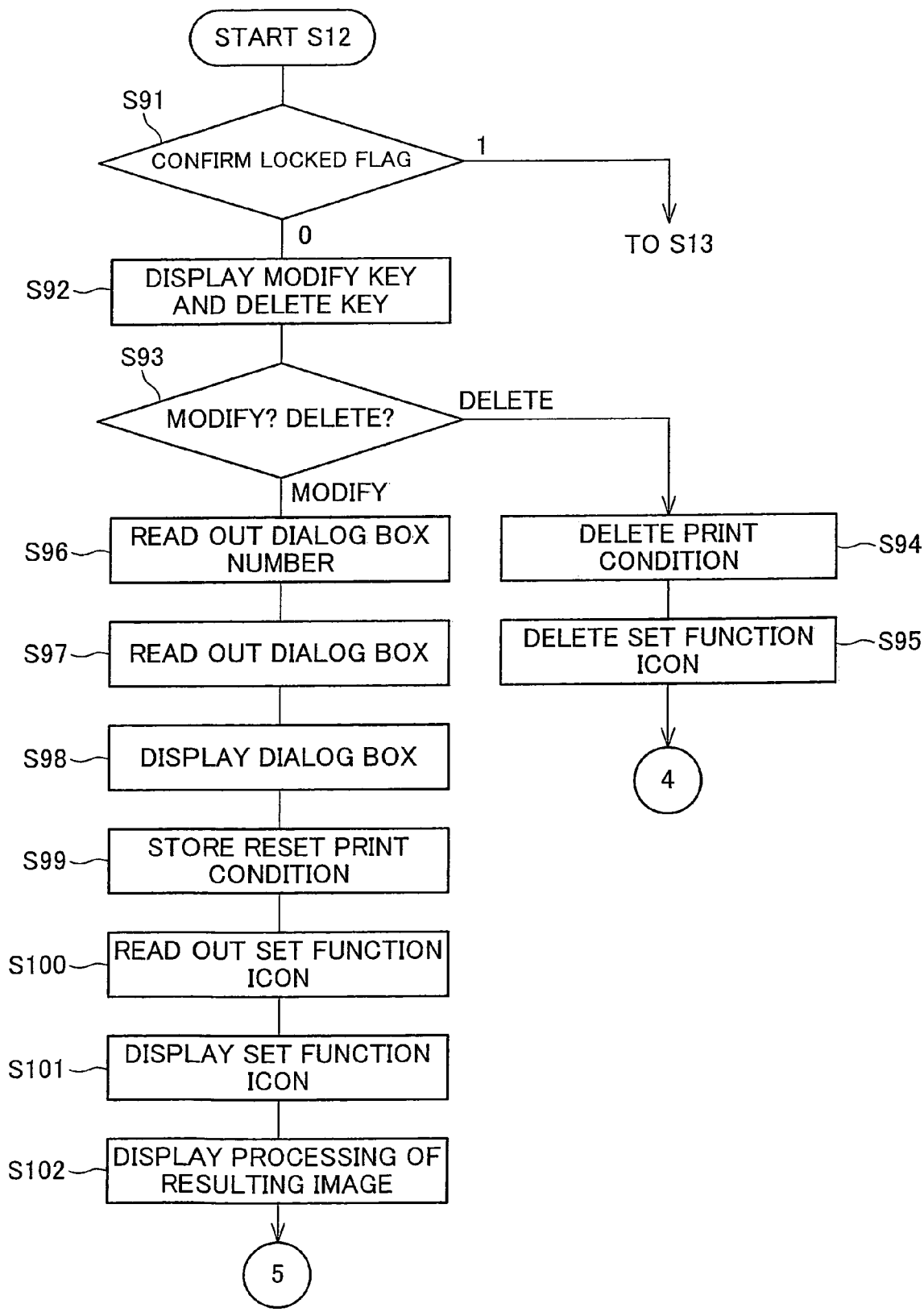
FIG. 33 is a flow chart showing a flow of a reset processing of the print condition of the advanced function.

Next, the following explains the reset processing of the print condition of the advanced function in reference to a flow chart shown in FIG. 33. Note that this reset processing of the print condition of the advanced function is carried out when the set function icon P displayed in the region C (see FIG. 11) is clicked in S11 shown in FIG. 10.

First, the set function icon display processing section 43 which has detected that the set function icon P is clicked outputs to the reset accepting section 45 the control number corresponding to the clicked set function icon. Then, upon receipt of the control number from the set function icon display processing section 43, the reset accepting section 45 confirms the locked flag stored in the advanced function condition storing section 29 (S91). When the locked flag is "1", the reset accepting section 45 cannot reset the advanced function, so that the processing proceeds to S13 shown in FIG. 10. At this time, the reset accepting section 45 may cause the display section 13 to carry out a display showing that the reset, etc. cannot be carried out. Meanwhile, when the locked flag is "0", the processing proceeds to S92.

Figure 34:
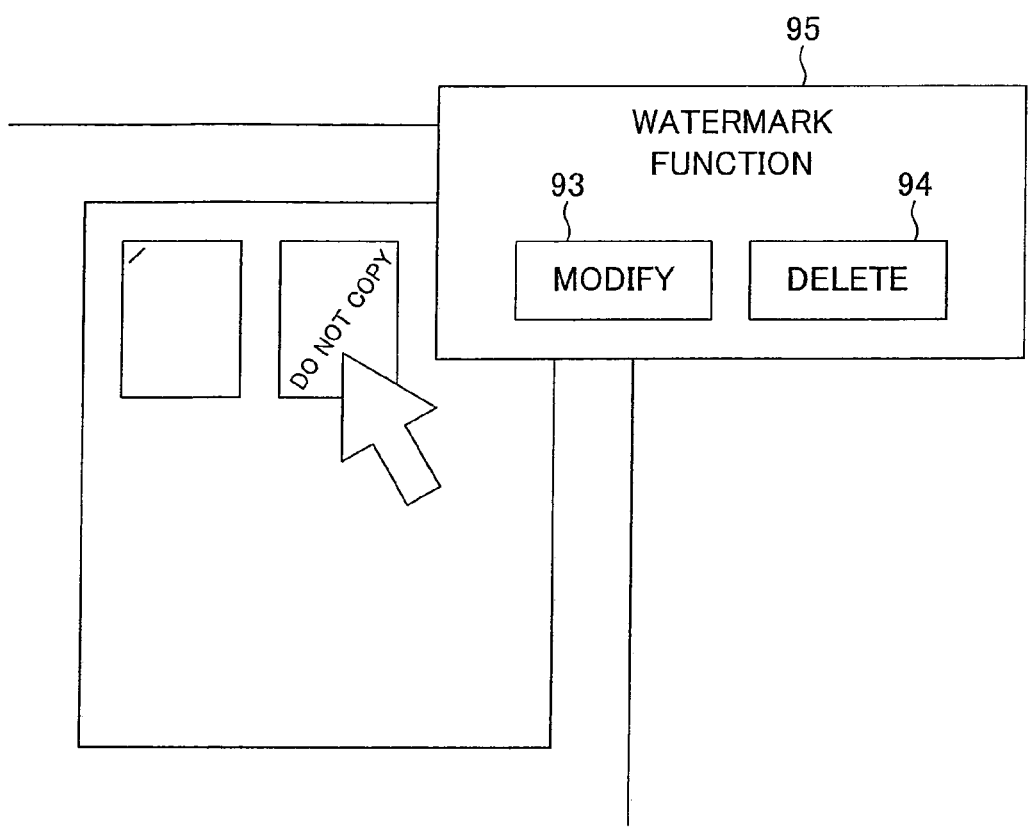
FIG. 34 is a diagram showing one example of a screen image of a dialog box displayed when a reset accepting section resets the advanced function.

Next, in S92, the reset accepting section 45 reads out from the table managing section 23 the advanced function name corresponding to the control number received from the set function icon display processing section 43. Then, as shown in FIG. 34, the reset accepting section 45 displays a dialog box 95 including the read-out advanced function name, a modify key 93, and a delete key 94, and allows a user to select either the deletion or modification of the print condition.

Next, the reset accepting section 45 judges whether the clicked key is "Delete" or "Modify" (S93).

When the clicked key is "Delete" in S93, the reset accepting section 45 deletes from the advanced function condition storing section 29 (i) the control number received from the set function icon display processing section 43 and (ii) the set print condition corresponding to this control number (S94).

After that, the set function icon display processing section 43 detects that the advanced function condition storing section 29 is updated, and deletes from the region C (see FIG. 11) of the print condition setting screen image the set function icon corresponding to the control number and set print condition which have been deleted from the advanced function condition storing section 29 (S94).

Next, the resulting image display processing section 28 detects that the advanced function condition storing section 29 is updated, and changes a display of the resulting image (S95). The processing in S95 is the same as the processing in S32 to S37, so that the explanation thereof is omitted. After that, the processing proceeds to S47 shown in FIG. 17.

Meanwhile, when the clicked key is "Modify" in S93, the reset accepting section 45 outputs to the dialog box read-out section 41 the control number received from the set function icon display processing section 43.

After that, the advanced function condition setting section 27 carries out the processing in S96 to S101, and then the resulting image display processing section 28 carries out the processing in S102. The processing in S96 to S102 is the same as the processing in S82 to S88, so that the explanation thereof is omitted. After that, the processing proceeds to S50 shown in FIG. 17.

Print Instruction and Cancel Processing

Figure 35:
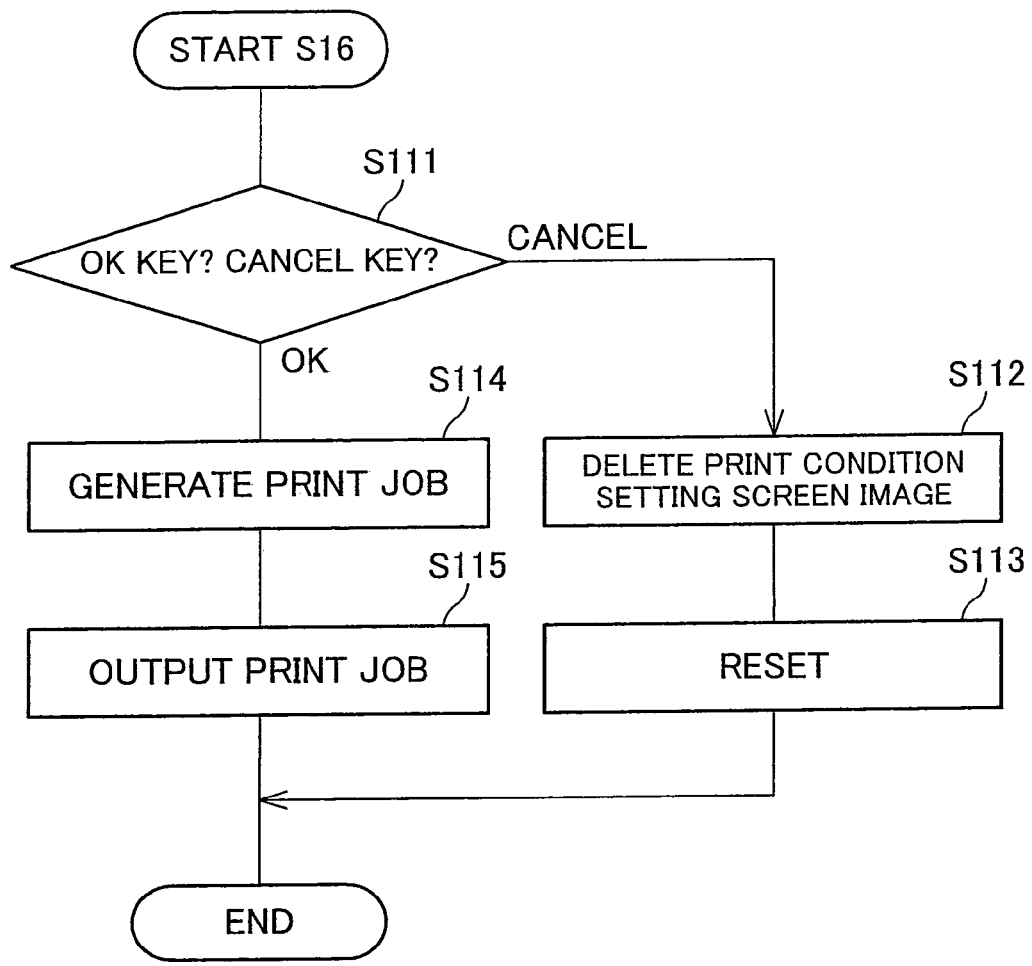
FIG. 35 is a flow chart showing a flow of a print instruction and a cancel processing.
Figure 36:
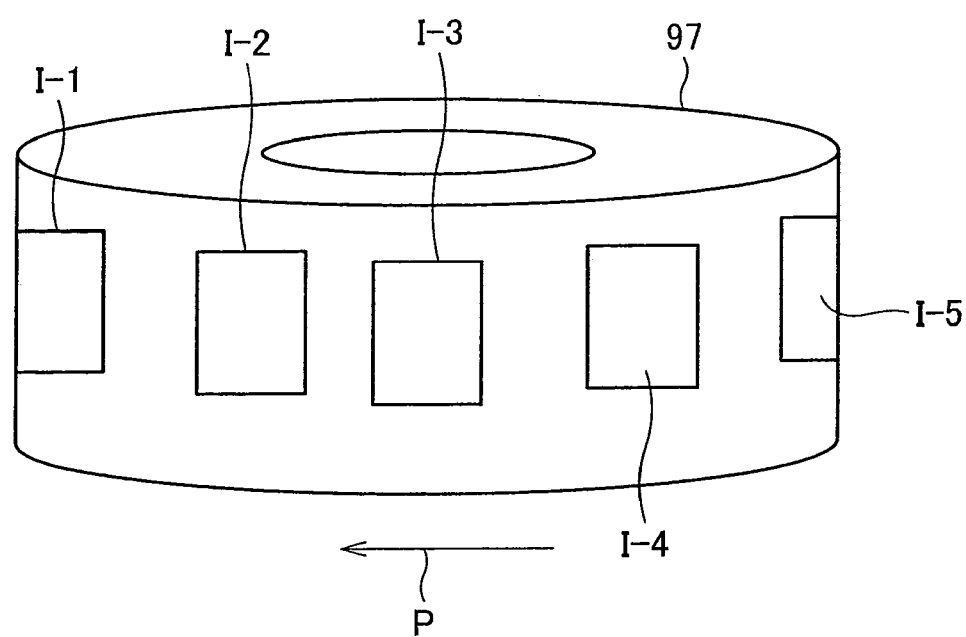
FIG. 36 is a diagram showing another example of a display of the advanced function icons.

Next, the following explains the print instruction and the cancel processing in reference to a flow chart shown in FIG. 35. Note that this print instruction or this cancel processing is carried out when the OK key 56 or the cancel key 57 (see FIG. 11) is clicked in S15 shown in FIG. 10.

First, the print requesting section 30 judges whether the clicked key is the OK key 56 for carrying out printing or the cancel key 57 for canceling printing (S111).

When the clicked key is the cancel key 57 in S111, the printer driver UI section 15 deletes the print condition setting screen image from the display section 13 (S112). Further, respective sections of the printer driver UI section 15 returns to a state of the startup (S113). After that, the processing is terminated.

Meanwhile, when the clicked key is the OK key in S111, the print requesting section 30 reads out (i) the set print condition(s) of the basic function(s) from the basic function condition storing section 22 and (ii) the set print condition(s) of the advanced function(s) from the advanced function condition storing section 29. Then, the print requesting section 30 generates the print job in accordance with the read-out set print conditions (S114). After that, the print requesting section 30 outputs the generated print job to the printer 1 (S115). Then, the processing is terminated.

MODIFICATION EXAMPLES

Modification Example of Icon Read-out Section

According to the foregoing explanation, the table managing section 23 manages the advanced function icons which are different in size from each other, and the icon read-out section 33 reads out the advanced function icon whose size corresponds to the size information 32b. However, the present embodiment is not limited to this. The table managing section 23 may manage the advanced function icons having the same size, and the icon read-out section 33 may carry out in accordance with the size information 32b a size change processing with respect to the advanced function icon read out from the table managing section 33. In this case, it is possible to reduce a necessary capacity of the table managing section 23.

Modification Example of Display Control of Display Control Section

According to the foregoing explanation, the display control section 37 displays the advanced function icons while causing the advanced function icons to move in a horizontal direction. However, the display control of the display control section 37 is not limited to this.

For example, the display control section 37 may sequentially and repeatedly display the advanced function icons while causing the advanced function icons to move in a vertical direction or in an oblique direction.

Moreover, the display control section 37 may display in a predetermined region (region B shown in FIG. 11) of the print condition setting screen image a cylinder-shaped image (shown in FIG. 36) while causing the cylinder-shaped image to rotate, and the advanced function icons are placed on the periphery of the cylinder-shaped image. Note that the cylinder-shaped image may be transparent. In this case, (i) the advanced function icons placed on a front half of the cylinder-shaped image and (ii) the advanced function icons placed on a back half of the cylinder-shaped image are displayed on the print condition setting screen image. At this time, the selectable/nonselectable switching section 38 sets the advanced function icons so that the advanced function icons displayed on the front half of the cylindrical body are selectable and the advanced function icons displayed on the back half of the cylindrical body are not selectable.

Further, the display control section 37 may divide a plurality of advanced function icons into a plurality of groups, and then sequentially display the advanced function icons from one group to another in a predetermined region of the print condition setting screen image. That is, if there are fifteen advanced function icons, those may be divided into five groups, and the display control section 37 may display the advanced function icons three by three. At this time, the display control section 37 may change the size of each frame of the advanced function icon. For example, the display control section 37 may display a small-sized first frame image, and stepwisely increase the size of the frame image each time the frame image is changed. This gives a user an optical illusion that the advanced function icon is moving from far side to near side.

In any control, a plurality of advanced function icons are sequentially and repeatedly displayed, so that even a small screen region can display all the advanced function icons. With this, a user can recognize all the advanced functions.

Modification Example Regarding Moving Image Speed Calculation

According to the foregoing explanation, the moving image speed calculating section 36 calculates the moving image speed by Formula (1) using as parameters the number of frames, the moving speed, and the size of the display region. However, the moving image speed calculating section 36 may set the moving image speed which is higher than the moving image speed calculated by Formula (1). With this, while the advanced function icon moves in the region B, the display control section 37 can display each of a series of frame images of the advanced function icon a plurality of times. That is, a user can watch the moving image a plurality of times while the advanced function icon moves in the region B.

Moreover, the moving image speed calculating section 36 may store a table which associates the moving speed with a predetermined moving image speed, and set, using this table, the moving image speed corresponding to the moving speed. In this case, it is preferable that the moving image speed be such a speed that each of a series of frame images of the advanced function icon is displayed at least once while the advanced function icon moves in the region B.

Moreover, the moving image speed may be set to a constant value regardless of the moving speed. In this case, it is preferable that each of a series of frame images of the advanced function icon be displayed at least once while the advanced function icon moves in the region B at the highest moving speed.

Moreover, according to the foregoing explanation, the moving image speed calculating section 36 calculates the moving image speed in response to a moving speed change instruction input by a user. However, the moving speed may be calculated by (i) setting the moving image speed by a user and (ii) using Formula (2) below using as parameters the set moving image speed (the display time of a single frame), the number of frames, and the size of the display region.

Moving Speed=(Size of Display Region)÷((Display Time of Single Frame)×(Number of Frames))     Formula (2)

With this, each of a series of frame images of the advanced function icon is displayed at least once while the advanced function icon moves in the region B.

The number of frames of each of all the advanced function icons is 30 in the foregoing explanation, however the number of frames may be different for each advanced function icon.

Moreover, when the moving direction information 32e is updated and the moving direction of the advanced function icon currently displayed in the region B is changed, the moving image speed calculating section 36 may calculate the moving image speed in the following manner. That is, using the stored size of the region B, the position of the advanced function icon, the moving direction information 32e, and the moving speed information 32f, the moving image speed calculating section 36 calculates a time it takes for the advanced function icon to move from a position when the moving direction is changed to a position outside the region B. Then, the moving image speed calculating section 36 calculates the moving image speed so that all the frame images of the moving image are displayed within the time calculated. At this time, when the moving direction is changed, the moving image speed calculating section 36 calculates the moving image speed so that the display control section 37 displays the moving image from the first frame image. That is, the moving image speed calculating section 36 calculates the moving image speed so that all the frame images of the moving image are displayed within a time from when the moving direction is changed until when the advanced function icon moves to outside of the region B.

Modification Example Regarding Selectable/Nonselectable Switching Section

According to the foregoing explanation, the selectable/nonselectable switching section 38 sets the advanced function corresponding to the control number stored in the advanced function condition storing section 29, that is, the selectable/nonselectable switching section 38 sets the set advanced function, so that this advanced function icon, that is, this set advanced function becomes non-selectable. However, the present embodiment is not limited to this.

Figure 37:
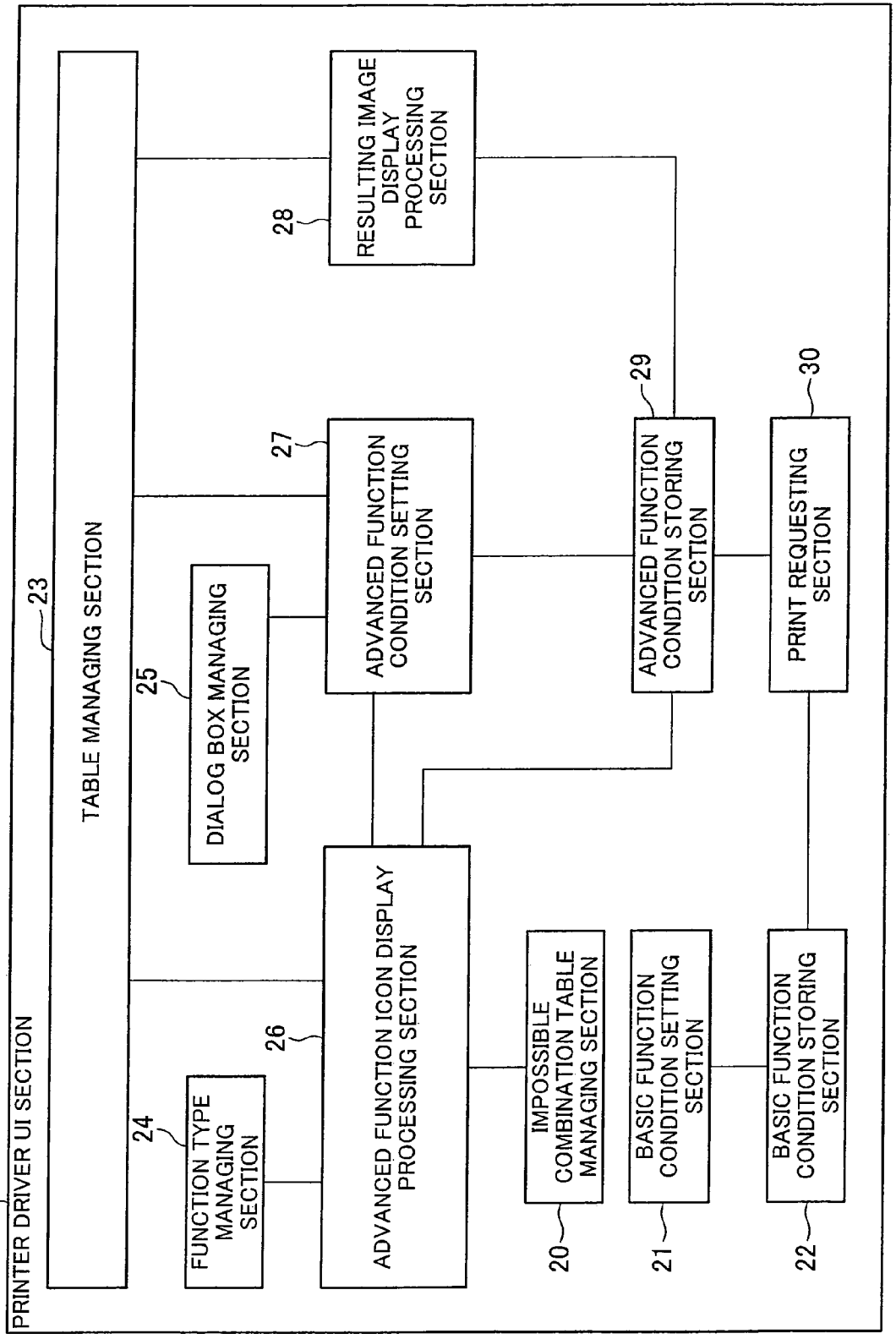
FIG. 37 is a block diagram showing another configuration of the printer driver UI section.

For example, as shown in FIG. 37, the printer driver UI section 15 may include an impossible combination table managing section 20.

The impossible combination table managing section (impossible combination information managing section) 20 manages an impossible combination table which shows a combination of the advanced functions which cannot be used at the same time. FIG. 38 is a diagram showing one example of the impossible combination table managed by the impossible combination table managing section 20. As shown in FIG. 38, the impossible combination table managing section 20 manages information indicating that the poster print function of the control number 4 and the staple function of the control number 3 cannot be used at the same time.

In this case, the selectable/nonselectable switching section 38 reads out from the impossible combination table managing section 20 the control number corresponding to the control number read out from the advanced function condition storing section 29. Then, the selectable/nonselectable switching section 38 carries out the gray mask processing with respect to (i) the advanced function icon corresponding to the control number read out from the advanced function condition storing section 29 and (ii) the advanced function icon corresponding to the control number read out from the impossible combination table managing section 20.

With this, a user cannot select the advanced function which cannot be used together with the set advanced function.

Moreover, the selectable/nonselectable switching section 38 may carry out a processing of not outputting to the display control section 37 the advanced function icon of the advanced function which is not selectable. In this case, the advanced function icon which is not selectable is not displayed. However, it is preferable that the advanced function icon which has been subjected to the gray mask processing be displayed so that a user can recognize the existence of this advanced function.

Modification Example of Position of Printer Driver UI Section

According to the foregoing explanation, the PC 2 includes the printer driver UI section 15. However, the printer 1 may include the printer driver UI section 15, the display section 13, and the input section 12. Moreover, the printer driver UI section 15 may be included in an image processing apparatus provided at a relay point of the PC 2 and the printer 1. Note that an apparatus including the printer driver UI section 15 is the data processing setting apparatus.

Modification Example of Set Function Icon Display Processing Section

According to the foregoing explanation, the set function icon display processing section 43 reads out from the table managing section 23 the set function icon corresponding to the control number (and the print condition) stored in the advanced function condition storing section 29.

However, the present embodiment is not limited to this. When the set function icon is one frame image of the advanced function icon, the table managing section 23 may manage a frame image number by associating the frame image number with the control number or with the control number and the print condition. Then, the set function icon display processing section 43 may display as the set function icon the frame image of the frame image number corresponding to the control number (and the print condition) stored in the advanced function condition storing section 29.

Moreover, when each of all the set function icons is the first frame image or final frame image of the corresponding advanced function icon, the set function icon display processing section 43 may read out the first (or the final) frame image of the advanced function icon corresponding to the control number stored in the advanced function condition storing section 29, and display the first (or the final) frame image as the set function icon. In this case, it is not necessary for the table managing section 23 to manage the set function icon or the frame image number.

Moreover, since the set function icon is the same as the frame image of the advanced function icon, a user can easily recognize which advanced function corresponds to the set function icon.

Modification Example of Resulting Image Display Processing Section

According to the foregoing explanation, the resulting image display processing section 28 reads out from the table managing section 23 the resulting image corresponding to the control number (and the print condition) stored in the advanced function condition storing section 29.

However, the present embodiment is not limited to this. When the advanced function icon changes as time advances and shows the print processing using the corresponding advanced function, the resulting image display processing section 28 may read out the final frame image of this advanced function icon from the table managing section 23, and display this final frame image as the resulting image. In this case, the table managing section 23 does not have to manage the resulting image separately from the advanced function icon.

For example, in the case of the poster print shown in FIG. 5, the advanced function icon of the poster print changes as time advances, that is, the advanced function icon of the poster print shows (i) a step of enlarging a document image, (ii) a step of dividing the document image into a predetermined number of images, and (iii) a step of printing each of the divided images onto a single sheet. In this case, the final frame image shows a result of the print processing using the poster print. Therefore, the resulting image display processing section 28 may display the final frame image of the advanced function icon as the resulting image.

Others

According to the foregoing explanation, the advanced function icon is the moving image for explaining the content of the corresponding advanced function. With this, a user can easily recognize what kind of function this advanced function is. However, the advanced function icon may be a still image. This is because, depending on the content of the advanced function, a user may recognize the content of the advanced function even by the still image.

Moreover, the basic function condition storing section 22 may store the locked flag. Then, the lock setting section 44 may switch the locked flag stored in the basic function condition storing section 22, like the locked flag stored in the advanced function condition storing section 29. With this, a user can obtain, without any operation, the same print condition of the basic function as the last time when starting up the printer driver UI section 15 this time.

Figure 39:
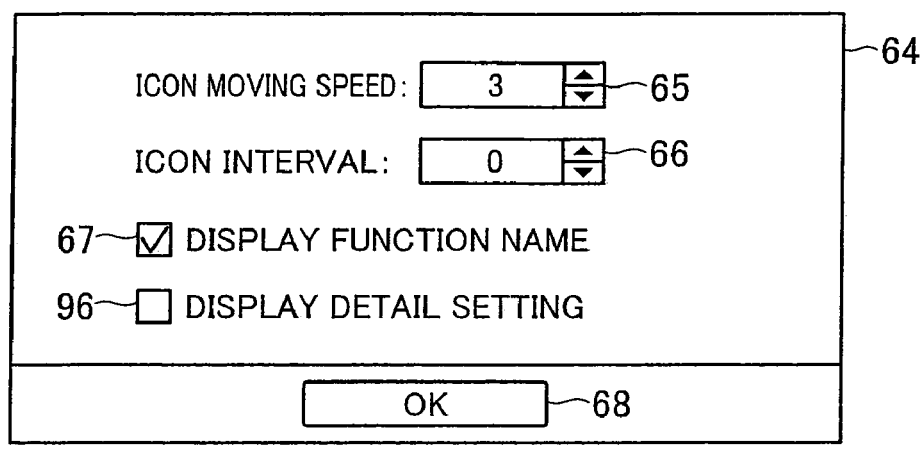
FIG. 39 is a diagram showing one example of a screen image of a dialog box including a check box of "DISPLAY DETAIL SETTING".

Moreover, the table managing section 23 may associate detailed print condition items (detail setting items) of the advanced function with respective control numbers, and manages the detail setting items. Then, the icon read-out section 33 reads out from the table managing section 23 the detail setting item(s) corresponding to the control number(s) managed by the display condition managing section 32. Moreover, for example, as shown in FIG. 39, the display condition setting section 31 may display a detail setting display check box 96 in the display condition dialog box 64 (see FIG. 21). When the detail setting display check box 96 is checked, the display control section 37 displays the detail setting item under the advanced function icon.

Moreover, upon clicking of a job handling key 97 shown in FIG. 11, the print requesting section 30 may generate the print job, and store (save) the generated print job in a predetermined folder in a storage device, such as a hard disk of a digital copier, such as the printer 1.

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each block of the printer driver UI section 15 may be realized by a hardware logic, or by software using CPU in the following manner.

That is, the printer driver UI section 15 includes: a CPU (central processing unit) which executes a command of a control program for realizing each function; a ROM (read only memory) which stores the control program; a RAM (random access memory) which loads the control program; a storage device (recording medium), such as a memory, which stores the control program and various data; and the like. Then, an object of the present invention can be achieved by supplying a computer-readable recording medium to the printer driver UI section 15 and then causing its computer (CPU, MPU, or the like) to read out and execute a program code recorded in the recording medium. Note that the computer-readable recording medium records the program code (executable format program, intermediate code program, source program) of the control program of the printer driver UI section 15, the control program being software that realized the above-described functions.

Examples of the recording medium are (i) a tape, such as a magnetic tape or a cassette tape, (ii) a disc, such as a magnetic disc (a floppy® disc, a hard disc, etc.) or an optical disc (a CD-ROM, an MO, an MD, a DVD, a CD-R, etc.), (iii) a card, such as an IC card (including a memory card) or an optical card, (iv) a semiconductor memory, such as a mask ROM, an EPROM, an EEPROM, a flash ROM, etc.

Moreover, the printer driver UI section 15 may be configured so as to be connectable with a communication network, so that the program code may be supplied through the communication network. The communication network is not especially limited, and may be, for example, the Internet, an intranet, an extranet, a LAN, an ISDN, a VAN, a CATV communication network, a virtual private network, a telephone network, a mobile communication network, a satellite communication network, or the like. Moreover, a transmission medium constituting the communication network is not especially limited, and may be, for example, (i) a fixed line, such as an IEEE 1394, a USB, a power line carrier, a cable TV circuit, a telephone line, or an ADSL, or (ii) a wireless, such as an infrared (an IrDA, a remote control), a Bluetooth®, an 802.11 wireless, an HDR, a mobile phone network, a satellite circuit, or a ground wave digital network. Note that the present invention can be realized even in the case in which the program code is in the form of a computer data signal which is realized by an electronic transmission and is embedded in a carrier wave.

A data processing setting apparatus of the present invention includes (I) display control means for displaying plural kinds of function information on a setting screen image for setting a data processing, each of the plural kinds of function information indicating a function of the data processing and being able to be identified by the function, (II) function setting means for (i) selecting the function corresponding to the function information selected, in response to an input instruction, from plural pieces of function information among the plural kinds of function information, the plural pieces of function information being displayed on the setting screen image, and (ii) setting the selected function, and (III) set information display processing means for displaying set information in a region of the setting screen image, not in a region in which the plural kinds of function information are displayed by the display control means, the set information corresponding to the function set by the function setting means and indicating that the function has already been set.

Therefore, a user can watch the function information, and also confirm the set information displayed on the same screen image. On this account, the user can easily confirm the set function information without any operation. Thus, the user does not mistakenly select the set function.

Further, in addition to the above-described configuration, it is preferable that (i) the data processing setting apparatus of the present invention further include a set information managing section for associating the function with the set information and managing the function and the set information, and (ii) the set information display processing means read out from the set information managing section the set information corresponding to the function set by the function setting means and display the read-out set information.

According to the above-described configuration, the set information display processing means displays the set information managed by the set information managing section. Therefore, for example, the set information managing section can manage as the set information an image created in advance so that the user can understand which function has already been set. With this, the user can easily understand which function has already been set.

Further, in addition to the above-described configuration, it is preferable that the set information display processing means of the data processing setting apparatus of the present invention display as the set information the function information indicating the function set by the function setting means.

According to the above-described configuration, the function information displayed for setting the function is the same as the set information, so that the user can easily recognize that the set information corresponds to which function. Moreover, the data processing setting apparatus does not have to manage the set information separately from the function information.

Further, in addition to the above-described configuration, it is preferable that, in the data processing setting apparatus of the present invention, (i) the function information be a moving image icon, and (ii) the set information display processing means display as the set information one of frame images constituting the function information.

According to the above-described configuration, using the moving image, it is possible to explain the content of the function in more detail. Moreover, since one of the frame images constituting the function information is displayed as the set information, the user can easily understand the relation between the set information and the function information, and can easily recognize which function has already been set.

Further, in addition to the above-described configuration, it is preferable that the data processing setting apparatus of the present invention further includes resulting image display processing means for displaying a resulting image in a region of the setting screen image, not in the region in which the plural kinds of function information are displayed by the display control means or in the region in which the set information is displayed by the set information display processing means, the resulting image showing a result of the data processing using the function set by the function setting means.

According to the above-described configuration, the user can easily understand the result obtained by the processing of the set function.

Further, in addition to the above-described configuration, it is preferable that (i) the data processing setting apparatus of the present invention further include a resulting image managing section for associating the function with the resulting image corresponding to this function, and managing the function and the resulting image, and (ii) the resulting image display processing means display the resulting image corresponding to the function which is read out from the resulting image managing section and set by the function setting means.

According to the above-described configuration, the resulting image display processing section displays the resulting image managed by the resulting image managing section. Therefore, for example, the resulting image managing section can manage as the resulting image an image created in advance so that the user can understand the result obtained by the processing of the set function. With this, the user can easily understand what kind of processing result the user can obtain.

Further, in addition to the above-described configuration, it is preferable that, in the data processing setting apparatus of the present invention, (i) the function information is a moving image icon, and (ii) the resulting image display processing means displays as the resulting image one of frame images constituting the function information. According to the above-described configuration, it is not necessary to manage the resulting image separately from the function information.

For example, the function information indicates the data processing (i) using the function corresponding to this function information and (ii) changing as time advances, and the resulting image display processing means may display as the resulting image a final frame image of the function information.

Further, in addition to the above-described configuration, it is preferable that, in the data processing setting apparatus of the present invention, when the function setting means sets a plurality of functions, the resulting image display processing means synthesize a plurality of resulting images corresponding to the plurality of functions, and display the synthesized image.

According to the above-described configuration, the user can confirm a data processing result obtained when a plurality of functions are used in combination.

Further, in addition to the above-described configuration, it is preferable that the display control means of the data processing setting apparatus of the present invention sequentially display icons each of which is the function information.

According to the above-described configuration, the display control means sequentially displays on the setting screen image the plurality of function information each indicating the function of the data processing. Therefore, even when the size of the setting screen image is small, the display control means can sequentially display on the setting screen image all pieces of function information. As a result, it is possible to improve the visibility of each function information. Moreover, the user can easily recognize, without any operation, all the functions settable in the data processing setting apparatus.

Further, in addition to the above-described configuration, it is preferable that the display control means of the data processing setting apparatus of the present invention display the icons on the setting screen image while causing the icons to move in one direction.

According to the above-described configuration, since the plural kinds of function information are displayed on setting screen image while being moved in one direction, a user can simultaneously watch plural pieces of function information lined up in one direction.

Further, in addition to the above-described configuration, it is preferable that the icon of the data processing setting apparatus of the present invention be a moving image.

According to the above-described configuration, the moving image can explain the content of the function in more detail. For example, when the data processing is a processing of generating the print job for the printer and the 180° rotation function is included as the function of the data processing, it is possible to display a moving image showing that an image the user wants is formed on a sheet which is rotated by 180°. With this, a user can easily recognize the content of the function corresponding to the icon of the moving image.

Further, in addition to the above-described configuration, it is preferable that the display control means of the data processing setting apparatus of the present invention display all frame images of the moving image at least once while the icon is being displayed on the setting screen image.

According to the above-described configuration, while the icon is being displayed on setting screen image, the moving image is not interrupted. With this, a user can more easily recognize the content of the function corresponding to the icon of the moving image.

Further, in addition to the above-described configuration, it is preferable that the data processing of the data processing setting apparatus of the present invention be a processing of generating a print job for a printer.

The function of a printer has been diversified in recent years. Moreover, in many cases, one function of a printer is used in combination with the other function. In such a case, the user sets a plurality of functions, and the user has to recognize which function has already been set. According to the above-described configuration, the user can view the function information, and can also confirm the set information displayed on the same screen image. Therefore, the user can easily confirm the set information without any operation.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A data processing setting apparatus comprising:

display control section for displaying plural kinds of function information on a setting screen image for setting a data processing, each of the plural kinds of function information indicating a function of the data processing and being able to be identified by the function;

function setting means for (i) selecting the function corresponding to the function information selected, in response to an input instruction, from plural pieces of function information among the plural kinds of function information, the plural pieces of function information being displayed on the setting screen image, and (ii) setting the selected function;

set information display processing section for displaying set information in a region of the setting screen image, not in a region in which the plural kinds of function information are displayed by said display control section, the set information corresponding to the function set by said function setting section and indicating that the function has already been set; and resulting image display processing section for displaying a resulting image in a region of the setting screen image, not in the region in which the plural kinds of function information are displayed by said display control section or in the region in which the set information is displayed by said set information display processing section, the resulting image showing a result of the data processing using the function set by said function setting section;

wherein, when said function setting section sets a plurality of functions, said resulting image display processing section synthesizes a plurality of resulting images corresponding to the plurality of functions, and displays the synthesized image.

2. The data processing setting apparatus as set forth in claim 1, further comprising a set information managing section for associating the function with the set information and managing the function and the set information, wherein said set information display processing section reads out from said set information managing section the set information corresponding to the function set by said function setting section, and displays the read-out set information.

3. The data processing setting apparatus as set forth in claim 1, wherein said set information display processing section displays as the set information the function information indicating the function set by said function setting section.

4. The data processing setting apparatus as set forth in claim 3, wherein:
the function information is a moving image icon; and
said set information display processing section displays as the set information one of frame images constituting the function information.

5. The data processing setting apparatus as set forth in claim 1, further comprising a resulting image managing section for associating the function with the resulting image corresponding to this function, and managing the function and the resulting image, wherein said resulting image display processing section displays the resulting image corresponding to the function which is read out from said resulting image managing section and set by said function setting section.

6. The data processing setting apparatus as set forth in claim 1, wherein:
the function information is a moving image icon; and
said resulting image display processing section displays as the resulting image one of frame images constituting the function information.

7. The data processing setting apparatus as set forth in claim 6, wherein:
the function information indicates the data processing (i) using the function corresponding to this function information and (ii) changing as time advances; and
said resulting image display processing section displays as the resulting image a final frame image of the function information.

8. The data processing setting apparatus as set forth in claim 1, wherein said display control section sequentially displays icons each of which is the function information.

9. The data processing setting apparatus as set forth in claim 8, wherein said display control section displays the icons on the setting screen image while causing the icons to move in one direction.

10. The data processing setting apparatus as set forth in claim 8, wherein the icon is a moving image.

11. The data processing setting apparatus as set forth in claim 10, wherein said display control section displays all frame images of the moving image at least once while the icon is being displayed on the setting screen image.

12. The data processing setting apparatus as set forth in claim 1, wherein the data processing is a processing of generating a print job for a printer.

13. A data processing setting method of a data processing setting apparatus, comprising:

a display control step of displaying plural kinds of function information on a setting screen image for setting a data processing, each of the plural kinds of function information indicating a function of the data processing and being able to be identified by the function;

a function setting step of (i) selecting the function corresponding to the function information selected, in response to an input instruction, from plural pieces of function information among the plural kinds of function information, the plural pieces of function information being displayed on the setting screen image, and (ii) setting the selected function;

a set information display processing step of displaying set information in a region of the setting screen image, not in a region in which the plural kinds of function information are displayed in said display control step, the set information corresponding to the function set in said function setting step and indicating that the function has already been set;

resulting image display processing step of displaying a resulting image in a region of the setting screen image, not in the region in which the plural kinds of function information are displayed by said display control step or in the region in which the set information is displayed by said set information display processing step, the resulting image showing a result of the data processing using the function set by said function setting step;

wherein, when said function setting step sets a plurality of functions, said resulting image display processing step synthesizes a plurality of resulting images corresponding to the plurality of functions, and displays the synthesized image.

14. A computer-readable recording medium operable on a computer to produce a data setting apparatus comprising:

display control section for displaying plural kinds of function information on a setting screen image for setting a data processing, each of the plural kinds of function information indicating a function of the data processing and being able to be identified by the function;

function setting section for (i) selecting the function corresponding to the function information selected, in response to an input instruction, from plural pieces of function information among the plural kinds of function information, the plural pieces of function information being displayed on the setting screen image, and (ii) setting the selected function;

set information display processing section for displaying set information in a region of the setting screen image, not in a region in which the plural kinds of function information are displayed by said display control section, the set information corresponding to the function set by said function setting section and indicating that the function has already been set; and resulting image display processing section for displaying a resulting image in a region of the setting screen image, not in the region in which the plural kinds of function information are displayed by said display control section or in the region in which the set information is displayed by said set information display processing section, the resulting image showing a result of the data processing using the function set by said function setting section;

wherein, when said function setting section sets a plurality of functions, said resulting image display processing section synthesizes a plurality of resulting images corresponding to the plurality of functions, and displays the synthesized image.

* * * * *